United States Patent
Silverbrook et al.

(10) Patent No.: US 8,896,724 B2
(45) Date of Patent: Nov. 25, 2014

(54) CAMERA SYSTEM TO FACILITATE A CASCADE OF IMAGING EFFECTS

(75) Inventors: Kia Silverbrook, Balmain (AU); Paul Lapstun, Balmain (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/114,813

(22) Filed: May 4, 2008

(65) Prior Publication Data

US 2008/0204562 A1    Aug. 28, 2008

Related U.S. Application Data

(63) Continuation of application No. 10/666,124, filed on Sep. 22, 2003, now Pat. No. 7,375,746, which is a continuation of application No. 09/112,757, filed on Jul. 10, 1998, now Pat. No. 6,624,848.

(30) Foreign Application Priority Data

Jul. 15, 1997  (AU) ........................................ PO7991
Jul. 15, 1997  (AU) ........................................ PO8028

(51) Int. Cl.
*H04N 5/225*    (2006.01)
*H04N 5/228*    (2006.01)
(Continued)

(52) U.S. Cl.
CPC ......... *B41J 2/17513* (2013.01); *H04N 1/32101* (2013.01); *B41J 2/16585* (2013.01); *G06F*
(Continued)

(58) Field of Classification Search
CPC ......... H04N 1/40; H04N 5/262; H04N 2/225; H04N 5/2628

USPC .................. 348/207.2, 222.1, 231.99
See application file for complete search history.

(56) References Cited

U.S. PATENT DOCUMENTS 1,960,667  A    5/1934  Hutt et al.
2,506,035  A    5/1950  Parker
(Continued)

FOREIGN PATENT DOCUMENTS

AU    1996-44491 A    8/1996
AU    1998-55414 A    8/1998
(Continued)

OTHER PUBLICATIONS

U.S. Appl. No. 09/112,757, filed Sep. 23, 2003, Silverbrook.
(Continued)

*Primary Examiner* — James Hannett
(74) *Attorney, Agent, or Firm* — Leydig, Voit & Mayer, Ltd.

(57) ABSTRACT

This invention provides for a camera system having a plurality of hand held camera devices connected together in series. Each camera device includes an image input configured to receive image data from a camera device preceding in the series of devices, and an instruction reader configured to read instructions from a card inserted into the camera device, said card having encoded thereon various instructions for the manipulation of the image data. Each camera device also includes a processor unit arranged in communication with the input and the instruction reader, the processor unit configured to perform image manipulation on the image data according to the instructions read from the card. Also included is an image output configured to transmit manipulated image data from the processor to a camera device following in the series of devices, the camera system operatively facilitating a cascade of imaging effects.

14 Claims, 1 Drawing Sheet

(51) Int. Cl.

| | |
|---|---|
| *H04N 5/76* | (2006.01) |
| *H04N 1/32* | (2006.01) |
| *G06F 21/86* | (2013.01) |
| *B41J 11/70* | (2006.01) |
| *G06K 19/06* | (2006.01) |
| *H04N 1/21* | (2006.01) |
| *B41J 11/00* | (2006.01) |
| *G06K 7/14* | (2006.01) |
| *G06F 21/79* | (2013.01) |
| *G11C 11/56* | (2006.01) |
| *H04N 1/00* | (2006.01) |
| *G06K 1/12* | (2006.01) |
| *B41J 3/44* | (2006.01) |
| *H04N 5/262* | (2006.01) |
| *B82Y 30/00* | (2011.01) |
| *B41J 15/04* | (2006.01) |
| *B41J 2/165* | (2006.01) |
| *B41J 2/175* | (2006.01) |
| *H04N 101/00* | (2006.01) |

(52) U.S. Cl.
CPC .......... 21/86 (2013.01); *B41J 11/70* (2013.01); *H04N 2201/3222* (2013.01); *G06K 19/06037* (2013.01); *H04N 1/2112* (2013.01); *B41J 2/17596* (2013.01); *H04N 2201/3269* (2013.01); *H04N 2201/328* (2013.01); *B41J 11/0005* (2013.01); *H04N 2201/3276* (2013.01); *H04N 2201/0075* (2013.01); *G06K 7/14* (2013.01); *G06F 21/79* (2013.01); *G11C 11/56* (2013.01); *H04N 1/00326* (2013.01); *H04N 1/00965* (2013.01); *H04N 1/00278* (2013.01); *G06K 1/121* (2013.01); *H04N 1/00485* (2013.01); *H04N 2101/00* (2013.01); *H04N 1/0044* (2013.01); *H04N 1/2154* (2013.01); *B41J 3/445* (2013.01); *G06K 7/1417* (2013.01); *H04N 5/2628* (2013.01); *H04N 5/225* (2013.01); *G06F 2221/2129* (2013.01); *B82Y 30/00* (2013.01); *H04N 1/32144* (2013.01); *B41J 15/04* (2013.01)
USPC ................. 348/231.99; 348/207.2; 348/222.1

(56) References Cited

U.S. PATENT DOCUMENTS

| | | | |
|---|---|---|---|
| 3,223,409 A | 12/1965 | Erich et al. |
| 3,518,417 A | 6/1970 | Bertrams |
| 3,573,437 A | 4/1971 | Scuitto et al. |
| 3,663,801 A | 5/1972 | Wahli et al. |
| 3,701,098 A | 10/1972 | Acker |
| 3,731,062 A | 5/1973 | Reilly, Jr. |
| 3,735,350 A | 5/1973 | Lemelson |
| 3,737,629 A | 6/1973 | See |
| 3,748,939 A | 7/1973 | Feinstein et al. |
| 3,760,162 A | 9/1973 | Holter |
| 3,778,541 A | 12/1973 | Bowker |
| 3,843,132 A | 10/1974 | Ferguson |
| 3,852,572 A | 12/1974 | Nicould |
| 3,857,019 A | 12/1974 | Holtey |
| 3,866,217 A | 2/1975 | Bennett, Jr. |
| 3,893,173 A | 7/1975 | Taggart et al. |
| 3,896,691 A | 7/1975 | Granger et al. |
| 3,914,877 A | 10/1975 | Hines |
| 3,916,420 A | 10/1975 | Brown et al. |
| 3,943,563 A | 3/1976 | Lemelson |
| 3,946,398 A | 3/1976 | Kyser et al. |
| 3,956,756 A | 5/1976 | Paton |
| 3,967,286 A | 6/1976 | Andersson et al. |
| 3,970,803 A | 7/1976 | Kinzie, Jr. et al. |
| 3,971,065 A | 7/1976 | Bayer |
| 4,000,239 A | 12/1976 | Hamana et al. |
| 4,034,845 A | 7/1977 | Honegger |
| 4,045,802 A | 8/1977 | Fukazawa et al. |
| 4,048,617 A | 9/1977 | Neff |
| 4,074,324 A | 2/1978 | Barrett et al. |
| 4,088,981 A | 5/1978 | Gott |
| 4,092,654 A | 5/1978 | Alasia |
| 4,161,749 A | 7/1979 | Erlichman |
| 4,172,641 A | 10/1979 | Zoike et al. |
| 4,173,401 A | 11/1979 | Harvey |
| 4,177,514 A | 12/1979 | Rupp |
| 4,181,940 A | 1/1980 | Underwood et al. |
| 4,200,867 A | 4/1980 | Hill |
| 4,213,694 A | 7/1980 | Kuseski |
| 4,224,628 A | 9/1980 | Murray |
| 4,234,214 A | 11/1980 | Lee |
| 4,244,006 A | 1/1981 | Kitahara et al. |
| 4,253,476 A | 3/1981 | Sato |
| 4,258,387 A | 3/1981 | Lemelson et al. |
| 4,262,284 A | 4/1981 | Stieff et al. |
| 4,262,301 A | 4/1981 | Erlichman |
| 4,270,853 A | 6/1981 | Hatada et al. |
| 4,275,413 A | 6/1981 | Sakamoto et al. |
| 4,282,535 A | 8/1981 | Kern et al. |
| 4,317,138 A | 2/1982 | Bryan et al. |
| 4,342,051 A | 7/1982 | Suzuki et al. |
| 4,372,694 A | 2/1983 | Bovio et al. |
| 4,383,458 A | 5/1983 | Kitai et al. |
| 4,384,272 A | 5/1983 | Tanaka et al. |
| 4,394,730 A | 7/1983 | Suzuki et al. |
| 4,402,150 A | 9/1983 | Sullivan |
| 4,414,316 A | 11/1983 | Conley |
| 4,429,320 A | 1/1984 | Hattori et al. |
| 4,429,938 A | 2/1984 | Flor |
| 4,434,503 A | 2/1984 | Tanaka et al. |
| 4,436,439 A | 3/1984 | Koto |
| 4,454,517 A | 6/1984 | Kagaya |
| 4,455,609 A | 6/1984 | Inamura et al. |
| 4,463,359 A | 7/1984 | Ayata et al. |
| 4,463,362 A | 7/1984 | Thomas |
| 4,472,038 A | 9/1984 | Muramatsu et al. |
| 4,488,563 A | 12/1984 | Morifuji et al. |
| 4,494,862 A | 1/1985 | Tanaka |
| 4,494,864 A | 1/1985 | Smith et al. |
| 4,500,183 A | 2/1985 | Tanikawa |
| 4,500,919 A | 2/1985 | Schreiber |
| 4,511,907 A | 4/1985 | Fukuchi |
| 4,518,235 A | 5/1985 | Reed et al. |
| 4,521,014 A | 6/1985 | Sitrick |
| 4,523,235 A | 6/1985 | Rajchman |
| 4,528,575 A | 7/1985 | Matsuda et al. |
| 4,531,740 A | 7/1985 | Green et al. |
| 4,534,142 A | 8/1985 | Drefahl |
| 4,544,184 A | 10/1985 | Freund et al. |
| 4,546,434 A | 10/1985 | Gioello |
| 4,550,967 A | 11/1985 | Riches et al. |
| 4,558,326 A | 12/1985 | Kimura et al. |
| 4,567,529 A | 1/1986 | Yamaguchi et al. |
| 4,580,721 A | 4/1986 | Coffee et al. |
| 4,581,710 A | 4/1986 | Hasselmeier |
| 4,591,900 A | 5/1986 | Heeb et al. |
| 4,592,938 A | 6/1986 | Benoit |
| 4,596,039 A | 6/1986 | Mitchell et al. |
| 4,632,585 A | 12/1986 | Oyamatsu et al. |
| 4,639,738 A | 1/1987 | Young et al. |
| 4,639,769 A | 1/1987 | Rubin et al. |
| 4,640,529 A | 2/1987 | Katz |
| 4,641,980 A | 2/1987 | Matsumoto et al. |
| 4,652,935 A | 3/1987 | Endoh et al. |
| 4,665,556 A | 5/1987 | Fukushima et al. |
| 4,667,208 A | 5/1987 | Shiraki et al. |
| 4,672,453 A | 6/1987 | Sakamoto |
| 4,681,430 A | 7/1987 | Goel et al. |
| 4,683,477 A | 7/1987 | Braun et al. |
| 4,688,105 A | 8/1987 | Bloch et al. |
| 4,689,642 A | 8/1987 | Sugitani |
| 4,689,683 A | 8/1987 | Efron |
| 4,692,394 A | 9/1987 | Drexler |
| 4,703,332 A | 10/1987 | Crotti et al. |

(56) References Cited

U.S. PATENT DOCUMENTS

| | | |
|---|---|---|
| 4,706,130 A | 11/1987 | Yamakawa |
| 4,707,713 A | 11/1987 | Ayata et al. |
| 4,710,873 A | 12/1987 | Breslow et al. |
| 4,724,307 A | 2/1988 | Dutton et al. |
| 4,724,395 A | 2/1988 | Freeman |
| 4,727,245 A | 2/1988 | Dobbins et al. |
| 4,728,978 A | 3/1988 | Inoue et al. |
| 4,734,565 A | 3/1988 | Pierce et al. |
| 4,734,713 A | 3/1988 | Sato et al. |
| 4,740,269 A | 4/1988 | Berger et al. |
| 4,741,327 A | 5/1988 | Yabe |
| 4,745,544 A | 5/1988 | Renner et al. |
| 4,746,920 A | 5/1988 | Nellen et al. |
| 4,754,487 A | 6/1988 | Newmuis |
| 4,762,986 A | 8/1988 | Suda et al. |
| 4,763,153 A | 8/1988 | Ishimura et al. |
| 4,769,764 A | 9/1988 | Levanon |
| 4,771,295 A | 9/1988 | Baker et al. |
| 4,771,342 A | 9/1988 | Beesley |
| 4,783,700 A | 11/1988 | Nagane |
| 4,783,823 A | 11/1988 | Tasaki et al. |
| 4,786,820 A | 11/1988 | Ogino et al. |
| 4,788,563 A | 11/1988 | Omo et al. |
| 4,791,443 A | 12/1988 | Foley et al. |
| 4,796,038 A | 1/1989 | Allen et al. |
| 4,796,087 A | 1/1989 | Guichard et al. |
| 4,804,831 A | 2/1989 | Baba |
| 4,809,345 A | 2/1989 | Tabata et al. |
| 4,819,395 A | 4/1989 | Sugita et al. |
| 4,821,208 A | 4/1989 | Ryan et al. |
| 4,829,324 A | 5/1989 | Drake et al. |
| 4,833,599 A | 5/1989 | Colwell et al. |
| 4,835,388 A | 5/1989 | Bruml et al. |
| 4,837,628 A | 6/1989 | Sasaki |
| 4,841,375 A | 6/1989 | Nakajima et al. |
| 4,845,767 A | 7/1989 | Mori et al. |
| 4,845,770 A | 7/1989 | Koshida |
| 4,853,967 A | 8/1989 | Mandeville |
| 4,860,375 A | 8/1989 | McCubbrey et al. |
| 4,861,031 A | 8/1989 | Simms |
| 4,862,208 A | 8/1989 | Yamada et al. |
| 4,864,494 A | 9/1989 | Kobus, Jr. |
| 4,868,676 A | 9/1989 | Matsuura et al. |
| 4,875,048 A | 10/1989 | Shimizu et al. |
| 4,875,074 A | 10/1989 | Sangyoji et al. |
| 4,875,173 A | 10/1989 | Nakajima |
| 4,882,702 A | 11/1989 | Struger et al. |
| 4,887,161 A | 12/1989 | Nishi et al. |
| 4,890,832 A | 1/1990 | Komaki |
| 4,896,029 A | 1/1990 | Chandler et al. |
| 4,897,719 A | 1/1990 | Griffin |
| 4,897,724 A | 1/1990 | Veldhuis |
| 4,902,880 A | 2/1990 | Garczynski et al. |
| 4,903,132 A | 2/1990 | Yamawaki et al. |
| 4,904,100 A | 2/1990 | Enix |
| 4,905,029 A | 2/1990 | Kelley |
| 4,914,452 A | 4/1990 | Fukawa |
| 4,937,676 A | 6/1990 | Finelli et al. |
| 4,942,470 A | 7/1990 | Nishitani et al. |
| 4,943,820 A | 7/1990 | Larock |
| 4,947,262 A | 8/1990 | Yajima et al. |
| 4,949,189 A | 8/1990 | Ohmori |
| 4,949,391 A | 8/1990 | Faulkerson et al. |
| 4,952,967 A | 8/1990 | Kazumi et al. |
| 4,954,910 A | 9/1990 | Ueno |
| 4,956,656 A | 9/1990 | Yamamoto et al. |
| 4,961,088 A | 10/1990 | Gilliland et al. |
| 4,964,066 A | 10/1990 | Yamane et al. |
| 4,965,596 A | 10/1990 | Nagoshi et al. |
| RE33,425 E | 11/1990 | Nihei |
| 4,975,969 A | 12/1990 | Tal |
| 4,977,459 A | 12/1990 | Ebinuma et al. |
| 4,979,838 A | 12/1990 | Yokota et al. |
| 4,980,856 A | 12/1990 | Ueno |
| 4,983,996 A | 1/1991 | Kinoshita |
| 4,985,848 A | 1/1991 | Pfeiffer et al. |
| 4,987,030 A | 1/1991 | Saito et al. |
| 4,990,005 A | 2/1991 | Karakawa |
| 4,991,205 A | 2/1991 | Lemelson |
| 4,993,405 A | 2/1991 | Takamura et al. |
| 4,999,647 A | 3/1991 | Wood et al. |
| 5,005,998 A | 4/1991 | Takanashi et al. |
| 5,006,929 A | 4/1991 | Barbero et al. |
| 5,009,626 A | 4/1991 | Katz |
| 5,012,349 A | 4/1991 | De Fay |
| 5,016,037 A | 5/1991 | Taniguchi et al. |
| 5,016,112 A | 5/1991 | Nakajima et al. |
| 5,018,072 A | 5/1991 | Ibamoto et al. |
| 5,020,926 A | 6/1991 | Wilhelm |
| 5,021,892 A | 6/1991 | Kita et al. |
| 5,026,042 A | 6/1991 | Miller |
| 5,028,997 A | 7/1991 | Elberbaum |
| 5,031,049 A | 7/1991 | Toyama et al. |
| 5,032,922 A | 7/1991 | Stemmle |
| 5,035,325 A | 7/1991 | Kitsuki |
| 5,035,929 A | 7/1991 | Myers |
| 5,036,472 A | 7/1991 | Buckley et al. |
| 5,040,006 A | 8/1991 | Matsumura et al. |
| 5,043,561 A | 8/1991 | Kimata |
| 5,043,748 A | 8/1991 | Katayama et al. |
| 5,049,898 A | 9/1991 | Arthur et al. |
| 5,051,838 A | 9/1991 | Cho et al. |
| 5,053,814 A | 10/1991 | Takano et al. |
| 5,055,997 A | 10/1991 | Sluijter et al. |
| 5,058,856 A | 10/1991 | Gordon et al. |
| 5,065,170 A | 11/1991 | Rezanka et al. |
| 5,067,713 A | 11/1991 | Soules et al. |
| 5,081,575 A | 1/1992 | Hiller et al. |
| 5,091,966 A | 2/1992 | Bloomberg et al. |
| 5,097,285 A | 3/1992 | Wakabayashi et al. |
| 5,101,096 A | 3/1992 | Ohyama et al. |
| 5,103,311 A | 4/1992 | Sluijter et al. |
| 5,107,100 A | 4/1992 | Shepard et al. |
| 5,107,276 A | 4/1992 | Kneezel et al. |
| 5,107,290 A | 4/1992 | Ohsawa |
| 5,111,288 A | 5/1992 | Blackshear |
| 5,111,419 A | 5/1992 | Morley |
| 5,115,888 A | 5/1992 | Schneider |
| 5,119,115 A | 6/1992 | Buat et al. |
| 5,119,179 A | 6/1992 | Hagino |
| 5,121,139 A | 6/1992 | Burke |
| 5,121,209 A | 6/1992 | Smith et al. |
| 5,121,349 A | 6/1992 | Naito |
| 5,124,692 A | 6/1992 | Sasson |
| 5,132,798 A | 7/1992 | Yoshimura et al. |
| 5,134,495 A | 7/1992 | Frazier et al. |
| 5,135,095 A | 8/1992 | Kocznar et al. |
| 5,138,459 A | 8/1992 | Roberts et al. |
| D329,862 S | 9/1992 | Watanabe et al. |
| 5,144,340 A | 9/1992 | Hotomi et al. |
| 5,144,423 A | 9/1992 | Knauer et al. |
| 5,146,328 A | 9/1992 | Yamasaki et al. |
| 5,148,288 A | 9/1992 | Hannah |
| 5,148,534 A | 9/1992 | Comerford |
| 5,151,726 A | 9/1992 | Iwashita et al. |
| 5,153,532 A | 10/1992 | Albers et al. |
| 5,153,738 A | 10/1992 | Stemmle |
| 5,154,956 A | 10/1992 | Fradrich |
| 5,155,502 A | 10/1992 | Kimura et al. |
| 5,160,577 A | 11/1992 | Deshpande |
| 5,160,943 A | 11/1992 | Pettigre et al. |
| 5,160,945 A | 11/1992 | Drake |
| 5,161,037 A | 11/1992 | Saito |
| 5,163,762 A | 11/1992 | Murakami |
| 5,164,827 A | 11/1992 | Paff |
| 5,164,831 A | 11/1992 | Kuchta et al. |
| 5,172,423 A | 12/1992 | France |
| 5,175,808 A | 12/1992 | Sayre |
| 5,179,389 A | 1/1993 | Arai et al. |
| 5,179,936 A | 1/1993 | O'Hara et al. |
| 5,181,254 A | 1/1993 | Schweizer et al. |
| 5,182,548 A | 1/1993 | Haeberli |
| 5,184,169 A | 2/1993 | Nishitani |
| 5,184,907 A | 2/1993 | Hamada et al. |

(56) References Cited

U.S. PATENT DOCUMENTS

| | | |
|---|---|---|
| 5,189,520 A | 2/1993 | Okayasu et al. |
| 5,189,529 A | 2/1993 | Ishiwata et al. |
| 5,191,640 A | 3/1993 | Plass |
| 5,200,598 A | 4/1993 | Rencontre |
| 5,204,944 A | 4/1993 | Wolberg et al. |
| 5,206,919 A | 4/1993 | Keating |
| 5,208,610 A | 5/1993 | Su et al. |
| 5,212,021 A | 5/1993 | Smith et al. |
| 5,216,490 A | 6/1993 | Greiff et al. |
| 5,220,352 A | 6/1993 | Yamamoto et al. |
| 5,220,400 A | 6/1993 | Anderson et al. |
| 5,221,833 A | 6/1993 | Hecht |
| 5,222,229 A | 6/1993 | Fukuda et al. |
| 5,224,179 A | 6/1993 | Denker et al. |
| 5,225,294 A | 7/1993 | Schifrin |
| 5,226,125 A | 7/1993 | Balmer et al. |
| 5,230,027 A | 7/1993 | Kikuchi |
| 5,231,455 A | 7/1993 | Day |
| 5,235,428 A | 8/1993 | Hirota et al. |
| 5,235,686 A | 8/1993 | Bosshart |
| 5,237,402 A | 8/1993 | Deshon et al. |
| 5,237,686 A | 8/1993 | Asano et al. |
| 5,239,292 A | 8/1993 | Willan |
| 5,240,238 A | 8/1993 | Lee |
| 5,241,165 A | 8/1993 | Drexler |
| 5,241,372 A | 8/1993 | Ohba |
| 5,243,174 A | 9/1993 | Veeneman et al. |
| 5,243,370 A | 9/1993 | Slater |
| 5,243,381 A | 9/1993 | Hube |
| 5,245,365 A | 9/1993 | Woodard et al. |
| 5,247,611 A | 9/1993 | Norden-Paul et al. |
| 5,260,735 A | 11/1993 | Ishikawa et al. |
| 5,265,033 A | 11/1993 | Vajik et al. |
| 5,266,781 A | 11/1993 | Warwick et al. |
| 5,267,021 A | 11/1993 | Ramchandran et al. |
| 5,267,334 A | 11/1993 | Normille et al. |
| 5,270,808 A | 12/1993 | Tanioka |
| 5,275,877 A | 1/1994 | Isayev |
| 5,276,472 A | 1/1994 | Bell et al. |
| 5,276,521 A | 1/1994 | Mori |
| 5,278,608 A | 1/1994 | Taylor et al. |
| 5,280,160 A | 1/1994 | Yamamoto et al. |
| 5,280,620 A | 1/1994 | Sluijter et al. |
| 5,282,044 A | 1/1994 | Misawa et al. |
| 5,282,051 A | 1/1994 | Walker |
| 5,288,980 A | 2/1994 | Patel et al. |
| 5,288,986 A | 2/1994 | Pine et al. |
| 5,291,227 A | 3/1994 | Suzuki |
| 5,291,243 A | 3/1994 | Heckman et al. |
| 5,294,782 A | 3/1994 | Kumar |
| 5,297,217 A | 3/1994 | Hamilton, Jr. et al. |
| 5,297,289 A | 3/1994 | Mintzer |
| 5,300,958 A | 4/1994 | Burke et al. |
| 5,300,976 A | 4/1994 | Lim et al. |
| 5,301,043 A | 4/1994 | Ichikawa |
| 5,315,316 A | 5/1994 | Khormaee |
| 5,317,146 A | 5/1994 | Isobe |
| 5,318,370 A | 6/1994 | Nehowig |
| 5,319,462 A | 6/1994 | Haruki |
| 5,322,594 A | 6/1994 | Bol |
| 5,323,203 A | 6/1994 | Maruyama et al. |
| 5,325,493 A | 6/1994 | Herrell et al. |
| 5,327,260 A | 7/1994 | Shimomae |
| 5,328,281 A | 7/1994 | Narita et al. |
| 5,334,920 A | 8/1994 | Ito et al. |
| 5,335,170 A | 8/1994 | Petteruti et al. |
| 5,336,004 A | 8/1994 | Harada et al. |
| 5,337,361 A | 8/1994 | Wang et al. |
| 5,339,102 A | 8/1994 | Carlotta |
| 5,339,170 A | 8/1994 | Fan |
| 5,339,396 A | 8/1994 | Muramatsu |
| 5,343,031 A | 8/1994 | Yoshida |
| 5,343,309 A | 8/1994 | Roetling |
| 5,343,386 A | 8/1994 | Barber |
| 5,344,248 A | 9/1994 | Schoon et al. |
| 5,345,288 A | 9/1994 | Kobayashit et al. |
| 5,345,505 A | 9/1994 | Pires |
| 5,347,403 A | 9/1994 | Uekusa |
| 5,351,071 A | 9/1994 | Matsuda et al. |
| 5,351,095 A | 9/1994 | Kerdranvat |
| D351,144 S | 10/1994 | Fishbine et al. |
| 5,356,971 A | 10/1994 | Sagawa et al. |
| 5,359,387 A | 10/1994 | Hicks |
| 5,361,366 A | 11/1994 | Kawano et al. |
| 5,363,134 A | 11/1994 | Barbehenn et al. |
| 5,363,209 A | 11/1994 | Eschbach et al. |
| 5,363,212 A | 11/1994 | Taniuchi et al. |
| 5,365,312 A | 11/1994 | Hillmann et al. |
| 5,369,261 A | 11/1994 | Shamir |
| 5,373,322 A | 12/1994 | Laroche et al. |
| 5,374,995 A | 12/1994 | Loveridge et al. |
| 5,376,561 A | 12/1994 | Vu et al. |
| 5,381,172 A | 1/1995 | Ujita et al. |
| 5,384,609 A | 1/1995 | Ogawa et al. |
| 5,384,899 A | 1/1995 | Amit |
| 5,392,365 A | 2/1995 | Steinkirchner |
| 5,393,152 A | 2/1995 | Hattori et al. |
| 5,396,286 A | 3/1995 | Ishizuka |
| 5,398,063 A | 3/1995 | Yamana |
| 5,398,131 A | 3/1995 | Hall et al. |
| 5,398,315 A | 3/1995 | Johnson et al. |
| 5,399,850 A | 3/1995 | Nagatani et al. |
| 5,402,527 A | 3/1995 | Bigby et al. |
| 5,404,460 A | 4/1995 | Thomsen et al. |
| 5,408,669 A | 4/1995 | Stewart et al. |
| 5,408,746 A | 4/1995 | Thoman et al. |
| 5,410,620 A | 4/1995 | Yoshida |
| 5,410,649 A | 4/1995 | Gove |
| 5,412,197 A | 5/1995 | Smith |
| 5,412,402 A | 5/1995 | Searby et al. |
| 5,412,410 A | 5/1995 | Rezanka |
| 5,414,529 A | 5/1995 | Terada et al. |
| 5,418,565 A | 5/1995 | Smith |
| 5,418,585 A | 5/1995 | Petruchik |
| 5,419,543 A | 5/1995 | Nakamura et al. |
| 5,420,409 A | 5/1995 | Longacre et al. |
| 5,420,607 A | 5/1995 | Miller et al. |
| 5,420,635 A | 5/1995 | Konishi et al. |
| 5,420,697 A | 5/1995 | Tuli |
| 5,420,940 A | 5/1995 | Sedlar et al. |
| 5,426,762 A | 6/1995 | Nakagawa |
| 5,428,423 A | 6/1995 | Clark |
| 5,430,518 A | 7/1995 | Tabata et al. |
| 5,430,525 A | 7/1995 | Ohta et al. |
| 5,430,861 A | 7/1995 | Finn |
| 5,432,577 A | 7/1995 | Kobayshi et al. |
| 5,432,896 A | 7/1995 | Hwong et al. |
| 5,432,914 A | 7/1995 | Cho |
| 5,434,618 A | 7/1995 | Hayashi et al. |
| 5,434,621 A | 7/1995 | Yu et al. |
| 5,436,657 A | 7/1995 | Fukuoka |
| 5,438,359 A | 8/1995 | Aoki et al. |
| 5,438,430 A | 8/1995 | Mackinlay et al. |
| 5,438,431 A | 8/1995 | Ostromoukhov |
| 5,441,251 A | 8/1995 | Ohta |
| 5,442,188 A | 8/1995 | Brimbal et al. |
| 5,442,387 A | 8/1995 | Loofbourow et al. |
| 5,442,567 A | 8/1995 | Small |
| 5,443,320 A | 8/1995 | Agata et al. |
| 5,444,230 A | 8/1995 | Baldwin et al. |
| 5,444,468 A | 8/1995 | Fukushima et al. |
| 5,444,543 A | 8/1995 | Sakano |
| 5,448,280 A | 9/1995 | Matsuda et al. |
| 5,450,365 A | 9/1995 | Adachi et al. |
| 5,452,033 A | 9/1995 | Balling et al. |
| 5,456,539 A | 10/1995 | Wright et al. |
| 5,457,515 A | 10/1995 | Quadracci et al. |
| 5,457,554 A | 10/1995 | Faris |
| 5,459,819 A | 10/1995 | Watkins et al. |
| 5,461,440 A | 10/1995 | Toyoda et al. |
| 5,462,375 A | 10/1995 | Isobe et al. |
| 5,463,470 A | 10/1995 | Terashita et al. |
| 5,465,163 A | 11/1995 | Yoshihara et al. |
| 5,465,213 A | 11/1995 | Ross |

(56) References Cited

U.S. PATENT DOCUMENTS

| | | | |
|---|---|---|---|
| 5,466,918 A | 11/1995 | Ray et al. |
| 5,467,118 A | 11/1995 | Gragg et al. |
| 5,469,211 A | 11/1995 | Maruichi et al. |
| 5,471,324 A | 11/1995 | Rolleston |
| 5,471,592 A | 11/1995 | Gove et al. |
| 5,472,143 A | 12/1995 | Bartels et al. |
| 5,473,352 A | 12/1995 | Ishida |
| 5,475,279 A | 12/1995 | Takeuchi et al. |
| 5,475,318 A | 12/1995 | Marcus et al. |
| 5,477,012 A | 12/1995 | Sekendur |
| 5,477,264 A * | 12/1995 | Sarbadhikari et al. ..... 348/231.6 |
| 5,477,546 A | 12/1995 | Shibata et al. |
| 5,479,015 A | 12/1995 | Rudman et al. |
| 5,479,515 A | 12/1995 | Longacre |
| 5,482,375 A | 1/1996 | Richardson et al. |
| 5,482,389 A | 1/1996 | Bickoff et al. |
| 5,483,335 A | 1/1996 | Tobias |
| 5,483,379 A | 1/1996 | Svanberg et al. |
| 5,485,504 A | 1/1996 | Ohnsorge |
| 5,488,223 A | 1/1996 | Austin et al. |
| 5,489,935 A | 2/1996 | Dornier |
| 5,489,945 A | 2/1996 | Kannegundla et al. |
| 5,489,995 A | 2/1996 | Iso et al. |
| 5,493,332 A | 2/1996 | Dalton et al. |
| 5,493,335 A | 2/1996 | Parulski et al. |
| 5,493,409 A | 2/1996 | Maeda et al. |
| 5,493,684 A | 2/1996 | Gephardt et al. |
| 5,495,097 A | 2/1996 | Katz et al. |
| 5,495,568 A | 2/1996 | Beavin |
| 5,497,498 A | 3/1996 | Taylor |
| 5,499,108 A | 3/1996 | Cotte et al. |
| 5,502,485 A | 3/1996 | Suzuki |
| 5,502,529 A | 3/1996 | Zander |
| 5,502,577 A | 3/1996 | Mackinlay et al. |
| 5,504,821 A | 4/1996 | Kanamori et al. |
| 5,506,603 A | 4/1996 | Kawano et al. |
| 5,506,620 A | 4/1996 | Ozawa |
| 5,510,820 A | 4/1996 | Aulick et al. |
| 5,510,857 A | 4/1996 | Kopet et al. |
| 5,512,924 A | 4/1996 | Takada et al. |
| 5,512,951 A | 4/1996 | Torii |
| 5,512,962 A | 4/1996 | Homma |
| 5,513,117 A | 4/1996 | Small |
| 5,513,922 A | 5/1996 | Umbach |
| 5,514,860 A | 5/1996 | Berson et al. |
| 5,515,101 A | 5/1996 | Yoshida |
| 5,515,104 A | 5/1996 | Okada |
| 5,517,222 A | 5/1996 | Sugiyama et al. |
| 5,517,241 A | 5/1996 | Adachi et al. |
| 5,517,265 A | 5/1996 | Zander et al. |
| 5,520,470 A | 5/1996 | Willet |
| 5,521,372 A | 5/1996 | Hecht et al. |
| 5,521,663 A | 5/1996 | Norris, III |
| 5,521,710 A | 5/1996 | Strossman |
| 5,523,780 A | 6/1996 | Hirosawa et al. |
| 5,524,194 A | 6/1996 | Chida et al. |
| 5,528,339 A | 6/1996 | Buhr et al. |
| 5,529,279 A | 6/1996 | Beatty et al. |
| 5,531,431 A | 7/1996 | Saito et al. |
| 5,533,170 A | 7/1996 | Teitzel et al. |
| 5,533,172 A | 7/1996 | Hurtz et al. |
| 5,534,864 A | 7/1996 | Ono et al. |
| 5,534,900 A | 7/1996 | Ohno et al. |
| 5,534,923 A | 7/1996 | Suda |
| 5,534,962 A | 7/1996 | Zander |
| 5,535,371 A | 7/1996 | Stewart et al. |
| 5,537,075 A | 7/1996 | Miyazaki |
| 5,537,144 A | 7/1996 | Faris |
| 5,537,294 A | 7/1996 | Siwinski |
| 5,539,194 A | 7/1996 | Miller et al. |
| 5,539,456 A | 7/1996 | Ishii |
| 5,541,653 A | 7/1996 | Peters et al. |
| 5,541,654 A | 7/1996 | Roberts |
| 5,542,487 A | 8/1996 | Schultz et al. |
| 5,543,941 A | 8/1996 | Parker et al. |
| 5,547,501 A | 8/1996 | Maruyama et al. |
| 5,549,740 A | 8/1996 | Takahashi et al. |
| 5,550,935 A | 8/1996 | Erdem et al. |
| 5,550,938 A | 8/1996 | Hayakawa et al. |
| 5,552,837 A | 9/1996 | Mankovitz |
| 5,553,172 A | 9/1996 | Kimura et al. |
| 5,553,220 A | 9/1996 | Keene |
| 5,553,864 A | 9/1996 | Sitrick |
| 5,554,432 A | 9/1996 | Sandor et al. |
| 5,555,061 A | 9/1996 | Soshi et al. |
| 5,555,428 A | 9/1996 | Radigan et al. |
| 5,555,496 A | 9/1996 | Tackbary et al. |
| 5,557,310 A | 9/1996 | Kurata et al. |
| 5,557,324 A | 9/1996 | Wolff |
| 5,557,332 A | 9/1996 | Koyanagi et al. |
| 5,559,714 A | 9/1996 | Banks et al. |
| 5,559,932 A | 9/1996 | Machida et al. |
| 5,561,604 A | 10/1996 | Buckley et al. |
| 5,563,643 A | 10/1996 | Carlotta et al. |
| 5,563,722 A | 10/1996 | Norris |
| 5,565,900 A | 10/1996 | Cowger et al. |
| 5,566,290 A | 10/1996 | Silverbrook |
| 5,566,906 A | 10/1996 | Kamada et al. |
| 5,570,130 A | 10/1996 | Horii et al. |
| 5,570,435 A | 10/1996 | Bloomberg et al. |
| 5,572,310 A | 11/1996 | Hoberock et al. |
| 5,572,596 A | 11/1996 | Wildes et al. |
| 5,572,632 A | 11/1996 | Laumeyer et al. |
| 5,572,635 A | 11/1996 | Takizawa et al. |
| 5,574,485 A | 11/1996 | Anderson et al. |
| 5,576,783 A | 11/1996 | Lee |
| 5,579,116 A | 11/1996 | Sugiyama et al. |
| 5,579,445 A | 11/1996 | Loce et al. |
| 5,581,773 A | 12/1996 | Glover |
| 5,583,971 A | 12/1996 | Lo |
| 5,586,166 A | 12/1996 | Turban |
| 5,586,207 A | 12/1996 | Goodwin |
| 5,587,740 A | 12/1996 | Brennan |
| 5,591,192 A | 1/1997 | Privitera et al. |
| 5,591,956 A | 1/1997 | Longacre, Jr. et al. |
| 5,592,167 A | 1/1997 | Caruso et al. |
| 5,592,237 A | 1/1997 | Greenway et al. |
| 5,592,312 A | 1/1997 | Noguchi |
| 5,592,597 A | 1/1997 | Kiss |
| 5,593,236 A | 1/1997 | Bobry |
| 5,594,500 A | 1/1997 | Tanaka et al. |
| 5,598,202 A | 1/1997 | Peterson |
| 5,598,242 A | 1/1997 | Omi et al. |
| 5,599,231 A | 2/1997 | Hibino et al. |
| 5,600,402 A | 2/1997 | Kainen |
| 5,600,563 A | 2/1997 | Cannon et al. |
| 5,602,377 A | 2/1997 | Beller et al. |
| 5,602,412 A | 2/1997 | Suzuki et al. |
| 5,602,574 A | 2/1997 | Williams |
| 5,604,537 A | 2/1997 | Yamazaki et al. |
| 5,606,347 A | 2/1997 | Simpson |
| 5,606,420 A | 2/1997 | Maeda et al. |
| 5,608,437 A | 3/1997 | Iwata et al. |
| 5,610,761 A | 3/1997 | Ishibashi et al. |
| 5,613,146 A | 3/1997 | Gove et al. |
| 5,613,175 A | 3/1997 | Frankel |
| 5,613,415 A | 3/1997 | Sanpei |
| 5,615,123 A | 3/1997 | Davidson et al. |
| 5,615,384 A | 3/1997 | Allard |
| 5,615,393 A | 3/1997 | Kikinis et al. |
| 5,619,030 A | 4/1997 | Shiomi |
| 5,619,590 A | 4/1997 | Moore, Jr. |
| 5,619,622 A | 4/1997 | Audi et al. |
| 5,619,737 A | 4/1997 | Horning et al. |
| 5,620,269 A | 4/1997 | Gustafson |
| 5,621,445 A | 4/1997 | Fang et al. |
| 5,621,524 A | 4/1997 | Mitani |
| 5,621,545 A | 4/1997 | Motta et al. |
| 5,621,864 A | 4/1997 | Benade et al. |
| 5,621,868 A | 4/1997 | Mizutani et al. |
| 5,623,581 A | 4/1997 | Attenberg |
| 5,624,732 A | 4/1997 | Oshima et al. |
| 5,625,669 A | 4/1997 | McGregor et al. |
| 5,625,770 A | 4/1997 | Nomura |

(56) References Cited

U.S. PATENT DOCUMENTS

| | | | |
|---|---|---|---|
| 5,633,667 A | 5/1997 | Miyazawa |
| 5,633,678 A | 5/1997 | Parulski et al. |
| 5,634,730 A | 6/1997 | Bobry |
| 5,638,103 A | 6/1997 | Obata et al. |
| 5,640,002 A | 6/1997 | Ruppert et al. |
| 5,640,203 A | 6/1997 | Wakui |
| 5,642,226 A | 6/1997 | Rosenthal |
| 5,644,341 A | 7/1997 | Fuji et al. |
| 5,644,410 A | 7/1997 | Suzuki et al. |
| 5,644,431 A | 7/1997 | Magee |
| 5,644,557 A | 7/1997 | Akamine et al. |
| 5,644,647 A | 7/1997 | Cosgrove et al. |
| 5,646,658 A | 7/1997 | Thiel et al. |
| 5,646,752 A | 7/1997 | Kohler et al. |
| 5,647,484 A | 7/1997 | Fleming |
| 5,649,031 A | 7/1997 | Nakamura et al. |
| 5,652,618 A | 7/1997 | Nanba |
| 5,652,918 A | 7/1997 | Usui |
| 5,655,164 A | 8/1997 | Tsai |
| 5,657,237 A | 8/1997 | Mazzoni |
| 5,661,506 A | 8/1997 | Lazzouni et al. |
| 5,664,013 A | 9/1997 | Rossi |
| 5,665,249 A | 9/1997 | Burke et al. |
| 5,666,141 A | 9/1997 | Matoba et al. |
| 5,666,226 A | 9/1997 | Ezra et al. |
| 5,666,411 A | 9/1997 | McCarty |
| 5,666,516 A | 9/1997 | Combs |
| 5,670,935 A | 9/1997 | Schofield et al. |
| 5,673,073 A | 9/1997 | Childers et al. |
| 5,677,715 A | 10/1997 | Beck |
| 5,677,716 A | 10/1997 | Cleveland |
| 5,678,001 A | 10/1997 | Nagel et al. |
| 5,678,081 A | 10/1997 | Tanaka |
| 5,679,456 A | 10/1997 | Sakai et al. |
| 5,679,943 A | 10/1997 | Schultz et al. |
| 5,680,533 A | 10/1997 | Yamato et al. |
| 5,682,191 A | 10/1997 | Barrett et al. |
| 5,687,304 A | 11/1997 | Kiss |
| 5,688,056 A | 11/1997 | Peyret |
| 5,689,740 A | 11/1997 | Uchiyama |
| 5,691,768 A | 11/1997 | Civanlar et al. |
| 5,692,225 A | 11/1997 | Bernardi et al. |
| 5,696,892 A | 12/1997 | Redmann et al. |
| 5,696,913 A | 12/1997 | Gove et al. |
| 5,697,006 A | 12/1997 | Toguchi et al. |
| 5,699,102 A | 12/1997 | Ng et al. |
| 5,699,491 A | 12/1997 | Barzel |
| 5,703,961 A | 12/1997 | Rogina et al. |
| 5,706,049 A | 1/1998 | Moghadam et al. |
| 5,706,870 A | 1/1998 | Maerzke |
| 5,708,518 A | 1/1998 | Parker et al. |
| 5,708,900 A | 1/1998 | Yokoyama et al. |
| 5,709,253 A | 1/1998 | Maerzke |
| 5,710,582 A | 1/1998 | Hawkins et al. |
| 5,710,948 A | 1/1998 | Takagi |
| 5,713,678 A | 2/1998 | Smith et al. |
| 5,715,228 A | 2/1998 | Takiguchi |
| 5,715,234 A | 2/1998 | Stephenson et al. |
| 5,715,325 A | 2/1998 | Bang et al. |
| 5,715,493 A | 2/1998 | Stephenson |
| 5,717,197 A | 2/1998 | Petrie |
| 5,717,776 A | 2/1998 | Watanabe |
| 5,719,602 A | 2/1998 | Hackleman et al. |
| 5,719,621 A | 2/1998 | Tsunefuji |
| 5,719,936 A | 2/1998 | Hillenmayer |
| 5,719,970 A | 2/1998 | Aoki et al. |
| 5,722,055 A | 2/1998 | Kobayashi et al. |
| 5,722,893 A | 3/1998 | Hill et al. |
| 5,726,219 A | 3/1998 | Sharma et al. |
| 5,726,435 A | 3/1998 | Hara et al. |
| 5,726,693 A | 3/1998 | Sharma et al. |
| 5,726,772 A | 3/1998 | Parker et al. |
| 5,729,252 A | 3/1998 | Fraser |
| 5,729,471 A | 3/1998 | Jain et al. |
| 5,731,062 A | 3/1998 | Kim et al. |
| 5,731,829 A | 3/1998 | Saito et al. |
| 5,734,154 A | 3/1998 | Jachimowicz et al. |
| 5,734,414 A | 3/1998 | Nishimura et al. |
| 5,734,425 A | 3/1998 | Takizawa et al. |
| 5,737,729 A | 4/1998 | Denman |
| 5,740,480 A | 4/1998 | Kuhn et al. |
| 5,741,155 A | 4/1998 | Herman |
| 5,742,296 A | 4/1998 | Yamada et al. |
| 5,742,305 A | 4/1998 | Hackleman |
| 5,742,333 A | 4/1998 | Faris |
| 5,742,861 A | 4/1998 | Stephenson |
| 5,743,746 A | 4/1998 | Ho et al. |
| 5,745,175 A | 4/1998 | Anderson et al. |
| 5,748,202 A | 5/1998 | Nakatsuka et al. |
| 5,748,228 A | 5/1998 | Kobayashi et al. |
| 5,748,326 A | 5/1998 | Thompson-Bell et al. |
| 5,748,448 A | 5/1998 | Hokari |
| 5,748,764 A | 5/1998 | Benati et al. |
| 5,748,856 A | 5/1998 | Cariffe et al. |
| 5,749,551 A | 5/1998 | Torres et al. |
| 5,750,974 A | 5/1998 | Sasaki et al. |
| 5,751,303 A | 5/1998 | Erickson et al. |
| 5,751,318 A | 5/1998 | Granzow |
| 5,751,590 A | 5/1998 | Cannon et al. |
| 5,752,114 A | 5/1998 | Saito et al. |
| 5,753,344 A | 5/1998 | Jacobsen |
| 5,754,227 A * | 5/1998 | Fukuoka .................... 348/231.6 |
| 5,754,682 A | 5/1998 | Katoh |
| 5,754,690 A | 5/1998 | Jackson et al. |
| 5,754,700 A | 5/1998 | Kuzma |
| 5,755,519 A | 5/1998 | Klinefelter |
| 5,756,978 A | 5/1998 | Soltesz et al. |
| 5,757,354 A | 5/1998 | Kawamura |
| 5,757,388 A | 5/1998 | Stephenson |
| 5,757,393 A | 5/1998 | Suzuki |
| 5,760,814 A | 6/1998 | Kang |
| 5,761,200 A | 6/1998 | Hsieh |
| 5,761,219 A | 6/1998 | Maltsev |
| 5,761,698 A | 6/1998 | Combs |
| 5,761,726 A | 6/1998 | Guttag et al. |
| 5,764,248 A | 6/1998 | Scarpetti |
| 5,764,816 A | 6/1998 | Kohno et al. |
| 5,765,197 A | 6/1998 | Combs |
| 5,767,945 A | 6/1998 | Fields et al. |
| 5,768,482 A | 6/1998 | Winter et al. |
| 5,768,609 A | 6/1998 | Gove et al. |
| 5,771,012 A | 6/1998 | Shu et al. |
| 5,771,245 A | 6/1998 | Zhang |
| 5,774,760 A | 6/1998 | Nagashima |
| 5,777,626 A * | 7/1998 | Takashima et al. ........... 345/443 |
| 5,781,202 A | 7/1998 | Silverbrook |
| 5,781,708 A | 7/1998 | Austin et al. |
| 5,781,924 A | 7/1998 | Zaitzeva et al. |
| 5,784,076 A | 7/1998 | Crump et al. |
| 5,784,088 A | 7/1998 | Ujita et al. |
| 5,784,434 A | 7/1998 | Shieh |
| 5,784,521 A | 7/1998 | Nakatani et al. |
| 5,784,959 A | 7/1998 | Larios |
| 5,787,193 A | 7/1998 | Balasubramanian |
| 5,788,387 A | 8/1998 | Takayama et al. |
| 5,788,388 A | 8/1998 | Cowger et al. |
| 5,790,158 A | 8/1998 | Shinada et al. |
| 5,790,193 A | 8/1998 | Ohmori |
| 5,790,699 A | 8/1998 | Jackson et al. |
| 5,792,249 A | 8/1998 | Shirota et al. |
| 5,793,423 A | 8/1998 | Hamasaki |
| 5,793,885 A | 8/1998 | Kasson |
| 5,793,900 A | 8/1998 | Nourbakhsh |
| 5,796,288 A | 8/1998 | Krech et al. |
| 5,796,429 A | 8/1998 | Suzuki et al. |
| 5,796,928 A | 8/1998 | Toyomura et al. |
| 5,801,657 A | 9/1998 | Fowler et al. |
| 5,801,736 A | 9/1998 | Ikkaitai et al. |
| 5,801,854 A | 9/1998 | Naylor, Jr. |
| 5,802,413 A | 9/1998 | Stephenson |
| 5,805,213 A | 9/1998 | Spaulding et al. |
| 5,805,296 A | 9/1998 | Hattori |
| 5,805,550 A | 9/1998 | Ohmori |
| 5,805,936 A | 9/1998 | Matsuzaki et al. |

(56) References Cited

U.S. PATENT DOCUMENTS

| | | |
|---|---|---|
| 5,806,997 A | 9/1998 | Kawanabe |
| 5,808,631 A | 9/1998 | Silverbrook |
| 5,808,672 A | 9/1998 | Wakabayashi et al. |
| 5,809,181 A | 9/1998 | Metcalfe |
| 5,809,288 A | 9/1998 | Balmer |
| 5,809,292 A | 9/1998 | Wilkinson et al. |
| 5,809,331 A | 9/1998 | Staats et al. |
| 5,812,071 A | 9/1998 | Kairouz |
| 5,812,156 A | 9/1998 | Bullock et al. |
| 5,814,809 A | 9/1998 | Han |
| 5,815,186 A | 9/1998 | Lewis et al. |
| 5,815,211 A | 9/1998 | Umei |
| 5,816,718 A | 10/1998 | Poole |
| 5,816,918 A | 10/1998 | Kelly et al. |
| 5,818,023 A | 10/1998 | Meyerson et al. |
| 5,818,032 A | 10/1998 | Sun et al. |
| 5,819,240 A | 10/1998 | Kara |
| 5,819,662 A | 10/1998 | Koyabu |
| 5,821,886 A | 10/1998 | Son |
| 5,822,465 A | 10/1998 | Normile et al. |
| 5,822,606 A | 10/1998 | Morton |
| 5,822,608 A | 10/1998 | Dieffenderfer et al. |
| 5,822,623 A | 10/1998 | Urata et al. |
| 5,824,410 A | 10/1998 | Sakai et al. |
| 5,825,006 A | 10/1998 | Longacre et al. |
| 5,825,383 A | 10/1998 | Abe et al. |
| 5,825,882 A | 10/1998 | Kowalski et al. |
| 5,825,947 A | 10/1998 | Sasaki et al. |
| 5,826,263 A | 10/1998 | Nakabayashi et al. |
| 5,826,333 A | 10/1998 | Iketani et al. |
| 5,828,578 A | 10/1998 | Blomgren |
| 5,829,745 A | 11/1998 | Houle |
| 5,831,644 A | 11/1998 | Kato |
| 5,835,136 A | 11/1998 | Watanabe et al. |
| 5,835,616 A | 11/1998 | Lobo et al. |
| 5,835,641 A | 11/1998 | Sotoda et al. |
| 5,835,817 A | 11/1998 | Bullock et al. |
| 5,838,331 A | 11/1998 | Debry |
| 5,838,458 A | 11/1998 | Tsai |
| 5,841,126 A | 11/1998 | Fossum et al. |
| 5,841,441 A | 11/1998 | Smith |
| 5,841,513 A | 11/1998 | Yoshimura et al. |
| 5,841,885 A | 11/1998 | Neff et al. |
| 5,845,166 A | 12/1998 | Fellegara et al. |
| 5,847,698 A | 12/1998 | Reavey et al. |
| 5,847,836 A * | 12/1998 | Suzuki .......................... 358/296 |
| 5,848,255 A | 12/1998 | Kondo |
| 5,848,264 A | 12/1998 | Baird et al. |
| 5,848,307 A | 12/1998 | Uchiyama et al. |
| 5,848,420 A | 12/1998 | Xu |
| 5,850,234 A | 12/1998 | Kneezel et al. |
| 5,852,502 A | 12/1998 | Beckett |
| 5,852,673 A | 12/1998 | Young et al. |
| 5,854,648 A | 12/1998 | Hanabusa |
| 5,854,882 A | 12/1998 | Wang |
| 5,956,051 A | 12/1998 | Suzuki |
| 5,859,657 A | 1/1999 | Donahue et al. |
| 5,859,921 A | 1/1999 | Suzuki |
| 5,860,036 A | 1/1999 | Stephenson |
| 5,860,363 A | 1/1999 | Childers et al. |
| 5,861,897 A | 1/1999 | Ide et al. |
| 5,864,630 A | 1/1999 | Cosatto et al. |
| 5,866,253 A | 2/1999 | Philipps et al. |
| 5,866,895 A | 2/1999 | Fukuda et al. |
| 5,867,213 A | 2/1999 | Ouchi |
| 5,867,394 A | 2/1999 | LaDue et al. |
| 5,867,704 A | 2/1999 | Tanaka et al. |
| 5,869,595 A | 2/1999 | Fuller et al. |
| 5,870,102 A | 2/1999 | Tarolli et al. |
| 5,872,594 A | 2/1999 | Thompon |
| 5,874,718 A | 2/1999 | Matsui |
| 5,874,836 A | 2/1999 | Nowak et al. |
| 5,875,034 A | 2/1999 | Shintani et al. |
| 5,877,715 A | 3/1999 | Gowda et al. |
| 5,878,292 A | 3/1999 | Bell et al. |
| 5,881,211 A | 3/1999 | Matsumura |
| 5,882,128 A | 3/1999 | Hinojosa |
| 5,883,653 A | 3/1999 | Sasaki |
| 5,883,663 A | 3/1999 | Siwko |
| 5,883,830 A | 3/1999 | Hirt et al. |
| 5,884,013 A | 3/1999 | Bosschaerts et al. |
| 5,884,118 A | 3/1999 | Mestha et al. |
| 5,886,371 A | 3/1999 | Shinagawa |
| 5,886,659 A | 3/1999 | Pain et al. |
| 5,887,992 A | 3/1999 | Yamanashi |
| 5,889,597 A | 3/1999 | Ara et al. |
| 5,892,540 A | 4/1999 | Kozlowski et al. |
| 5,893,037 A | 4/1999 | Reele et al. |
| 5,893,132 A | 4/1999 | Huffman et al. |
| 5,893,662 A | 4/1999 | Ito |
| 5,894,309 A | 4/1999 | Freeman et al. |
| 5,894,326 A | 4/1999 | McIntyre et al. |
| 5,896,122 A | 4/1999 | MacDonald et al. |
| 5,896,155 A | 4/1999 | Lebens et al. |
| 5,896,169 A | 4/1999 | Boelart |
| 5,896,176 A | 4/1999 | Das et al. |
| 5,896,403 A | 4/1999 | Nagasaki et al. |
| 5,900,909 A | 5/1999 | Parulski et al. |
| 5,901,242 A | 5/1999 | Crane et al. |
| 5,903,706 A | 5/1999 | Wakabayashi et al. |
| 5,905,529 A | 5/1999 | Inuiya et al. |
| 5,907,149 A | 5/1999 | Marckini |
| 5,907,354 A | 5/1999 | Cama et al. |
| 5,907,415 A | 5/1999 | Yabe |
| 5,907,434 A | 5/1999 | Sekine et al. |
| 5,909,227 A | 6/1999 | Silverbrook |
| 5,909,248 A | 6/1999 | Stephenson |
| 5,909,562 A | 6/1999 | Faget et al. |
| 5,911,056 A | 6/1999 | Faget et al. |
| 5,913,542 A | 6/1999 | Belucci et al. |
| 5,914,737 A | 6/1999 | Silverbrook |
| 5,914,748 A | 6/1999 | Parulski et al. |
| 5,914,801 A | 6/1999 | Dhuler et al. |
| 5,914,996 A | 6/1999 | Huang |
| 5,915,027 A | 6/1999 | Cox et al. |
| 5,916,358 A | 6/1999 | Bagchi et al. |
| 5,917,542 A | 6/1999 | Moghadam et al. |
| 5,917,545 A | 6/1999 | Kowno et al. |
| 5,917,937 A | 6/1999 | Szeliski et al. |
| 5,917,963 A | 6/1999 | Miyake |
| 5,920,062 A | 7/1999 | Williams |
| 5,920,923 A | 7/1999 | Jillette |
| 5,921,686 A | 7/1999 | Baird et al. |
| 5,923,406 A | 7/1999 | Brasington et al. |
| 5,923,882 A | 7/1999 | Ho et al. |
| 5,924,737 A | 7/1999 | Schrupp |
| 5,929,946 A | 7/1999 | Sharp et al. |
| 5,930,528 A | 7/1999 | Ito et al. |
| 5,931,467 A | 8/1999 | Kamille |
| 5,933,137 A | 8/1999 | Anderson et al. |
| 5,933,179 A | 8/1999 | Fogle et al. |
| 5,937,063 A | 8/1999 | Davis |
| 5,937,089 A | 8/1999 | Kobayashi |
| 5,938,742 A | 8/1999 | Faddell et al. |
| 5,938,766 A | 8/1999 | Anderson et al. |
| 5,939,742 A | 8/1999 | Yiannoulos |
| 5,940,095 A | 8/1999 | Parish et al. |
| 5,946,007 A | 8/1999 | Otsuka et al. |
| 5,946,473 A | 8/1999 | Lotspiech et al. |
| 5,949,426 A | 9/1999 | Rich |
| 5,949,439 A | 9/1999 | Ben-Yoseph et al. |
| 5,949,458 A | 9/1999 | Studholme |
| 5,949,459 A | 9/1999 | Gasvoda et al. |
| 5,949,467 A | 9/1999 | Gunther et al. |
| 5,949,967 A | 9/1999 | Spaulding et al. |
| 5,955,817 A | 9/1999 | Dhuler et al. |
| 5,956,163 A | 9/1999 | Clarke et al. |
| 5,959,943 A | 9/1999 | Yonezawa |
| 5,960,412 A | 9/1999 | Tackbary et al. |
| RE36,338 E | 10/1999 | Fukuoka |
| 5,963,104 A | 10/1999 | Buer |
| 5,964,156 A | 10/1999 | Smith et al. |
| 5,965,871 A | 10/1999 | Zhou et al. |
| 5,966,134 A | 10/1999 | Arias |

(56) References Cited

U.S. PATENT DOCUMENTS

| | | |
|---|---|---|
| 5,966,553 A | 10/1999 | Nishitani et al. |
| 5,969,322 A | 10/1999 | Mori et al. |
| 5,971,533 A | 10/1999 | Kinoshita et al. |
| 5,971,641 A | 10/1999 | Looney |
| 5,973,664 A | 10/1999 | Badger |
| 5,973,733 A | 10/1999 | Gove |
| 5,973,751 A | 10/1999 | Ishida et al. |
| 5,974,168 A | 10/1999 | Rushmeier et al. |
| 5,974,190 A | 10/1999 | Maeda et al. |
| 5,974,234 A | 10/1999 | Levine et al. |
| 5,974,238 A | 10/1999 | Chase, Jr. |
| 5,977,982 A | 11/1999 | Lauzon |
| 5,978,100 A | 11/1999 | Kinjo |
| 5,978,511 A | 11/1999 | Horiuchi et al. |
| 5,978,609 A | 11/1999 | Aoki |
| 5,978,838 A | 11/1999 | Mohamed et al. |
| 5,980,010 A | 11/1999 | Stephenson |
| 5,982,378 A | 11/1999 | Kato |
| 5,982,424 A | 11/1999 | Simerly et al. |
| 5,982,853 A | 11/1999 | Liebermann |
| 5,984,193 A | 11/1999 | Uhling |
| 5,986,634 A | 11/1999 | Alioshin et al. |
| 5,986,671 A | 11/1999 | Fredlund et al. |
| 5,986,698 A | 11/1999 | Nobuoka |
| 5,986,706 A | 11/1999 | Hirasawa |
| 5,986,718 A | 11/1999 | Barwacz et al. |
| 5,988,900 A | 11/1999 | Bobry |
| 5,989,678 A | 11/1999 | Jacobson |
| 5,990,469 A | 11/1999 | Bechtel et al. |
| 5,990,948 A | 11/1999 | Sugiki |
| 5,990,973 A | 11/1999 | Sakamoto |
| 5,991,429 A | 11/1999 | Coffin et al. |
| 5,991,865 A | 11/1999 | Longhenry et al. |
| 5,992,994 A | 11/1999 | Rasmussen et al. |
| 5,995,193 A | 11/1999 | Stephany et al. |
| 5,995,772 A | 11/1999 | Barry et al. |
| 5,996,893 A | 12/1999 | Soscia |
| 5,997,124 A | 12/1999 | Capps et al. |
| 5,999,190 A | 12/1999 | Sheasby et al. |
| 5,999,203 A | 12/1999 | Cane et al. |
| 5,999,697 A | 12/1999 | Murase et al. |
| 6,000,614 A | 12/1999 | Yang et al. |
| 6,000,621 A | 12/1999 | Hecht et al. |
| 6,000,773 A | 12/1999 | Murray et al. |
| 6,000,791 A | 12/1999 | Scheffelin et al. |
| 6,005,582 A | 12/1999 | Gabriel et al. |
| 6,005,613 A | 12/1999 | Endsley et al. |
| 6,006,020 A | 12/1999 | Cutter |
| 6,006,039 A | 12/1999 | Steinberg et al. |
| 6,007,195 A | 12/1999 | Kokubo |
| 6,009,188 A | 12/1999 | Cohen et al. |
| 6,010,065 A | 1/2000 | Ramachandran et al. |
| 6,011,536 A | 1/2000 | Hertzmann et al. |
| 6,011,923 A | 1/2000 | Solomon et al. |
| 6,011,937 A | 1/2000 | Chaussade et al. |
| 6,014,165 A | 1/2000 | McIntyre et al. |
| 6,014,170 A | 1/2000 | Pont et al. |
| 6,014,457 A | 1/2000 | Kubo et al. |
| 6,015,211 A | 1/2000 | Kinoshita et al. |
| 6,016,184 A | 1/2000 | Haneda |
| RE36,589 E | 2/2000 | Akamine et al. |
| 6,019,449 A | 2/2000 | Bullock et al. |
| 6,019,461 A | 2/2000 | Yoshimura et al. |
| 6,019,466 A | 2/2000 | Hermanson |
| 6,020,898 A | 2/2000 | Saito et al. |
| 6,020,920 A | 2/2000 | Anderson |
| 6,020,931 A | 2/2000 | Bilbrey et al. |
| 6,022,099 A | 2/2000 | Chwalek et al. |
| 6,022,274 A | 2/2000 | Takeda et al. |
| 6,023,524 A | 2/2000 | Yamaguchi |
| 6,023,757 A | 2/2000 | Nishimoto et al. |
| 6,028,611 A | 2/2000 | Anderson et al. |
| 6,032,861 A | 3/2000 | Lemelson et al. |
| 6,033,137 A | 3/2000 | Ito |
| 6,034,740 A | 3/2000 | Mitsui et al. |
| 6,035,214 A | 3/2000 | Henderson |
| 6,037,915 A | 3/2000 | Matsueda et al. |
| 6,038,491 A | 3/2000 | McGarry et al. |
| 6,039,430 A | 3/2000 | Helterline et al. |
| 6,040,849 A | 3/2000 | McIntyre et al. |
| 6,042,213 A | 3/2000 | Hayasaki |
| 6,043,821 A | 3/2000 | Sprague et al. |
| 6,044,428 A | 3/2000 | Rayabhari |
| 6,046,768 A | 4/2000 | Kaneda et al. |
| 6,047,130 A | 4/2000 | Oles |
| 6,048,269 A | 4/2000 | Burns et al. |
| 6,049,450 A | 4/2000 | Cho et al. |
| 6,050,669 A | 4/2000 | Yano et al. |
| 6,052,648 A | 4/2000 | Burfeind et al. |
| 6,053,407 A | 4/2000 | Wang et al. |
| 6,056,286 A | 5/2000 | Koga |
| 6,057,850 A | 5/2000 | Kichury |
| 6,058,498 A | 5/2000 | Nagasaki et al. |
| 6,061,179 A | 5/2000 | Inoguchi et al. |
| 6,062,667 A | 5/2000 | Matsui et al. |
| 6,062,681 A | 5/2000 | Field et al. |
| 6,064,492 A | 5/2000 | Eldridge et al. |
| 6,067,088 A * | 5/2000 | Tanioka et al. ............... 345/428 |
| 6,069,642 A | 5/2000 | Isobe |
| 6,072,586 A | 6/2000 | Bhargava et al. |
| 6,073,034 A | 6/2000 | Jacobsen |
| 6,074,042 A | 6/2000 | Gasvoda et al. |
| 6,074,111 A | 6/2000 | Kasahara et al. |
| 6,075,882 A | 6/2000 | Mullins et al. |
| 6,076,913 A | 6/2000 | Garcia et al. |
| 6,078,307 A | 6/2000 | Daly |
| 6,078,758 A | 6/2000 | Patton et al. |
| 6,081,284 A | 6/2000 | Tosaka et al. |
| 6,081,422 A | 6/2000 | Ganthier et al. |
| 6,082,581 A | 7/2000 | Anderson et al. |
| 6,084,713 A | 7/2000 | Rosenthal |
| 6,085,037 A | 7/2000 | Zawodny et al. |
| 6,087,638 A | 7/2000 | Silverbrook |
| 6,088,025 A | 7/2000 | Akamine et al. |
| 6,088,530 A | 7/2000 | Rydelek et al. |
| 6,091,514 A | 7/2000 | Hasegawa et al. |
| 6,091,909 A | 7/2000 | McIntyre et al. |
| 6,094,221 A | 7/2000 | Anderson |
| 6,094,223 A | 7/2000 | Kobayashi |
| 6,094,279 A | 7/2000 | Soscia |
| 6,094,280 A | 7/2000 | Hayasaki et al. |
| 6,094,282 A | 7/2000 | Hoda et al. |
| 6,095,418 A | 8/2000 | Swartz et al. |
| 6,095,566 A | 8/2000 | Yamamoto et al. |
| 6,095,633 A | 8/2000 | Harshbarger et al. |
| 6,097,431 A | 8/2000 | Anderson et al. |
| 6,102,289 A | 8/2000 | Gabrielson |
| 6,102,505 A | 8/2000 | McIntyre et al. |
| 6,104,430 A | 8/2000 | Fukuoka |
| 6,106,147 A | 8/2000 | Silverbrook |
| 6,107,988 A | 8/2000 | Phillipps |
| 6,111,598 A | 8/2000 | Faris |
| 6,111,605 A | 8/2000 | Suzuki |
| 6,115,131 A | 9/2000 | Payne |
| 6,115,137 A | 9/2000 | Ozawa et al. |
| 6,115,837 A | 9/2000 | Nguyen et al. |
| 6,116,510 A | 9/2000 | Nishino |
| 6,116,715 A | 9/2000 | Lefebvre et al. |
| 6,118,484 A | 9/2000 | Yokota et al. |
| 6,118,485 A | 9/2000 | Hinoue et al. |
| 6,118,554 A | 9/2000 | Horaguchi |
| 6,119,931 A | 9/2000 | Novogrod |
| 6,119,944 A | 9/2000 | Mulla et al. |
| 6,120,379 A | 9/2000 | Tanaka et al. |
| 6,121,990 A | 9/2000 | Fujiwara |
| 6,122,403 A | 9/2000 | Rhoads |
| 6,122,526 A | 9/2000 | Parulski et al. |
| 6,123,263 A | 9/2000 | Feng |
| 6,124,892 A | 9/2000 | Nakano |
| 6,126,268 A | 10/2000 | Askeland et al. |
| 6,128,035 A | 10/2000 | Kai et al. |
| 6,128,446 A | 10/2000 | Schrock et al. |
| 6,131,807 A | 10/2000 | Fukuda et al. |
| 6,133,951 A | 10/2000 | Miyadera |

(56) References Cited

U.S. PATENT DOCUMENTS

| | | |
|---|---|---|
| 6,133,954 A | 10/2000 | Jie et al. |
| 6,134,030 A | 10/2000 | Kaneko et al. |
| 6,134,339 A | 10/2000 | Luo |
| 6,134,353 A | 10/2000 | Makram-Ebeid |
| 6,135,586 A | 10/2000 | McClelland et al. |
| 6,136,212 A | 10/2000 | Mastrangelo et al. |
| 6,137,495 A | 10/2000 | Gondek |
| 6,137,509 A | 10/2000 | Hayasaki |
| 6,137,521 A | 10/2000 | Matsui |
| 6,137,525 A | 10/2000 | Lee et al. |
| 6,141,036 A | 10/2000 | Katayama et al. |
| 6,141,431 A | 10/2000 | Munetsugu et al. |
| 6,144,414 A | 11/2000 | Toba |
| 6,145,025 A | 11/2000 | Lim |
| 6,147,682 A | 11/2000 | Kim |
| 6,147,704 A | 11/2000 | Ito et al. |
| 6,149,256 A | 11/2000 | McIntyre et al. |
| 6,151,049 A | 11/2000 | Karita et al. |
| 6,152,374 A | 11/2000 | Moriyama et al. |
| 6,152,619 A | 11/2000 | Silverbrook |
| 6,154,254 A | 11/2000 | Hawkins et al. |
| 6,157,394 A * | 12/2000 | Anderson et al. ............. 345/506 |
| 6,158,907 A | 12/2000 | Silverbrook et al. |
| 6,160,633 A | 12/2000 | Mori |
| 6,160,642 A | 12/2000 | Mui et al. |
| 6,161,203 A | 12/2000 | Zuranski et al. |
| 6,161,915 A | 12/2000 | Bolash et al. |
| 6,163,338 A | 12/2000 | Johnson et al. |
| 6,163,340 A | 12/2000 | Yasuda |
| 6,163,361 A | 12/2000 | McIntyre et al. |
| 6,166,826 A | 12/2000 | Yokoyama |
| 6,166,832 A | 12/2000 | Fujimoto |
| 6,167,551 A | 12/2000 | Nguyen et al. |
| 6,167,806 B1 | 1/2001 | Chretinat et al. |
| 6,169,854 B1 | 1/2001 | Hasegawa et al. |
| 6,170,943 B1 | 1/2001 | Wen et al. |
| 6,172,688 B1 | 1/2001 | Iwasaki |
| 6,172,706 B1 | 1/2001 | Tatsumi |
| 6,177,683 B1 | 1/2001 | Kolesar et al. |
| 6,178,271 B1 | 1/2001 | Maas, III |
| 6,178,883 B1 | 1/2001 | Satoh et al. |
| 6,180,312 B1 | 1/2001 | Edwards |
| 6,181,361 B1 | 1/2001 | Bluteau et al. |
| 6,181,377 B1 | 1/2001 | Kobayashi |
| 6,181,379 B1 | 1/2001 | Kingetsu et al. |
| 6,182,901 B1 | 2/2001 | Hecht et al. |
| 6,188,430 B1 | 2/2001 | Motai |
| 6,188,431 B1 | 2/2001 | Oie |
| 6,191,406 B1 | 2/2001 | Nelson et al. |
| 6,195,513 B1 | 2/2001 | Nihei et al. |
| 6,196,541 B1 | 3/2001 | Silverbrook |
| 6,196,739 B1 | 3/2001 | Silverbrook |
| 6,198,489 B1 | 3/2001 | Salesin et al. |
| 6,199,874 B1 | 3/2001 | Galvin et al. |
| 6,199,969 B1 | 3/2001 | Haflinger et al. |
| 6,200,216 B1 | 3/2001 | Peppel |
| 6,201,571 B1 | 3/2001 | Ota |
| 6,203,147 B1 | 3/2001 | Battey et al. |
| 6,204,877 B1 | 3/2001 | Kiyokawa |
| 6,205,245 B1 | 3/2001 | Yuan et al. |
| 6,211,909 B1 | 4/2001 | Maeshima |
| 6,211,911 B1 | 4/2001 | Komiya et al. |
| 6,213,588 B1 | 4/2001 | Silverbrook |
| 6,215,561 B1 | 4/2001 | Kakutani |
| 6,217,165 B1 | 4/2001 | Silverbrook |
| 6,219,227 B1 | 4/2001 | Trane |
| 6,219,229 B1 | 4/2001 | Lee |
| 6,222,452 B1 | 4/2001 | Ahlstrom et al. |
| 6,222,637 B1 | 4/2001 | Ito et al. |
| 6,226,015 B1 | 5/2001 | Danneels |
| 6,227,643 B1 | 5/2001 | Purcell et al. |
| 6,229,565 B1 | 5/2001 | Bobry |
| 6,229,621 B1 | 5/2001 | Kulakowski et al. |
| 6,231,148 B1 | 5/2001 | Silverbrook |
| 6,232,996 B1 | 5/2001 | Takahashi et al. |
| 6,233,014 B1 | 5/2001 | Ochi et al. |
| 6,234,389 B1 | 5/2001 | Valliani et al. |
| 6,234,392 B1 | 5/2001 | Murakami |
| 6,234,608 B1 | 5/2001 | Genovese et al. |
| 6,236,431 B1 | 5/2001 | Hirasawa et al. |
| 6,236,433 B1 | 5/2001 | Acharya et al. |
| 6,238,033 B1 | 5/2001 | Silverbrook |
| 6,238,043 B1 | 5/2001 | Silverbrook |
| 6,238,044 B1 | 5/2001 | Silverbrook |
| 6,238,111 B1 | 5/2001 | Silverbrook |
| 6,241,350 B1 | 6/2001 | Otsuka et al. |
| 6,241,530 B1 | 6/2001 | Eddy et al. |
| 6,243,131 B1 | 6/2001 | Martin |
| 6,246,827 B1 | 6/2001 | Strolle et al. |
| 6,252,971 B1 | 6/2001 | Wang |
| 6,252,976 B1 | 6/2001 | Schildkraut et al. |
| 6,254,477 B1 | 7/2001 | Sasaki et al. |
| 6,256,666 B1 | 7/2001 | Singhal |
| 6,259,469 B1 | 7/2001 | Ejima et al. |
| 6,260,137 B1 | 7/2001 | Fleck et al. |
| 6,262,769 B1 | 7/2001 | Anderson et al. |
| 6,267,520 B1 | 7/2001 | Unno et al. |
| 6,268,882 B1 | 7/2001 | Elberbaum |
| 6,269,217 B1 | 7/2001 | Rodriguez |
| 6,270,177 B1 | 8/2001 | King et al. |
| 6,270,271 B1 | 8/2001 | Fujiwara |
| 6,273,340 B1 | 8/2001 | Rivailler |
| 6,273,535 B1 | 8/2001 | Inoue et al. |
| 6,275,239 B1 | 8/2001 | Ezer et al. |
| 6,276,850 B1 | 8/2001 | Silverbrook et al. |
| 6,278,481 B1 | 8/2001 | Schmidt |
| 6,278,486 B1 | 8/2001 | Hieda et al. |
| 6,278,491 B1 | 8/2001 | Wang et al. |
| 6,280,106 B1 | 8/2001 | Juan et al. |
| 6,282,082 B1 | 8/2001 | Armitage et al. |
| 6,285,410 B1 | 9/2001 | Marai |
| 6,290,334 B1 | 9/2001 | Ishinaga et al. |
| 6,290,349 B1 | 9/2001 | Silverbrook et al. |
| 6,292,272 B1 | 9/2001 | Okauchi et al. |
| 6,292,574 B1 | 9/2001 | Schildkraut et al. |
| 6,293,469 B1 | 9/2001 | Masson et al. |
| 6,293,658 B1 | 9/2001 | Silverbrook |
| 6,294,101 B1 | 9/2001 | Silverbrook |
| 6,297,872 B1 | 10/2001 | Imamura et al. |
| 6,300,976 B1 | 10/2001 | Fukuoka |
| 6,302,329 B1 | 10/2001 | Iwai et al. |
| 6,304,291 B1 | 10/2001 | Silverbrook |
| 6,304,345 B1 | 10/2001 | Patton et al. |
| 6,304,684 B1 | 10/2001 | Niczyporuk et al. |
| 6,304,825 B1 | 10/2001 | Nowak et al. |
| 6,305,775 B1 | 10/2001 | Ohtsuka et al. |
| 6,312,070 B1 | 11/2001 | Silverbrook |
| 6,312,114 B1 | 11/2001 | Silverbrook |
| 6,315,200 B1 | 11/2001 | Silverbrook |
| 6,315,384 B1 | 11/2001 | Kamaswami et al. |
| 6,317,156 B1 | 11/2001 | Nagasaki et al. |
| 6,317,192 B1 | 11/2001 | Silverbrook et al. |
| 6,318,826 B1 | 11/2001 | Frager et al. |
| 6,320,591 B1 | 11/2001 | Griencewic |
| 6,320,617 B1 | 11/2001 | Gee et al. |
| 6,322,181 B1 | 11/2001 | Silverbrook |
| 6,323,912 B1 | 11/2001 | McIntyre |
| 6,325,380 B1 | 12/2001 | Feigl et al. |
| 6,325,488 B1 | 12/2001 | Beerling et al. |
| 6,328,395 B1 | 12/2001 | Kitahara et al. |
| 6,331,867 B1 | 12/2001 | Eberhard et al. |
| 6,334,587 B1 | 1/2002 | Roder |
| 6,337,712 B1 | 1/2002 | Shiota et al. |
| 6,341,845 B1 | 1/2002 | Scheffelin et al. |
| 6,344,904 B1 | 2/2002 | Mercer |
| 6,353,680 B1 | 3/2002 | Hazra et al. |
| 6,356,276 B1 | 3/2002 | Acharya |
| 6,356,308 B1 | 3/2002 | Havanky |
| 6,356,357 B1 | 3/2002 | Anderson et al. |
| 6,357,865 B1 | 3/2002 | Kubby et al. |
| 6,359,650 B1 | 3/2002 | Murakami |
| 6,362,868 B1 | 3/2002 | Silverbrook |
| 6,363,239 B1 | 3/2002 | Tutt et al. |
| 6,366,319 B1 | 4/2002 | Bills |

(56) References Cited

U.S. PATENT DOCUMENTS

| | | |
|---|---|---|
| 6,366,694 B1 | 4/2002 | Acharya |
| 6,370,558 B1 | 4/2002 | Guttag et al. |
| 6,375,301 B1 | 4/2002 | Childers et al. |
| 6,375,314 B1 | 4/2002 | Reed et al. |
| 6,377,715 B1 | 4/2002 | Fujieda et al. |
| 6,378,997 B1 | 4/2002 | Nitta |
| 6,381,418 B1 | 4/2002 | Spurr et al. |
| 6,386,675 B2 | 5/2002 | Wilson et al. |
| 6,386,772 B1 | 5/2002 | Klinefelter et al. |
| 6,389,183 B1 | 5/2002 | Han |
| 6,390,368 B1 | 5/2002 | Edwards |
| 6,390,589 B1 | 5/2002 | Imanaka et al. |
| 6,392,699 B1 | 5/2002 | Acharya |
| 6,402,308 B1 | 6/2002 | Hattori et al. |
| 6,404,511 B1 | 6/2002 | Lin et al. |
| 6,405,055 B1 | 6/2002 | Silverbrook et al. |
| 6,407,777 B1 | 6/2002 | DeLuca |
| 6,416,152 B1 | 7/2002 | Matsuzaki et al. |
| 6,421,050 B1 | 7/2002 | Ruml et al. |
| 6,425,661 B1 | 7/2002 | Silverbrook et al. |
| 6,431,669 B1 | 8/2002 | Silverbrook |
| 6,431,703 B2 | 8/2002 | Rousseau et al. |
| 6,437,849 B1 | 8/2002 | DeClerck et al. |
| 6,441,921 B1 | 8/2002 | Soscia |
| 6,442,336 B1 | 8/2002 | Lemelson |
| 6,442,525 B1 | 8/2002 | Silverbrook et al. |
| 6,445,417 B1 | 9/2002 | Yoshida et al. |
| 6,454,375 B2 | 9/2002 | Wilson et al. |
| 6,462,835 B1 | 10/2002 | Loushin et al. |
| 6,466,618 B1 | 10/2002 | Messing et al. |
| 6,472,052 B1 | 10/2002 | Silverbrook |
| 6,473,123 B1 | 10/2002 | Anderson |
| 6,473,728 B1 | 10/2002 | Tognazzini |
| 6,489,990 B1 | 12/2002 | Popovich |
| 6,493,029 B1 | 12/2002 | Denyer et al. |
| 6,493,031 B1 | 12/2002 | Washizawa |
| 6,496,654 B1 | 12/2002 | Silverbrook |
| 6,515,761 B2 | 2/2003 | Aoto et al. |
| 6,522,767 B1 | 2/2003 | Moskowitz et al. |
| 6,525,763 B1 | 2/2003 | Maeda |
| 6,526,181 B1 | 2/2003 | Smith et al. |
| 6,529,287 B1 | 3/2003 | Wang et al. |
| 6,529,522 B1 | 3/2003 | Ito et al. |
| 6,530,519 B1 | 3/2003 | Suzuki |
| 6,533,181 B1 | 3/2003 | Roxby et al. |
| 6,539,180 B1 | 3/2003 | King |
| 6,542,622 B1 | 4/2003 | Nelson et al. |
| 6,543,880 B1 | 4/2003 | Akhavain et al. |
| 6,546,187 B1 | 4/2003 | Miyazaki et al. |
| 6,547,364 B2 | 4/2003 | Silverbrook |
| 6,549,575 B1 | 4/2003 | Butter et al. |
| 6,552,743 B1 | 4/2003 | Rissman |
| 6,552,821 B2 | 4/2003 | Suzuki |
| 6,553,459 B1 | 4/2003 | Silverbrook et al. |
| 6,556,245 B1 | 4/2003 | Holmberg |
| 6,563,538 B1 | 5/2003 | Utagawa |
| 6,565,196 B2 | 5/2003 | Matsuo et al. |
| 6,570,616 B1 | 5/2003 | Chen |
| 6,571,021 B1 | 5/2003 | Braudaway |
| 6,573,927 B2 | 6/2003 | Parulski et al. |
| 6,573,932 B1 | 6/2003 | Adams et al. |
| 6,573,936 B2 | 6/2003 | Morris et al. |
| 6,573,939 B1 | 6/2003 | Yokoyama |
| 6,574,363 B1 | 6/2003 | Classen et al. |
| 6,577,818 B2 | 6/2003 | Hirano |
| 6,583,820 B1 | 6/2003 | Hung |
| 6,587,140 B2 | 7/2003 | No |
| 6,593,938 B1 | 7/2003 | Sakata et al. |
| 6,597,384 B1 | 7/2003 | Harrison |
| 6,597,394 B1 | 7/2003 | Duncan et al. |
| 6,597,468 B1 | 7/2003 | Inuiya |
| 6,597,817 B1 | 7/2003 | Silverbrook |
| 6,599,196 B2 | 7/2003 | Kikukawa et al. |
| 6,600,930 B1 | 7/2003 | Sakurai et al. |
| 6,603,864 B1 | 8/2003 | Matsunoshita |
| 6,606,171 B1 | 8/2003 | Renk et al. |
| 6,607,267 B2 | 8/2003 | Testardi et al. |
| 6,608,297 B2 | 8/2003 | Neukermans et al. |
| 6,611,631 B1 | 8/2003 | Blair et al. |
| 6,614,560 B1 | 9/2003 | Silverbrook |
| 6,614,914 B1 | 9/2003 | Rhoads et al. |
| 6,618,091 B1 | 9/2003 | Tamura |
| 6,618,117 B2 | 9/2003 | Silverbrook |
| 6,618,553 B1 | 9/2003 | Shiohara |
| 6,619,774 B1 | 9/2003 | Kawai et al. |
| 6,619,860 B1 | 9/2003 | Simon |
| 6,622,276 B2 | 9/2003 | Nagasaki et al. |
| 6,622,923 B1 | 9/2003 | Walmsley et al. |
| 6,624,848 B1 | 9/2003 | Silverbrook et al. |
| 6,626,529 B1 | 9/2003 | King et al. |
| 6,627,870 B1 | 9/2003 | Lapstun et al. |
| 6,628,326 B1 | 9/2003 | Manico et al. |
| 6,628,333 B1 | 9/2003 | Gowda et al. |
| 6,628,430 B1 | 9/2003 | Silverbrook et al. |
| 6,633,332 B1 | 10/2003 | Nay et al. |
| 6,633,667 B1 | 10/2003 | Matsuoka |
| 6,634,814 B2 | 10/2003 | Spurr et al. |
| 6,636,216 B1 | 10/2003 | Silverbrook et al. |
| 6,636,332 B1 | 10/2003 | Soscia |
| 6,640,004 B2 | 10/2003 | Katayama et al. |
| 6,642,956 B1 | 11/2003 | Safai |
| 6,644,764 B2 | 11/2003 | Stephens, Jr. |
| 6,646,757 B1 | 11/2003 | Silverbrook |
| 6,647,369 B1 | 11/2003 | Silverbrook et al. |
| 6,650,317 B1 | 11/2003 | Boone et al. |
| 6,650,365 B1 | 11/2003 | Sato |
| 6,650,366 B2 | 11/2003 | Parulski et al. |
| 6,650,975 B2 | 11/2003 | Ruffner |
| 6,652,089 B2 | 11/2003 | Silverbrook |
| 6,652,090 B2 | 11/2003 | Silverbrook |
| 6,654,051 B1 | 11/2003 | Fujita et al. |
| 6,654,057 B1 | 11/2003 | Rhodes |
| 6,655,776 B2 | 12/2003 | Murray |
| 6,657,657 B1 | 12/2003 | Sato |
| 6,665,454 B1 | 12/2003 | Silverbrook et al. |
| 6,667,759 B2 | 12/2003 | Gerszberg et al. |
| 6,667,771 B1 | 12/2003 | Kweon |
| 6,670,950 B1 | 12/2003 | Chin et al. |
| 6,670,985 B2 | 12/2003 | Karube et al. |
| 6,678,402 B2 | 1/2004 | Jones et al. |
| 6,680,749 B1 | 1/2004 | Anderson et al. |
| 6,681,055 B1 | 1/2004 | Sato |
| 6,683,996 B1 | 1/2004 | Walmsley |
| 6,686,970 B1 | 2/2004 | Windle |
| 6,687,383 B1 | 2/2004 | Kanevsky et al. |
| 6,688,528 B2 | 2/2004 | Silverbrook |
| 6,688,739 B2 | 2/2004 | Murray |
| 6,690,731 B1 | 2/2004 | Gough et al. |
| 6,690,881 B1 | 2/2004 | Tomita et al. |
| 6,691,922 B2 | 2/2004 | Brooks et al. |
| 6,697,107 B1 | 2/2004 | Hamilton, Jr. et al. |
| 6,697,174 B2 | 2/2004 | Mercer |
| 6,700,619 B1 | 3/2004 | Hamamura |
| 6,701,361 B1 | 3/2004 | Meier |
| 6,702,417 B2 | 3/2004 | Silverbrook |
| 6,704,046 B2 | 3/2004 | Dyas et al. |
| 6,710,892 B2 | 3/2004 | Narushima |
| 6,719,415 B1 | 4/2004 | Hattori |
| 6,726,306 B2 | 4/2004 | Keyes et al. |
| 6,727,948 B1 | 4/2004 | Silverbrook |
| 6,727,951 B1 | 4/2004 | Silverbrook |
| 6,731,952 B2 | 5/2004 | Schaeffer et al. |
| 6,732,924 B2 | 5/2004 | Ishigame et al. |
| 6,736,321 B2 | 5/2004 | Tsikos et al. |
| 6,738,096 B1 | 5/2004 | Silverbrook |
| 6,738,903 B1 | 5/2004 | Haines et al. |
| 6,741,871 B1 | 5/2004 | Silverbrook |
| 6,742,887 B2 | 6/2004 | Ando |
| 6,744,526 B2 | 6/2004 | McDermott et al. |
| 6,745,331 B1 | 6/2004 | Silverbrook |
| 6,749,301 B2 | 6/2004 | Silverbrook et al. |
| 6,750,901 B1 | 6/2004 | Silverbrook |
| 6,750,944 B2 | 6/2004 | Silverbrook et al. |
| 6,760,164 B2 | 7/2004 | Togino |

(56) References Cited

U.S. PATENT DOCUMENTS

| | | |
|---|---|---|
| 6,771,811 B1 | 8/2004 | Walmsley et al. |
| 6,773,874 B2 | 8/2004 | Silverbrook |
| 6,788,336 B1 | 9/2004 | Silverbrook |
| 6,791,605 B1 | 9/2004 | Reele et al. |
| 6,795,651 B2 | 9/2004 | Silverbrook |
| 6,803,989 B2 | 10/2004 | Silverbrook |
| 6,807,315 B1 | 10/2004 | Walmsley et al. |
| 6,812,972 B1 | 11/2004 | Silverbrook et al. |
| 6,820,968 B2 | 11/2004 | Silverbrook |
| 6,823,198 B2 | 11/2004 | Kobayashi |
| 6,824,257 B2 | 11/2004 | Silverbrook |
| 6,831,681 B1 | 12/2004 | Silverbrook |
| 6,835,135 B1 | 12/2004 | Silverbrook et al. |
| 6,837,635 B1 | 1/2005 | Juan |
| 6,847,686 B2 | 1/2005 | Morad |
| 6,847,883 B1 | 1/2005 | Walmsley et al. |
| 6,854,836 B2 | 2/2005 | Ishinaga et al. |
| 6,858,837 B2 | 2/2005 | Tabata |
| 6,859,225 B1 | 2/2005 | Silverbrook et al. |
| 6,867,882 B1 | 3/2005 | Takahashi |
| 6,870,566 B1 | 3/2005 | Koide et al. |
| 6,870,966 B1 | 3/2005 | Silverbrook et al. |
| 6,879,341 B1 | 4/2005 | Silverbrook |
| 6,882,364 B1 | 4/2005 | Inuiya et al. |
| 6,883,910 B2 | 4/2005 | King et al. |
| 6,888,649 B2 | 5/2005 | Suzuki |
| 6,894,794 B1 | 5/2005 | Patton et al. |
| 6,903,766 B1 | 6/2005 | Silverbrook et al. |
| 6,906,778 B2 | 6/2005 | Silverbrook |
| 6,909,456 B1 | 6/2005 | Sasaki |
| 6,913,875 B2 | 7/2005 | Silverbrook |
| 6,914,686 B2 | 7/2005 | Silverbrook et al. |
| 6,915,140 B2 | 7/2005 | Silverbrook |
| 6,918,542 B2 | 7/2005 | Silverbrook et al. |
| 6,918,654 B2 | 7/2005 | Silverbrook |
| 6,924,835 B1 | 8/2005 | Silverbrook et al. |
| 6,942,334 B2 | 9/2005 | Silverbrook et al. |
| 6,948,661 B2 | 9/2005 | Silverbrook et al. |
| 6,951,390 B2 | 10/2005 | King et al. |
| 6,953,235 B2 | 10/2005 | Silverbrook |
| 6,954,254 B2 | 10/2005 | Silverbrook |
| 6,958,207 B1 | 10/2005 | Khusnatdinov et al. |
| RE38,896 E | 11/2005 | Anderson |
| 6,965,691 B2 | 11/2005 | Walmsley et al. |
| 6,967,741 B1 | 11/2005 | Silverbrook et al. |
| 6,967,750 B2 | 11/2005 | Silverbrook |
| 6,975,429 B1 | 12/2005 | Walmsley et al. |
| 6,977,685 B1 | 12/2005 | Acosta-Serafini et al. |
| 6,981,765 B2 | 1/2006 | King et al. |
| 6,981,769 B2 | 1/2006 | Silverbrook |
| 6,985,207 B2 | 1/2006 | Silverbrook |
| 6,995,790 B2 | 2/2006 | Higurashi et al. |
| 6,999,206 B2 | 2/2006 | Silverbrook |
| 7,006,134 B1 | 2/2006 | Arai et al. |
| 7,018,294 B2 | 3/2006 | Silverbrook et al. |
| 7,044,589 B2 | 5/2006 | Silverbrook |
| 7,050,143 B1 | 5/2006 | Silverbrook et al. |
| 7,058,219 B2 | 6/2006 | Walmsley et al. |
| 7,063,408 B2 | 6/2006 | Silverbrook et al. |
| 7,063,940 B2 | 6/2006 | Silverbrook |
| 7,068,308 B2 | 6/2006 | Feldis, III |
| 7,070,270 B2 | 7/2006 | King et al. |
| 7,075,684 B2 | 7/2006 | Silverbrook |
| 7,077,515 B2 | 7/2006 | Silverbrook |
| 7,077,748 B2 | 7/2006 | Silverbrook et al. |
| 7,079,292 B2 | 7/2006 | Silverbrook et al. |
| 7,081,974 B2 | 7/2006 | Silverbrook |
| 7,083,108 B2 | 8/2006 | Silverbrook et al. |
| 7,084,951 B2 | 8/2006 | Silverbrook |
| 7,086,724 B2 | 8/2006 | Silverbrook et al. |
| 7,092,011 B2 | 8/2006 | Silverbrook et al. |
| 7,092,130 B2 | 8/2006 | Silverbrook et al. |
| 7,095,433 B1 | 8/2006 | Touma et al. |
| 7,095,533 B2 | 8/2006 | Silverbrook et al. |
| 7,097,263 B2 | 8/2006 | Silverbrook |
| 7,099,033 B2 | 8/2006 | Silverbrook |
| 7,099,051 B2 | 8/2006 | Silverbrook |
| 7,101,034 B2 | 9/2006 | King et al. |
| 7,108,343 B2 | 9/2006 | King et al. |
| 7,110,024 B1 | 9/2006 | Silverbrook et al. |
| 7,110,139 B2 | 9/2006 | Silverbrook |
| 7,116,355 B1 | 10/2006 | Omura et al. |
| 7,118,481 B2 | 10/2006 | Silverbrook et al. |
| 7,119,836 B2 | 10/2006 | Silverbrook |
| 7,125,337 B2 | 10/2006 | Silverbrook |
| 7,125,338 B2 | 10/2006 | Silverbrook |
| 7,130,075 B2 | 10/2006 | Silverbrook |
| 7,136,186 B2 | 11/2006 | Silverbrook |
| 7,136,198 B2 | 11/2006 | Silverbrook |
| 7,139,025 B1 | 11/2006 | Berezin |
| 7,140,723 B2 | 11/2006 | Silverbrook |
| 7,140,726 B2 | 11/2006 | Silverbrook |
| 7,143,944 B2 | 12/2006 | Lapstun et al. |
| 7,145,689 B2 | 12/2006 | Silverbrook |
| 7,146,179 B2 | 12/2006 | Parulski et al. |
| 7,147,294 B2 | 12/2006 | Silverbrook |
| 7,148,993 B2 | 12/2006 | Silverbrook |
| 7,152,805 B2 | 12/2006 | Walmsley et al. |
| 7,154,580 B2 | 12/2006 | Silverbrook |
| 7,154,626 B2 | 12/2006 | Silverbrook et al. |
| 7,155,394 B2 | 12/2006 | Silverbrook et al. |
| 7,156,512 B2 | 1/2007 | Silverbrook |
| 7,158,258 B2 | 1/2007 | Silverbrook |
| 7,161,709 B2 | 1/2007 | Silverbrook |
| 7,161,715 B2 | 1/2007 | Silverbrook |
| 7,170,652 B2 | 1/2007 | Silverbrook |
| 7,173,729 B2 | 2/2007 | Silverbrook et al. |
| 7,175,097 B2 | 2/2007 | Walmsley et al. |
| 7,177,055 B2 | 2/2007 | Silverbrook |
| 7,185,816 B1 | 3/2007 | Shoobridge |
| 7,186,499 B2 | 3/2007 | Silverbrook |
| 7,187,404 B2 | 3/2007 | Silverbrook et al. |
| 7,193,734 B2 | 3/2007 | Silverbrook et al. |
| 7,201,319 B2 | 4/2007 | Silverbrook et al. |
| 7,227,576 B2 | 6/2007 | Umeyama |
| 7,234,645 B2 | 6/2007 | Silverbrook et al. |
| 7,234,801 B2 | 6/2007 | Silverbrook |
| 7,243,849 B2 | 7/2007 | Lapstun et al. |
| 7,248,376 B2 | 7/2007 | Walmsley et al. |
| 7,249,839 B2 | 7/2007 | King et al. |
| 7,250,975 B2 | 7/2007 | Silverbrook |
| 7,255,646 B2 | 8/2007 | Silverbrook et al. |
| 7,259,772 B2 | 8/2007 | Koh |
| 7,274,455 B2 | 9/2007 | Ok et al. |
| 7,274,485 B2 | 9/2007 | Silverbrook et al. |
| 7,278,723 B2 | 10/2007 | Silverbrook |
| 7,284,843 B2 | 10/2007 | Silverbrook |
| 7,286,182 B2 | 10/2007 | Silverbrook et al. |
| 7,286,260 B2 | 10/2007 | Silverbrook |
| 7,287,706 B2 | 10/2007 | Walmsley et al. |
| 7,291,447 B2 | 11/2007 | Silverbrook |
| 7,296,304 B2 | 11/2007 | Goldsborough |
| 7,301,567 B2 | 11/2007 | Silverbrook et al. |
| 7,310,157 B2 | 12/2007 | Walmsley et al. |
| 7,312,845 B2 | 12/2007 | Silverbrook |
| 7,341,336 B2 | 3/2008 | King et al. |
| 7,357,497 B2 | 4/2008 | Silverbrook et al. |
| 7,369,161 B2 | 5/2008 | Easwar et al. |
| 7,370,947 B2 | 5/2008 | Silverbrook et al. |
| 7,377,706 B2 | 5/2008 | Silverbrook et al. |
| 7,385,639 B2 | 6/2008 | Silverbrook |
| 7,387,573 B2 | 6/2008 | Silverbrook et al. |
| 7,404,633 B2 | 7/2008 | Silverbrook et al. |
| 7,430,067 B2 | 9/2008 | Silverbrook |
| 7,443,434 B2 | 10/2008 | Silverbrook |
| 7,452,048 B2 | 11/2008 | Silverbrook |
| 7,453,492 B2 | 11/2008 | Silverbrook |
| 7,453,586 B2 | 11/2008 | Silverbrook et al. |
| 7,458,676 B2 | 12/2008 | King et al. |
| 7,460,153 B2 | 12/2008 | King et al. |
| 7,460,882 B2 | 12/2008 | Silverbrook |
| 7,466,353 B2 | 12/2008 | Silverbrook et al. |
| 7,466,452 B2 | 12/2008 | Silverbrook et al. |
| 7,468,810 B2 | 12/2008 | Silverbrook |

(56) References Cited

U.S. PATENT DOCUMENTS

| | | |
|---|---|---|
| 7,483,053 B2 | 1/2009 | Silverbrook |
| 7,492,490 B2 | 2/2009 | Silverbrook |
| 7,505,068 B2 | 3/2009 | Silverbrook |
| 7,517,071 B2 | 4/2009 | Silverbrook |
| 7,518,634 B2 | 4/2009 | Silverbrook et al. |
| 7,524,045 B2 | 4/2009 | Silverbrook |
| 7,525,687 B2 | 4/2009 | Silverbrook |
| 7,556,564 B2 | 7/2009 | Silverbrook |
| 7,557,853 B2 | 7/2009 | Silverbrook |
| 7,564,580 B2 | 7/2009 | Silverbrook |
| 7,575,313 B2 | 8/2009 | Silverbrook |
| 7,576,775 B2 | 8/2009 | Silverbrook et al. |
| 7,576,794 B2 | 8/2009 | Silverbrook |
| 7,576,795 B2 | 8/2009 | Silverbrook |
| 7,581,683 B2 | 9/2009 | Walmsley et al. |
| 7,581,826 B2 | 9/2009 | Silverbrook |
| 7,585,067 B2 | 9/2009 | Walmsley |
| 7,588,323 B2 | 9/2009 | King et al. |
| 7,590,347 B2 | 9/2009 | Silverbrook |
| 7,591,547 B2 | 9/2009 | King et al. |
| 7,602,423 B2 | 10/2009 | Silverbrook |
| 7,604,345 B2 | 10/2009 | Silverbrook |
| 7,605,851 B2 | 10/2009 | Silverbrook et al. |
| 7,609,397 B2 | 10/2009 | Lapstun et al. |
| 7,609,410 B2 | 10/2009 | Lapstun et al. |
| 7,612,825 B2 | 11/2009 | Silverbrook et al. |
| 7,621,607 B2 | 11/2009 | Silverbrook |
| 7,629,999 B2 | 12/2009 | Silverbrook |
| 7,631,961 B2 | 12/2009 | Silverbrook et al. |
| 7,633,535 B2 | 12/2009 | Silverbrook |
| 7,637,594 B2 | 12/2009 | Silverbrook et al. |
| 7,646,403 B2 | 1/2010 | Silverbrook et al. |
| 7,654,626 B2 | 2/2010 | Silverbrook et al. |
| 7,664,647 B2 | 2/2010 | Silverbrook et al. |
| 7,665,834 B2 | 2/2010 | Silverbrook |
| 7,688,369 B2 | 3/2010 | Silverbrook et al. |
| 7,690,765 B2 | 4/2010 | Silverbrook |
| 7,695,108 B2 | 4/2010 | Silverbrook |
| 7,701,506 B2 | 4/2010 | Silverbrook |
| 7,703,910 B2 | 4/2010 | Silverbrook |
| 7,705,891 B2 | 4/2010 | Silverbrook |
| 7,724,282 B2 | 5/2010 | Silverbrook |
| 7,742,696 B2 | 6/2010 | Silverbrook |
| 7,750,971 B2 | 7/2010 | Silverbrook |
| 7,753,508 B2 | 7/2010 | Silverbrook |
| 7,758,166 B2 | 7/2010 | Silverbrook |
| 7,773,124 B2 | 8/2010 | Silverbrook et al. |
| 7,773,125 B2 | 8/2010 | Silverbrook et al. |
| 7,784,931 B2 | 8/2010 | King et al. |
| 7,796,166 B2 | 9/2010 | Silverbrook |
| 7,854,500 B2 | 12/2010 | King |
| 7,866,794 B2 | 1/2011 | Silverbrook et al. |
| 7,905,574 B2 | 3/2011 | Silverbrook |
| 7,907,178 B2 | 3/2011 | Silverbrook et al. |
| 7,936,395 B2 | 5/2011 | Silverbrook |
| 7,942,332 B2 | 5/2011 | Silverbrook et al. |
| 7,952,618 B2 | 5/2011 | Kawada |
| 7,957,009 B2 | 6/2011 | Silverbrook |
| 7,961,249 B2 | 6/2011 | Silverbrook |
| 7,965,416 B2 | 6/2011 | Silverbrook |
| 7,970,275 B2 | 6/2011 | Silverbrook |
| 8,020,979 B2 | 9/2011 | Silverbrook |
| 8,098,285 B2 | 1/2012 | Silverbrook |
| 8,274,665 B2 | 9/2012 | Silverbrook |
| 8,328,101 B2 | 12/2012 | Silverbrook et al. |
| 8,421,869 B2 | 4/2013 | Silverbrook et al. |
| 2001/0000172 A1 | 4/2001 | Barrus et al. |
| 2001/0001563 A1 | 5/2001 | Tomaszewski |
| 2001/0007458 A1 | 7/2001 | Purcell et al. |
| 2001/0013890 A1 | 8/2001 | Narayanaswami |
| 2001/0015818 A1 | 8/2001 | Kawanabe et al. |
| 2001/0019561 A1 | 9/2001 | Staats |
| 2001/0020960 A1 | 9/2001 | Ikemoto et al. |
| 2001/0022661 A1 | 9/2001 | Fujimoto et al. |
| 2001/0023523 A1 | 9/2001 | Kubby et al. |
| 2001/0030692 A1 | 10/2001 | Yoneda |
| 2001/0033332 A1 | 10/2001 | Kato et al. |
| 2001/0035887 A1 | 11/2001 | Altfather et al. |
| 2001/0040574 A1 | 11/2001 | Prater |
| 2001/0040625 A1 | 11/2001 | Okada et al. |
| 2001/0040633 A1 | 11/2001 | Yang |
| 2001/0055121 A1 | 12/2001 | Omura et al. |
| 2001/0055983 A1 | 12/2001 | Ohmura et al. |
| 2002/0001032 A1 | 1/2002 | Ohki |
| 2002/0003578 A1 | 1/2002 | Koshiba et al. |
| 2002/0011558 A1 | 1/2002 | Neukermans et al. |
| 2002/0015592 A1 | 2/2002 | Kawamura et al. |
| 2002/0024570 A1 | 2/2002 | Childers et al. |
| 2002/0024603 A1 | 2/2002 | Nakayama et al. |
| 2002/0025079 A1 | 2/2002 | Kuwata et al. |
| 2002/0033854 A1 | 3/2002 | Silverbrook et al. |
| 2002/0047881 A1 | 4/2002 | Lewis et al. |
| 2002/0047904 A1 | 4/2002 | Okada |
| 2002/0050518 A1 | 5/2002 | Roustaei |
| 2002/0054212 A1 | 5/2002 | Fukuoka |
| 2002/0063760 A1 | 5/2002 | Dietl et al. |
| 2002/0071051 A1 | 6/2002 | Ikeda |
| 2002/0071104 A1 | 6/2002 | Silverbrook |
| 2002/0080247 A1 | 6/2002 | Takahashi et al. |
| 2002/0101524 A1 | 8/2002 | Acharya |
| 2002/0135266 A1 | 9/2002 | Boutaghou |
| 2002/0140993 A1 | 10/2002 | Silverbrook et al. |
| 2002/0141750 A1 | 10/2002 | Ludtke et al. |
| 2002/0158135 A1 | 10/2002 | Hsu |
| 2002/0164147 A1 | 11/2002 | Suda |
| 2002/0176009 A1 | 11/2002 | Johnson et al. |
| 2002/0180873 A1 | 12/2002 | Misawa |
| 2002/0180879 A1 | 12/2002 | Shiohara |
| 2003/0001957 A1 | 1/2003 | Kubota |
| 2003/0043273 A1 | 3/2003 | Suzuki |
| 2003/0076551 A1 | 4/2003 | Kawai et al. |
| 2004/0001608 A1 | 1/2004 | Rhoads |
| 2004/0006256 A1 | 1/2004 | Suzuki et al. |
| 2004/0018035 A1 | 1/2004 | Petteruti et al. |
| 2004/0027472 A1 | 2/2004 | Endo et al. |
| 2004/0032501 A1 | 2/2004 | Silverbrook |
| 2004/0032506 A1 | 2/2004 | Silverbrook |
| 2004/0066447 A1 | 4/2004 | Arnold |
| 2004/0070662 A1 | 4/2004 | Shimoda |
| 2004/0090505 A1 | 5/2004 | King et al. |
| 2004/0119827 A1 | 6/2004 | Silverbrook et al. |
| 2004/0125209 A1 | 7/2004 | Silverbrook |
| 2004/0141061 A1 | 7/2004 | Silverbrook |
| 2004/0196350 A1 | 10/2004 | Silverbrook |
| 2004/0201764 A1 | 10/2004 | Honda et al. |
| 2004/0207698 A1 | 10/2004 | Katayama |
| 2004/0252332 A1 | 12/2004 | McCoog et al. |
| 2004/0257446 A1 | 12/2004 | Silverbrook |
| 2005/0030554 A1 | 2/2005 | Dixon et al. |
| 2005/0030568 A1 | 2/2005 | Narushima et al. |
| 2005/0088527 A1 | 4/2005 | Silverbrook |
| 2005/0104941 A1 | 5/2005 | Tanaka |
| 2005/0146613 A1 | 7/2005 | Silverbrook et al. |
| 2005/0179758 A1 | 8/2005 | Campillo et al. |
| 2005/0179781 A1 | 8/2005 | Silverbrook |
| 2005/0270503 A1 | 12/2005 | Silverbrook |
| 2005/0280878 A1 | 12/2005 | Silverbrook |
| 2006/0007261 A1 | 1/2006 | Silverbrook |
| 2006/0056728 A1 | 3/2006 | Silverbrook et al. |
| 2006/0072781 A1 | 4/2006 | Harrington |
| 2006/0098232 A1 | 5/2006 | Nakano et al. |
| 2006/0126102 A1 | 6/2006 | Sakuda |
| 2006/0133738 A1 | 6/2006 | Marcinkiewicz et al. |
| 2006/0197847 A1 | 9/2006 | Johnson et al. |
| 2006/0239676 A1 | 10/2006 | Parulski et al. |
| 2006/0250433 A1 | 11/2006 | Silverbrook et al. |
| 2006/0250438 A1 | 11/2006 | Silverbrook |
| 2006/0250439 A1 | 11/2006 | Silverbrook et al. |
| 2006/0250461 A1 | 11/2006 | Silverbrook et al. |
| 2006/0250469 A1 | 11/2006 | Silverbrook et al. |
| 2006/0250470 A1 | 11/2006 | Lapstun et al. |
| 2006/0250479 A1 | 11/2006 | Silverbrook |
| 2006/0250482 A1 | 11/2006 | Silverbrook |
| 2006/0250484 A1 | 11/2006 | Silverbrook et al. |

(56) References Cited

U.S. PATENT DOCUMENTS

| | | |
|---|---|---|
| 2006/0250489 A1 | 11/2006 | Silverbrook |
| 2006/0252456 A1 | 11/2006 | King et al. |
| 2007/0003168 A1 | 1/2007 | Oliver |
| 2007/0013790 A1 | 1/2007 | Nakase |
| 2007/0021144 A1 | 1/2007 | Atkinson et al. |
| 2007/0024685 A1 | 2/2007 | Silverbrook |
| 2007/0040856 A1 | 2/2007 | Silverbrook |
| 2007/0046754 A1 | 3/2007 | Silverbrook |
| 2007/0070421 A1 | 3/2007 | Silverbrook et al. |
| 2007/0070453 A1 | 3/2007 | Silverbrook |
| 2007/0081187 A1 | 4/2007 | Silverbrook |
| 2007/0099675 A1 | 5/2007 | Silverbrook |
| 2007/0109611 A1 | 5/2007 | Silverbrook |
| 2007/0121177 A1 | 5/2007 | Silverbrook |
| 2008/0002215 A1 | 1/2008 | Silverbrook et al. |
| 2008/0036874 A1 | 2/2008 | Silverbrook et al. |
| 2008/0062232 A1 | 3/2008 | Silverbrook |
| 2008/0068406 A1 | 3/2008 | Silverbrook et al. |
| 2008/0098208 A1 | 4/2008 | Reid et al. |
| 2008/0152414 A1 | 6/2008 | Silverbrook |
| 2008/0204486 A1 | 8/2008 | Silverbrook |
| 2008/0252732 A1 | 10/2008 | Silverbrook |
| 2008/0300015 A1 | 12/2008 | Silverbrook |
| 2009/0015605 A1 | 1/2009 | Silverbrook |
| 2009/0027707 A1 | 1/2009 | Silverbrook et al. |
| 2009/0029731 A1 | 1/2009 | Silverbrook |
| 2009/0029732 A1 | 1/2009 | Silverbrook |
| 2009/0052879 A1 | 2/2009 | Silverbrook |
| 2009/0073231 A1 | 3/2009 | Silverbrook et al. |
| 2009/0075695 A1 | 3/2009 | Silverbrook |
| 2009/0085968 A1 | 4/2009 | Silverbrook et al. |
| 2009/0141291 A1 | 6/2009 | Yumiki et al. |
| 2009/0207208 A1 | 8/2009 | Silverbrook |
| 2009/0244292 A1 | 10/2009 | Silverbrook et al. |
| 2009/0264151 A1 | 10/2009 | Silverbrook |
| 2009/0278944 A1 | 11/2009 | Silverbrook et al. |
| 2009/0291708 A1 | 11/2009 | Silverbrook |
| 2009/0295887 A1 | 12/2009 | King et al. |
| 2010/0002062 A1 | 1/2010 | King et al. |
| 2010/0085471 A1 | 4/2010 | Craven-Bartle |
| 2010/0100706 A1 | 4/2010 | Inoue et al. |
| 2010/0157383 A1 | 6/2010 | Ichikawa et al. |
| 2010/0194923 A1 | 8/2010 | Silverbrook |
| 2011/0211048 A1 | 9/2011 | Silverbrook |
| 2011/0211080 A1 | 9/2011 | Silverbrook |
| 2013/0010076 A1 | 1/2013 | Silverbrook |
| 2013/0010083 A1 | 1/2013 | Silverbrook |
| 2013/0010122 A1 | 1/2013 | Silverbrook |
| 2013/0010126 A1 | 1/2013 | Silverbrook |
| 2013/0010127 A1 | 1/2013 | Silverbrook |
| 2013/0010130 A1 | 1/2013 | Silverbrook |
| 2013/0010131 A1 | 1/2013 | Silverbrook |
| 2013/0010132 A1 | 1/2013 | Silverbrook |
| 2013/0010148 A1 | 1/2013 | Silverbrook |
| 2013/0010149 A1 | 1/2013 | Silverbrook |
| 2013/0010152 A1 | 1/2013 | Silverbrook |
| 2013/0016227 A1 | 1/2013 | Silverbrook |
| 2013/0016228 A1 | 1/2013 | Silverbrook |
| 2013/0016229 A1 | 1/2013 | Silverbrook |
| 2013/0016230 A1 | 1/2013 | Silverbrook |
| 2013/0016231 A1 | 1/2013 | Silverbrook |
| 2013/0016234 A1 | 1/2013 | Silverbrook |
| 2013/0016247 A1 | 1/2013 | Silverbrook |
| 2013/0016265 A1 | 1/2013 | Silverbrook |
| 2013/0016280 A1 | 1/2013 | Silverbrook |
| 2013/0021443 A1 | 1/2013 | Silverbrook |
| 2013/0021444 A1 | 1/2013 | Silverbrook |
| 2013/0021481 A1 | 1/2013 | Silverbrook |
| 2013/0063568 A1 | 3/2013 | Silverbrook |
| 2013/0222617 A1 | 8/2013 | Silverbrook |

FOREIGN PATENT DOCUMENTS

| | | |
|---|---|---|
| AU | 1998-55415 A | 8/1998 |
| CA | 2079534 A1 | 4/1993 |
| DE | 248983 A1 | 8/1987 |
| DE | 4444295 A1 | 6/1996 |
| DE | 19832369 A1 | 1/2000 |
| DE | 10001768 A1 | 8/2000 |
| EP | 0308315 B1 | 3/1989 |
| EP | 0332787 A1 | 9/1989 |
| EP | 0354581 A2 | 2/1990 |
| EP | 0382044 A2 | 8/1990 |
| EP | 0398295 A2 | 11/1990 |
| EP | 0402016 A2 | 12/1990 |
| EP | 0440261 A1 | 2/1991 |
| EP | 0574581 A1 | 3/1991 |
| EP | 0430692 A1 | 6/1991 |
| EP | 0438841 A1 | 7/1991 |
| EP | 0512709 A2 | 11/1992 |
| EP | 0512799 A2 | 11/1992 |
| EP | 520289 A2 | 12/1992 |
| EP | 0568357 A2 | 11/1993 |
| EP | 0408241 B1 | 10/1994 |
| EP | 0650125 A | 4/1995 |
| EP | 0652108 A2 | 5/1995 |
| EP | 0670555 A1 | 9/1995 |
| EP | 0676291 A | 10/1995 |
| EP | 0748697 A1 | 2/1996 |
| EP | 0709825 A | 5/1996 |
| EP | 0720915 A | 7/1996 |
| EP | 725364 A2 | 8/1996 |
| EP | 0732859 A2 | 9/1996 |
| EP | 735420 A1 | 10/1996 |
| EP | 07-55162 A2 | 1/1997 |
| EP | 0755162 A2 | 1/1997 |
| EP | 0761450 A2 | 3/1997 |
| EP | 0763430 A2 | 3/1997 |
| EP | 0763930 A1 | 3/1997 |
| EP | 0771101 A2 | 5/1997 |
| EP | 0771102 A2 | 5/1997 |
| EP | 0779736 A2 | 6/1997 |
| EP | 0782053 A2 | 7/1997 |
| EP | 0822078 A2 | 2/1998 |
| EP | 0825758 A2 | 2/1998 |
| EP | 0848540 A | 6/1998 |
| EP | 0884197 A1 | 12/1998 |
| EP | 0907139 A2 | 4/1999 |
| EP | 0912035 A2 | 4/1999 |
| EP | 0913814 A2 | 5/1999 |
| EP | 0924647 A2 | 6/1999 |
| EP | 0935384 A | 8/1999 |
| EP | 0949804 A2 | 10/1999 |
| EP | 0965451 A2 | 12/1999 |
| EP | 0974924 A | 1/2000 |
| EP | 0978799 A2 | 2/2000 |
| EP | 1039351 A2 | 9/2000 |
| EP | 1080917 A1 | 3/2001 |
| EP | 1129388 A1 | 9/2001 |
| EP | 1289309 A1 | 3/2003 |
| EP | 1389876 A1 | 2/2004 |
| GB | 1520594 A | 8/1978 |
| GB | 1595797 A | 6/1981 |
| GB | 2212481 A | 7/1989 |
| GB | 2228579 A | 8/1990 |
| GB | 2242753 A | 10/1991 |
| GB | 2263841 A | 8/1993 |
| GB | 2299787 A | 10/1996 |
| GB | 2327838 A | 2/1999 |
| GB | 2346110 A | 8/2000 |
| JP | 57-107339 A | 7/1982 |
| JP | 57-208547 A | 12/1983 |
| JP | 59-128144 A | 7/1984 |
| JP | 59-190857 A | 10/1984 |
| JP | 60-096067 A | 5/1985 |
| JP | 60-136480 A | 7/1985 |
| JP | 60-204361 A | 10/1985 |
| JP | 61-129740 A | 6/1986 |
| JP | 62-081164 A | 3/1987 |
| JP | 62-245857 A | 10/1987 |

(56) References Cited

FOREIGN PATENT DOCUMENTS

| | | |
|---|---|---|
| JP | 62-272682 A | 11/1987 |
| JP | 63-046193 A | 2/1988 |
| JP | 63-145071 A | 6/1988 |
| JP | 01-114858 A | 5/1989 |
| JP | 01-148587 A | 6/1989 |
| JP | 01-267254 A | 10/1989 |
| JP | 01-277979 A | 11/1989 |
| JP | 01-292483 A | 11/1989 |
| JP | 02-30543 A | 1/1990 |
| JP | 02-302181 A | 2/1990 |
| JP | 02-096880 A | 4/1990 |
| JP | 02-147527 A | 6/1990 |
| JP | 02-178163 A | 7/1990 |
| JP | 02-188259 A | 7/1990 |
| JP | 02-241760 A | 9/1990 |
| JP | 03-011483 A | 1/1991 |
| JP | 03-14879 A | 1/1991 |
| JP | 03-127341 A | 5/1991 |
| JP | 03-227875 A | 10/1991 |
| JP | 04-001051 A | 1/1992 |
| JP | 04-105113 A | 4/1992 |
| JP | 04-200184 A | 7/1992 |
| JP | 04-200186 A | 7/1992 |
| JP | 04-232084 A | 8/1992 |
| JP | 04-282995 A | 10/1992 |
| JP | 04-286444 A | 10/1992 |
| JP | 05-016377 A | 1/1993 |
| JP | 05-056160 A | 3/1993 |
| JP | 5-064045 A | 3/1993 |
| JP | 05-108278 A | 4/1993 |
| JP | 05-137147 A | 6/1993 |
| JP | 05-201081 A | 8/1993 |
| JP | 05-208773 A | 8/1993 |
| JP | 05-330150 A | 12/1993 |
| JP | 06-37944 A | 2/1994 |
| JP | 06-064160 A | 3/1994 |
| JP | 06-086197 A | 3/1994 |
| JP | 6-103358 | 4/1994 |
| JP | 06-103358 | 4/1994 |
| JP | 06-138588 A | 5/1994 |
| JP | 06-149051 | 5/1994 |
| JP | 06-149051 A | 5/1994 |
| JP | 06-161047 A | 6/1994 |
| JP | 06-183117 A | 7/1994 |
| JP | 06-205147 A | 7/1994 |
| JP | 06-232778 A | 8/1994 |
| JP | 06-238958 A | 8/1994 |
| JP | 07-001874 A | 1/1995 |
| JP | 07-009680 A | 1/1995 |
| JP | 07-315590 A | 2/1995 |
| JP | 07-059107 A | 3/1995 |
| JP | 07-108688 A | 4/1995 |
| JP | 07-108786 A | 4/1995 |
| JP | 07-129762 A | 5/1995 |
| JP | 07-234911 A | 9/1995 |
| JP | 07-254038 A | 10/1995 |
| JP | 07-285250 A | 10/1995 |
| JP | 07-298123 A | 11/1995 |
| JP | 07-307956 A | 11/1995 |
| JP | 08-002754 A | 1/1996 |
| JP | 08-79417 A | 3/1996 |
| JP | 08-90879 A | 4/1996 |
| JP | 08-113990 A | 5/1996 |
| JP | 08-118653 A | 5/1996 |
| JP | 08-129634 A | 5/1996 |
| JP | 08-137882 A | 5/1996 |
| JP | 08-185492 A | 7/1996 |
| JP | 08-216384 A | 8/1996 |
| JP | 08-224730 A | 9/1996 |
| JP | 08-224865 A | 9/1996 |
| JP | 08-249409 A | 9/1996 |
| JP | 08-276600 A | 10/1996 |
| JP | 09-005902 A | 1/1997 |
| JP | 09-008592 A | 1/1997 |
| JP | 09-015766 A | 1/1997 |
| JP | 09-024631 A | 1/1997 |
| JP | 09-300645 A | 1/1997 |
| JP | 09-036941 A | 2/1997 |
| JP | 09-039318 A | 2/1997 |
| JP | 09-058883 A | 3/1997 |
| JP | 09-065182 A | 3/1997 |
| JP | 09-065266 A | 3/1997 |
| JP | 09-069064 | 3/1997 |
| JP | 09-069064 A | 3/1997 |
| JP | 09-071015 | 3/1997 |
| JP | 09-071015 A | 3/1997 |
| JP | 09-076532 A | 3/1997 |
| JP | 09-076584 A | 3/1997 |
| JP | 09-090513 A | 4/1997 |
| JP | 09-113990 A | 5/1997 |
| JP | 9-116843 | 5/1997 |
| JP | 09-116943 | 5/1997 |
| JP | 09-123474 A | 5/1997 |
| JP | 09-135316 A | 5/1997 |
| JP | 09-149311 A | 6/1997 |
| JP | 09-163196 A | 6/1997 |
| JP | 09-187040 | 7/1997 |
| JP | 09-187040 A | 7/1997 |
| JP | 09-187960 A | 7/1997 |
| JP | 09-261382 A | 10/1997 |
| JP | 09-267487 A | 10/1997 |
| JP | 09-314918 A | 12/1997 |
| JP | 09-327906 A | 12/1997 |
| JP | 10-000183 A | 1/1998 |
| JP | 10-294918 A | 1/1998 |
| JP | 10-065780 A | 3/1998 |
| JP | 10-107981 A | 4/1998 |
| JP | 10-112855 A | 4/1998 |
| JP | 10-126728 A | 5/1998 |
| JP | 10-155053 A | 6/1998 |
| JP | 10-164538 A | 6/1998 |
| JP | 10-164602 A | 6/1998 |
| JP | 10-229533 A | 8/1998 |
| JP | 10-235957 A | 9/1998 |
| JP | 10-264479 A | 10/1998 |
| JP | 10-301718 A | 11/1998 |
| JP | 11-122565 A | 4/1999 |
| JP | 11-155053 A | 6/1999 |
| JP | 11-164184 A | 6/1999 |
| JP | 11-164248 A | 6/1999 |
| JP | 11-167173 A | 6/1999 |
| JP | 11-176173 A | 7/1999 |
| JP | 11-187194 A | 7/1999 |
| JP | 11-205517 A | 7/1999 |
| JP | 11-227367 A | 8/1999 |
| JP | 11-243516 A | 9/1999 |
| JP | 11-249233 A | 9/1999 |
| JP | 11-254700 A | 9/1999 |
| JP | 11-275418 A | 10/1999 |
| JP | 11-275501 A | 10/1999 |
| JP | 11-298910 A | 10/1999 |
| JP | 11-317897 A | 11/1999 |
| JP | 2000-099616 A | 4/2000 |
| JP | 2000-141788 A | 5/2000 |
| JP | 2000-158712 A | 6/2000 |
| JP | 2000-158720 | 6/2000 |
| JP | 2000-196931 A | 7/2000 |
| JP | 2000-207512 | 7/2000 |
| JP | 2000-222520 | 8/2000 |
| JP | 2000-284370 | 10/2000 |
| JP | 2001-008153 | 1/2001 |
| JP | 2001-144459 | 5/2001 |
| JP | 2001-169222 | 6/2001 |
| JP | 2002-158135 | 5/2002 |
| KR | 1019930005409 A | 5/1993 |
| KR | 1019960015313 A | 5/1996 |
| KR | 1019960704320 A | 8/1996 |
| KR | 1002270420000 B1 | 10/1999 |
| WO | WO 83/03941 A1 | 11/1983 |
| WO | WO 86/05641 A1 | 9/1986 |
| WO | WO 87/07741 A1 | 12/1987 |
| WO | WO 91/14336 A1 | 9/1991 |
| WO | WO 91/14338 A1 | 9/1991 |
| WO | WO 91/15078 A1 | 10/1991 |

(56) References Cited

FOREIGN PATENT DOCUMENTS

| WO | WO 92/10058 A2 | 6/1992 |
|----|----|----|
| WO | WO 93/04425 A1 | 3/1993 |
| WO | WO 93/16323 A1 | 8/1993 |
| WO | WO 95/02247 A1 | 1/1995 |
| WO | WO 95/16323 | 6/1995 |
| WO | WO 95/16323 A1 | 6/1995 |
| WO | 96/08114 | 3/1996 |
| WO | 9608114 | 3/1996 |
| WO | WO 96/32265 A | 10/1996 |
| WO | WO 96/32265 A1 | 10/1996 |
| WO | WO 96/32274 A1 | 10/1996 |
| WO | WO 96/32278 A1 | 10/1996 |
| WO | WO 96/32281 A2 | 10/1996 |
| WO | WO 96/32808 A1 | 10/1996 |
| WO | WO 96/39301 A1 | 12/1996 |
| WO | WO 97/04353 A1 | 2/1997 |
| WO | WO 97/05738 A1 | 2/1997 |
| WO | WO 97/06958 A | 2/1997 |
| WO | WO 97/06958 A1 | 2/1997 |
| WO | WO 97/32265 A2 | 9/1997 |
| WO | WO 97/50243 A1 | 12/1997 |
| WO | WO 98/18253 A1 | 4/1998 |
| WO | WO 98/30021 A1 | 7/1998 |
| WO | WO 98/48567 A1 | 10/1998 |
| WO | WO 99/04368 A1 | 1/1999 |
| WO | WO 99/04388 A1 | 1/1999 |
| WO | WO 99/04551 A1 | 1/1999 |
| WO | WO 99/50787 A1 | 10/1999 |
| WO | WO 00/23279 A1 | 4/2000 |
| WO | WO 00/28379 A1 | 5/2000 |
| WO | WO 00/71348 A1 | 11/2000 |
| WO | WO 02/35286 A1 | 5/2002 |
| WO | WO 02/093902 A1 | 11/2002 |
| WO | WO 03/095224 A1 | 11/2003 |

OTHER PUBLICATIONS

Laurent Petit and Jean-Didier Legat, "VLIW Processor Architecture Adapted to FPAs", May 1998, SPIE, vol. 3410, 99 128-132.
European Patent Office, Supplementary European Search Report in European Patent Application No. 98933349.7(Oct. 16, 2002).
European Patent Office, Supplementary European Search Report in European Patent Application No. 00929022.2 (Feb. 18, 2005).
European Patent Office, Supplementary European Search Report in European Patent Application No. 00929026.3 (Apr. 2, 2004).
European Patent Office, Supplementary European Search Report in European Patent Application No. 00929024.8 (Dec. 6, 2004).
European Patent Office, Supplementary European Search Report in European Patent Application No. 00929025.5 (Jun. 2, 2004).
European Patent Office, Supplementary European Search Report in European Patent Application No. 00962074.1 (May 9, 2003).
European Patent Office, Supplementary European Search Report in European Patent Application No. 00962075.8 (Jun. 5, 2003).
European Patent Office, Supplementary European Search Report in European Patent Application No. 00967420.1 (May 20, 2003).
European Patent Office, Supplementary European Search Report in European Patent Application No. 00962076.6 (May 8, 2003).
European Patent Office, Supplementary European Search Report in European Patent Application No. 01975879.6 (Jan. 2, 2006).
European Patent Office, Supplementary European Search Report in European Patent Application No. 01977985.9 (Feb. 11, 2005).
European Patent Office, Supplementary European Search Report in European Patent Application No. 98933351.3 (Jun. 12, 2003).
European Patent Office, Supplementary European Search Report in European Patent Application No. 00929017.2 (Mar. 16, 2004).
European Patent Office, Supplementary European Search Report in European Patent Application No. 00929018.0 (Apr. 2, 2004).
European Patent Office, Supplementary European Search Report in European Patent Application No. 00929019.8 (Jul. 4, 2002).
European Patent Office, Supplementary European Search Report in European Patent Application No. 00929020.6 (Jul. 25, 2002).
European Patent Office, Supplementary European Search Report in European Patent Application No. 00929021.4 (Oct. 26, 2004).
European Patent Office, Supplementary European Search Report in European Patent Application No. 00929023.0 (May 27, 2003).
European Patent Office, Supplementary European Search Report in European Patent Application No. 00929028.9 (Apr. 27, 2004).
European Patent Office, Supplementary European Search Report in European Patent Application No. 00929029.7 (Mar. 31, 2004).
European Patent Office, Supplementary European Search Report in European Patent Application No. 00929030.5 (Mar. 24, 2004).
European Patent Office, Supplementary European Search Report in European Patent Application No. 00929031.3 (May 8, 2003).
European Patent Office, Supplementary European Search Report in European Patent Application No. 99957715.8 (Jun. 21, 2006).
Australian Patent Office, International Search Report in International Patent Application No. PCT/AU98/00544 (Sep. 9, 1998).
Australian Patent Office, International Search Report in International Patent Application No. PCT/AU98/00549 (Sep. 9, 1998).
Australian Patent Office, International Search Report in International Patent Application No. PCT/AU99/00985 (Jan. 19, 2000).
Australian Patent Office, International Search Report in International Patent Application No. PCT/AU00/00515 (Aug. 1, 2000).
Australian Patent Office, International Search Report in International Patent Application No. PCT/AU00/00514 (Aug. 3, 2000).
Australian Patent Office, International Search Report in International Patent Application No. PCT/AU00/00513 (Aug. 1, 2000).
Australian Patent Office, International Search Report in International Patent Application No. PCT/AU00/00512 (Aug. 3, 2000).
Australian Patent Office, International Search Report in International Patent Application No. PCT/AU00/00510 (Aug. 18, 2000).
Australian Patent Office, International Search Report in International Patent Application No. PCT/AU00/00509 (Aug. 18, 2000).
Australian Patent Office, International Search Report in International Patent Application No. PCT/AU00/00508 (Aug. 29, 2000).
Australian Patent Office, International Search Report in International Patent Application No. PCT/AU00/00507 (Aug. 3, 2000).
Australian Patent Office, International Search Report in International Patent Application No. PCT/AU00/00506 (Aug. 3, 2000).
Australian Patent Office, International Search Report in International Patent Application No. PCT/AU00/00505 (Aug. 29, 2000).
Australian Patent Office, International Search Report in International Patent Application No. PCT/AU00/00504 (Aug. 3, 2000).
Australian Patent Office, International Search Report in International Patent Application No. PCT/AU00/00503 (Jul. 10, 2000).
Australian Patent Office, International Search Report in International Patent Application No. PCT/AU00/00502 (Jul. 24, 2000).
Australian Patent Office, International Search Report in International Patent Application No. PCT/AU00/00501 (Aug. 3, 2000).
Australian Patent Office, International Search Report in International Patent Application No. PCT/AU00/01076 (Nov. 16, 2000).
Australian Patent Office, International Search Report in International Patent Application No. PCT/AU00/01075 (Nov. 16, 2000).
Australian Patent Office, International Search Report in International Patent Application No. PCT/AU00/01074 (Nov. 20, 2000).
Australian Patent Office, International Search Report in International Patent Application No. PCT/AU00/01073 (Nov. 16, 2000).
Australian Patent Office, International Search Report in International Patent Application No. PCT/AU01/01326 (Dec. 1, 2001).
Australian Patent Office, International Search Report in International Patent Application No. PCT/AU01/01317 (Jan. 8, 2002).
"Suppliers Focus on Teens" Chain Drug Review 22(17): p. 30 Full Text (Oct. 9, 2000).
Biemond et al., "A Fast Kalman Filter for Images Degraded by Both Blur and Noise," SPIE Milestone Series: Selected Papers on Digital Image Restoration 74: 167-165 (Oct. 1983).
Chi, Min-hwa, "Technologies for High Performance CMOS Active Pixel Imaging System-on-a-chip," IEEE, 0-7803-4306-9, pp. 180-183 (Oct. 1998).
Cipra, Barry, "The Ubiquitous Reed-Solomon Codes" Siam News, 26(1) (Jan. 1993).
Connolly et al., "A study of efficiency and accuracy in the transformation from RGB to CIELAB color space," *IEEE Transactions on Image Processing* 6(7): 1046-1048 (Jul. 1997).

(56) References Cited

OTHER PUBLICATIONS

IS&T 46th Annual Conference in Cambridge, Massachusetts "First Impressions: Digital Photography" The Society for Imaging Science and Technology (May 11, 1993).
Curtis et al., "Computer-Generated Watercolor", Proceedings of SIGGRAPH 97, *Computer Graphic Proceedings* pp. 421-430 (1997).
Dunsmore et al., "A low-cost megapixel digital camera using high-performance in-camera image processing" *Proceedings, IS&T's PICS Conference. Annual Conference, Proceedings of Conference for the Society of Imaging Science and Technology* 67-70 (May 17, 1998).
Fisher, Joseph A., "Very Long Instruction Word Architectures and the ELI-512" ACM, International Symposium on Computer Architecture, pp. 140-150 (1983).
Foley et al., Computer Graphics: Principles and Practice, Second Edition, pp. 604-853, 1990.
Fujioka et al., Reconfigurable parallel VLSI processor for dynamic control of intelligent robots, *IEE Proc.—Comput. Digit Tech.*, 143(1): 23-29 (Jan. 1996).
Gonzalez, R.C. and Woods, R.E., "Image Segmentation:Region-Oriented Segmentation" Digital Image Processing, Addison-Wesley Publishing Company, Inc., pp. 458-462 (1992).
Hayat et al., "A Fast Thinning Algorithm Based on Image Compression" IEEE, pp. 2661-2664 (1991).
"HEDR-8000 Series Reflective Optical Surface Mount Encoders Data Sheet," *Avago Technologies* p. 2 (May 2006).
Henrich, D., "Space-efficient Region Filling in Raster Graphics" The Visual Computer: An International Journal of Computer Graphics (1993).
Hsu et al., "Drawing and Animation Using Skeletal Strokes", Proceedings of SIGGRAPH 94, *Computer Graphic Proceedings* pp. 1-9 (1994).
Jaspers, E G T et al., "A Generic 2d Sharpness Enhancement Algorithm for Luminance Signals", Sixth International Conference on Image Processing and Its Applications (Conf. Publ. No. 443), pp. 14-17.( Jul. 1997).
Kasson et al., "Performing Color Space Conversations with Three-Dimensional Linear Interpolation," *Journal of Electronic Imagining* 4(3): 226-249 (Jul. 1, 1995).
Krishnan et al., A Miniture Surface Mount Reflective Optical Shaft Encoder, *Hewlett-Packard Journal* (Dec. 1996).
Litwinowicz, "Processing Images and Video for an Impressionist Effect", Proceedings of SIGGRAPH 97, *Computer Graphic Proceedings* pp. 1-9 (1997).
Liu, N. et al., "Improved Method for Color Image Enhancement Based on Luminance and Color Contrast", Journal of Electronic Imaging, SPIE IS&T, vol. 3, No. 2, 1 pp. 190-197 (Apr. 1994).
Meade, Instruction Manual for Meade 7" LX200 Maksutov-Cassegrain Telescope 8", 10" and 12" LX200 Schmidt-Cassegrain Telescopes, Meade Instruments Corporation, 1-16 (1996).
Ogniewicz, Skeleton-Space: A Multiscale Space Description Combining Region and Boundary Information, IEEE, pp. 746-751(1994).
Ohyama, S., Optical Sheet Memory System, Electronics and Communications in Japan, Part 2, vol. 75, No. 4, (1992).
Ohzu et al., "Behind the Scenes of Virtual Reality: Vision and Motion" Proceedings of the IEEE, Invited Paper, 84(5): pp. 782-798 (May 1996).
Ong et al., "Image Analysis of Tissue Sections" Computers in Biology and Medicine, 26(3): pp. 269-279 (May 1996).
Ostromoukhov et al., "Halftoning by Rotating Non-Bayer Dispersed Dither Arrays",*Procedings of the SPIE—The International Socciety for Optical Engineering*, vol. 2411, pp. 180-197, 1995.
Ostromoukhov et al, Rotated Disperser Dither: a New Technique for Digital Halftoning, *Computer Graphics Proceedings* 123-130 Jul. 24, 1994.
Parulski, K.A. et al., "High-Performance Digital Color Video Camera" Journal of Electronic Imaging, SPIE IS&T, vol. 1, No. 1, pp. 35-45 (1992).

Petit et al., "VLIW Processor Architecture Adapted to FPAs", The International Society for Optical Engineering, 3410(99): pp. 128-132 (May 1998).
"Polaroid Introduces New Single-Use Instant Camera", Newswire, Sep. 16, 1998.
Russ, John C., "Segmentation and Thresholding" The Image Processing Handbook, 2nd Edition, pp. 355-361 (1994).
Sakamoto,T. et al., "Software Pixel Interpolation for Digital Still Cameras Suitable for a 32-Bit MCU", IEEE Transactions on Consumer Electronics 44(4):pp. 1342-1352 (1998).
Salisbury et al., "Interactive Pen-and-Ink Illustration", Proceedings of SIGGRAPH 94, *Computer Graphic Proceedings* pp. 101-108 (1994).
Singh et al., "Object Skeletons From Sparse Shapes in Industrial Image Settings", Proceedings of the 1998 IEEE, pp. 3388-3393 (1998).
Smith et al., "A Single-Chip 306×244-Pixel CMOS NTSC Video Camera," ISSCC98, Session 11, *Image Sensors*, Paper FA 11.2, pp. 170-171 (Feb. 6, 1998).
Sukemura T., "FR500 VLIW_Architecture High-preformance Embedded Microprocessor" *Fujitsu-Scientific and Technical Journal* 36(1): 31-38 (Jun. 2000).
Takovacs, Gregory T.A., "Mechanical Transducers" Micromachined Transducers Sourcebook, pp. 289-293 (1998).
Thorpe et al., "The All-Digital Camcorder—The Arrival of Electronic Cinematography", SMPTE Journal, pp. 13-30 (Jan. 1996).
Topfer, K., Adams, J.E., Keelan B.W., "Modulation Transfer Functions and Aliasing Patterns of CFA Interpolation Algorithms" Proceedings IS&T's Pics Conference. 51st Annual Conference, pp. 367-370, (1998).
Yarmish et al., "Meet the Computer: A Computer System" Assembly Language Fundamentals 360/370 OS/VS DOS/VS, pp. 13-16 (1979).
Texas Instruments, TMS320C80 Parallel Processor (User's Guide), 1995, pp. iii; pp:1-5 and pp:2-8; fig. 2-3 MVP crossbar.
Wawrzynek et al, Spert-11: A Vector Microprocessor System, Mar. 1996, IEEE, pp. 79-86.
United States Patent and Trademark Office, Office Action Issued in U.S. Appl. No. 12/850,627 Mailed Nov. 6, 2013.
United States Patent and Trademark Office, Office Action Issued in U.S. Appl. No. 13/540,613 Mailed Dec. 17, 2013.
United States Patent and Trademark Office, Office Action Issued in U.S. Appl. No. 13/620,917 Mailed Dec. 17, 2013.
United States Patent and Trademark Office, Office Action Issued in U.S. Appl. No. 13/620,924 Mailed Dec. 27, 2013.
United States Patent and Trademark Office, Office Action Issued in U.S. Appl. No. 13/620,971 Mailed Dec. 4, 2013.
United States Patent and Trademark Office, Office Action Issued in U.S. Appl. No. 13/620,977 Mailed Dec. 17, 2013.
United States Patent and Trademark Office, Office Action Issued in U.S. Appl. No. 13/621,026 Mailed Dec. 24, 2013.
United States Patent and Trademark Office, Office Action Issued in U.S. Appl. No. 13/621,040 Mailed Jan. 17, 2014.
United States Patent and Trademark Office, Office Action Issued in U.S. Appl. No. 13/620,872 Mailed Mar. 20, 2014.
United States Patent and Trademark Office, Office Action Issued in U.S. Appl. No. 13/620,933 Mailed Mar. 21, 2014.
United States Patent and Trademark Office, Office Action Issued in U.S. Appl. No. 13/620,939 Mailed Mar. 21, 2014.
United States Patent and Trademark Office, Office Action Issued in U.S. Appl. No. 13/620,918 Mailed Mar. 25, 2014.
United States Patent and Trademark Office, Office Action Issued in U.S. Appl. No. 13/620,832 Mailed Apr. 3, 2014.
United States Patent and Trademark Office, Office Action Issued in U.S. Appl. No. 13/620,971 Mailed Apr. 14, 2014.
United States Patent and Trademark Office, Office Action Issued in U.S. Appl. No. 13/620,857 Mailed Jan. 29, 2014.
United States Patent and Trademark Office, Office Action Issued in U.S. Appl. No. 13/620,969 Mailed Feb. 6, 2014.
United States Patent and Trademark Office, Office Action Issued in U.S. Appl. No. 13/620,861 Mailed Mar. 6, 2014.
Texas Instruments, TMS320C80 (MVP) Video Controller (User's Guide), 1995.

(56) References Cited

OTHER PUBLICATIONS

United States Patent and Trademark Office, Office Action Issued in U.S. Appl. No. 12/114,813 Mailed Apr. 30, 2014.

United States Patent and Trademark Office, Office Action Issued in U.S. Appl. No. 13/621,026 Mailed Jun. 3, 2014.

United States Patent and Trademark Office, Notice of Allowance Issued in Patent Application 13/620,872 Mailed Jun. 6, 2014.

United States Patent and Trademark Office, Office Action Issued in U.S. Appl. No. 13/620,917 Mailed Jun. 17, 2014.

United States Patent and Trademark Office, Office Action Issued in U.S. Appl. No. 13/620,891 Mailed Jun. 18, 2014.

United States Patent and Trademark Office, Office Action Issued in U.S. Appl. No. 13/620,977 Mailed Jul. 7, 2014.

United States Patent and Trademark Office, Office Action Issued in U.S. Appl. No. 13/620,965 Mailed Jul. 18, 2014.

United States Patent and Trademark Office, Office Action Issued in U.S. Appl. No. 13/620,969 Mailed Jul. 23, 2014.

United States Patent and Trademark Office, Office Action Issued in U.S. Appl. No. 13/620,879 Mailed Sep. 12, 2014.

United States Patent and Trademark Office, Office Action Issued in U.S. Appl. No. 13/620,939 Mailed Sep. 12, 2014.

United States Patent and Trademark Office, Office Action Issued in U.S. Appl. No. 13/620,924 Mailed Oct. 10, 2014.

* cited by examiner

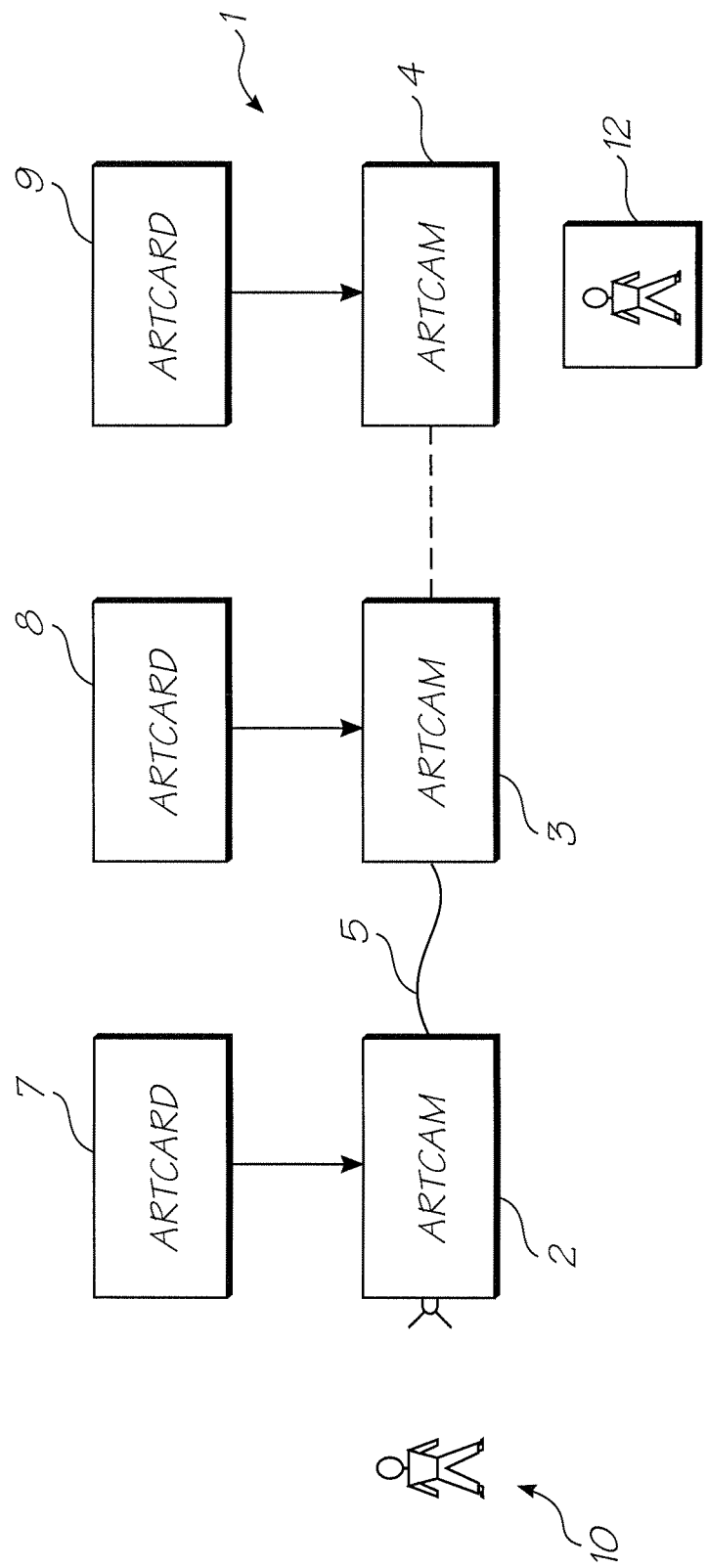

CAMERA SYSTEM TO FACILITATE A CASCADE OF IMAGING EFFECTS

CROSS REFERENCES TO RELATED APPLICATIONS

This application is a continuation application of U.S. patent application Ser. No. 10/666,124 filed Sep. 22, 2003 now U.S. Pat. No. 7,375,746, which itself is a continuation application of U.S. patent Ser. No. 09/112,757 filed Jul. 10, 1998, now issued U.S. Pat. No. 6,624,848, all of which are herein incorporated by reference. With respect to the present application, any disclaimer of claim scope made in the parent application or any predecessor or related application is hereby rescinded. Further, any disclaimer of claim scope that may occur in the present application should not be read back into any predecessor or related application.

The following Australian provisional patent applications are hereby incorporated by cross-reference. For the purposes of location and identification, US patent applications identified by their US patent application serial numbers (USSN) are listed alongside the Australian applications from which the US patent applications claim the right of priority.

| CROSS-REFERENCED AUSTRALIAN PROVISIONAL PATENT APPLICATION NO. | U.S. PAT./PAT. APPLICATION (CLAIMING RIGHT OF PRIORITY FROM AUSTRALIAN PROVISIONAL APPLICATION) |
| --- | --- |
| PO7991 | 6,750,901 |
| PO8505 | 6,476,863 |
| PO7988 | 6,788,336 |
| PO9395 | 6,322,181 |
| PO8017 | 6,597,817 |
| PO8014 | 6,227,648 |
| PO8025 | 6,727,948 |
| PO8032 | 6,690,419 |
| PO7999 | 6,727,951 |
| PO8030 | 6,196,541 |
| PO7997 | 6,195,150 |
| PO7979 | 6,362,868 |
| PO7978 | 6,831,681 |
| PO7982 | 6,431,669 |
| PO7989 | 6,362,869 |
| PO8019 | 6,472,052 |
| PO7980 | 6,356,715 |
| PO8018 | 6,894,694 |
| PO7938 | 6,636,216 |
| PO8016 | 6,366,693 |
| PO8024 | 6,329,990 |
| PO7939 | 6,459,495 |
| PO8501 | 6,137,500 |
| PO8500 | 6,690,416 |
| PO7987 | 7,050,143 |
| PO8022 | 6,398,328 |
| PO8497 | 7,110,024 |
| PO8020 | 6,431,704 |
| PO8504 | 6,879,341 |
| PO8000 | 6,415,054 |
| PO7934 | 6,665,454 |
| PO7990 | 6,542,645 |
| PO8499 | 6,486,886 |
| PO8502 | 6,381,361 |
| PO7981 | 6,317,192 |
| PO7986 | 6,850,274 |
| PO7983 | 09/113,054 |
| PO8026 | 6,646,757 |
| PO8028 | 6,624,848 |
| PO9394 | 6,357,135 |
| PO9397 | 6,271,931 |
| PO9398 | 6,353,772 |
| PO9399 | 6,106,147 |
| PO9400 | 6,665,008 |
| PO9401 | 6,304,291 |
| PO9403 | 6,305,770 |
| PO9405 | 6,289,262 |
| PP0959 | 6,315,200 |
| PP1397 | 6,217,165 |
| PP2370 | 6,786,420 |
| PO8003 | 6,350,023 |
| PO8005 | 6,318,849 |
| PO8066 | 6,227,652 |
| PO8072 | 6,213,588 |
| PO8040 | 6,213,589 |
| PO8071 | 6,231,163 |
| PO8047 | 6,247,795 |
| PO8035 | 6,394,581 |
| PO8044 | 6,244,691 |
| PO8063 | 6,257,704 |
| PO8057 | 6,416,168 |
| PO8056 | 6,220,694 |
| PO8069 | 6,257,705 |
| PO8049 | 6,247,794 |
| PO8036 | 6,234,610 |
| PO8048 | 6,247,793 |
| PO8070 | 6,264,306 |
| PO8067 | 6,241,342 |
| PO8001 | 6,247,792 |
| PO8038 | 6,264,307 |
| PO8033 | 6,254,220 |
| PO8002 | 6,234,611 |
| PO8068 | 6,302,528 |
| PO8062 | 6,283,582 |
| PO8034 | 6,239,821 |
| PO8039 | 6,338,547 |
| PO8041 | 6,247,796 |
| PO8004 | 6,557,977 |
| PO8037 | 6,390,603 |
| PO8043 | 6,362,843 |
| PO8042 | 6,293,653 |
| PO8064 | 6,312,107 |
| PO9389 | 6,227,653 |
| PO9391 | 6,234,609 |
| PP0888 | 6,238,040 |
| PP0891 | 6,188,415 |
| PP0890 | 6,227,654 |
| PP0873 | 6,209,989 |
| PP0993 | 6,247,791 |
| PP0890 | 6,336,710 |
| PP1398 | 6,217,153 |
| PP2592 | 6,416,167 |
| PP2593 | 6,243,113 |
| PP3991 | 6,283,581 |
| PP3987 | 6,247,790 |
| PP3985 | 6,260,953 |
| PP3983 | 6,267,469 |
| PO7935 | 6,224,780 |
| PO7936 | 6,235,212 |
| PO7937 | 6,280,643 |
| PO8061 | 6,284,147 |
| PO8054 | 6,214,244 |
| PO8065 | 6,071,750 |
| PO8055 | 6,267,905 |
| PO8053 | 6,251,298 |
| PO8078 | 6,258,285 |
| PO7933 | 6,225,138 |
| PO7950 | 6,241,904 |
| PO7949 | 6,299,786 |
| PO8060 | 6,866,789 |
| PO8059 | 6,231,773 |
| PO8073 | 6,190,931 |
| PO8076 | 6,248,249 |
| PO8075 | 6,290,862 |
| PO8079 | 6,241,906 |
| PO8050 | 6,565,762 |

-continued

| CROSS-REFERENCED AUSTRALIAN PROVISIONAL PATENT APPLICATION NO. | U.S. PAT./PAT. APPLICATION (CLAIMING RIGHT OF PRIORITY FROM AUSTRALIAN PROVISIONAL APPLICATION) |
|---|---|
| PO8052 | 6,241,905 |
| PO7948 | 6,451,216 |
| PO7951 | 6,231,772 |
| PO8074 | 6,274,056 |
| PO7941 | 6,290,861 |
| PO8077 | 6,248,248 |
| PO8058 | 6,306,671 |
| PO8051 | 6,331,258 |
| PO8045 | 6,110,754 |
| PO7952 | 6,294,101 |
| PO8046 | 6,416,679 |
| PO9390 | 6,264,849 |
| PO9392 | 6,254,793 |
| PP0889 | 6,235,211 |
| PP0887 | 6,491,833 |
| PP0882 | 6,264,850 |
| PP0874 | 6,258,284 |
| PP1396 | 6,312,615 |
| PP3989 | 6,228,668 |
| PP2591 | 6,180,427 |
| PP3990 | 6,171,875 |
| PP3986 | 6,267,904 |
| PP3984 | 6,245,247 |
| PP3982 | 6,315,914 |
| PP0895 | 6,231,148 |
| PP0869 | 6,293,658 |
| PP0887 | 6,614,560 |
| PP0885 | 6,238,033 |
| PP0884 | 6,312,070 |
| PP0886 | 6,238,111 |
| PP0877 | 6,378,970 |
| PP0878 | 6,196,739 |
| PP0883 | 6,270,182 |
| PP0880 | 6,152,619 |
| PO8006 | 6,087,638 |
| PO8007 | 6,340,222 |
| PO8010 | 6,041,600 |
| PO8011 | 6,299,300 |
| PO7947 | 6,067,797 |
| PO7944 | 6,286,935 |
| PO7946 | 6,044,646 |
| PP0894 | 6,382,769 |

STATEMENT REGARDING FEDERALLY SPONSORED RESEARCH OR DEVELOPMENT

Not applicable.

FIELD OF THE INVENTION

The present invention relates to a data processing method and apparatus and, in particular, discloses a Multi Artcam System.

The present invention further relates to the field of image processing and to user interface mechanisms for performing image processing.

BACKGROUND OF THE INVENTION

Recently, in Australia Provisional Patent Specification entitled "Image Processing Method and Apparatus (Art01)" filed concurrently by the present applicant, a system has been proposed known colloquially as "Artcam" which is a digital camera having an integral printer for printing out sensed images in addition to manipulations of the sensed image which are manipulated as a result of the insertion of a "Artcard" having manipulation instructions thereon into the camera.

SUMMARY OF THE INVENTION

It is an object of the present invention to provide for a multi effect system to provide enhanced image effects.

In accordance with the first aspect of the present invention as provided a method of creating a manipulated image comprising interconnecting a series of camera manipulation units, each of said camera manipulation unit applying an image manipulation to an inputted image so as to produce a manipulated output image, an initial one of said camera manipulation units sensing an image from an environment and at least a final one of said camera manipulation units producing a permanent output image.

BRIEF DESCRIPTION OF THE DRAWINGS

Notwithstanding any other forms which may fall within the scope of the present invention, preferred forms of the invention will now be described, by way of example only, with reference to the accompanying drawings which:

FIG. 1 illustrates the form of interconnection of the preferred embodiment.

DESCRIPTION OF PREFERRED AND OTHER EMBODIMENTS

The preferred embodiment is preferable implemented through suitable programming of a hand held camera device such as that described in Australian Provisional Patent Application entitled "Image Processing Method and Apparatus (ART01)" filed concurrently herewith by the present applicant the content of which is hereby specifically incorporated by cross reference.

The aforementioned patent specification discloses a camera system, hereinafter known as an "Artcam" type camera, wherein sensed images can be directly printed out by an Artcam portable camera unit. Further, the aforementioned specification discloses means and methods for performing various manipulations on images captured by the camera sensing device leading to the production of various effects in any output image. The manipulations are disclosed to be highly flexible in nature and can be implemented through the insertion into the Artcam of cards having encoded thereon various instructions for the manipulation of images, the cards hereinafter being known as Artcards. The Artcam further has significant onboard processing power by an Artcam Central Processor unit (ACP) which is interconnected to a memory device for the storage of important data and images.

In the preferred embodiment, multiple Artcams as described in the aforementioned patent specification are interconnected via their USB ports so as to provide a cascading of imaging effects. Through suitable programming of the internal computer portions of each Artcam, a cascading of imaging effects can be achieved.

The preferred arrangement is as illustrated in FIG. 1 wherein a series of Artcams, e.g. 2, 3, 4, are interconnected 5 via their USB ports. Each Artcam 2, 3, 4 is provided with a corresponding Artcard 7, 8, 9 having a suitable image manipulation program stored thereon. Further, the instructions for utilisation in a network environment can be provided on the Artcard 7, 8, 9. The image 10 sensed by the Artcam 2 is then manipulated by the manipulation program on Artcard 7 with the result being forwarded 5 to Artcam device 3 which applies the image manipulation function provided on Artcard 8 producing a corresponding output which is forwarded to the next Artcam in the series. The chained Artcam has been modified so as to have two USB ports for this purpose. The final Artcam 4 applies its Artcard manipulation stored on Artcard 9 for producing output 12 which is a conglomeration of each of the previous image manipulations.

The arrangement 1 on FIG. 1 thereby provides the opportunity to apply multiple effects to a single sensed image. Of course, a number of further refinements are possible. For example, each Artcam could print out its own manipulated image in addition to forwarding the image to the next Artcam in the series. Additionally, splitting of paths where one Artcam outputs to two different downstream Artcams which result in different final images being output could also be provided. Additionally, loops, etc., could be utilised.

It would be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

Ink Jet Technologies

The embodiments of the invention use an ink jet printer type device. Of course many different devices could be used. However presently popular ink jet printing technologies are unlikely to be suitable.

The most significant problem with thermal ink jet is power consumption. This is approximately 100 times that required for high speed, and stems from the energy-inefficient means of drop ejection. This involves the rapid boiling of water to produce a vapor bubble which expels the ink. Water has a very high heat capacity, and must be superheated in thermal ink jet applications. This leads to an efficiency of around 0.02%, from electricity input to drop momentum (and increased surface area) out.

The most significant problem with piezoelectric ink jet is size and cost. Piezoelectric crystals have a very small deflection at reasonable drive voltages, and therefore require a large area for each nozzle. Also, each piezoelectric actuator must be connected to its drive circuit on a separate substrate. This is not a significant problem at the current limit of around 300 nozzles per print head, but is a major impediment to the fabrication of pagewide print heads with 19,200 nozzles.

Ideally, the ink jet technologies used meet the stringent requirements of in-camera digital color printing and other high quality, high speed, low cost printing applications. To meet the requirements of digital photography, new ink jet technologies have been created. The target features include:
    low power (less than 10 Watts)
    high resolution capability (1,600 dpi or more)
    photographic quality output
    low manufacturing cost
    small size (pagewidth times minimum cross section)
    high speed (<2 seconds per page).

All of these features can be met or exceeded by the ink jet systems described below with differing levels of difficulty. 45 different ink jet technologies have been developed by the Assignee to give a wide range of choices for high volume manufacture. These technologies form part of separate applications assigned to the present Assignee as set out in the table below.

The ink jet designs shown here are suitable for a wide range of digital printing systems, from battery powered one-time use digital cameras, through to desktop and network printers, and through to commercial printing systems For ease of manufacture using standard process equipment, the print head is designed to be a monolithic 0.5 micron CMOS chip with MEMS post processing. For color photographic applications, the print head is 100 mm long, with a width which depends upon the ink jet type. The smallest print head designed is IJ38, which is 0.35 mm wide, giving a chip area of 35 square mm. The print heads each contain 19,200 nozzles plus data and control circuitry.

Ink is supplied to the back of the print head by injection molded plastic ink channels. The molding requires 50 micron features, which can be created using a lithographically micromachined insert in a standard injection molding tool. Ink flows through holes etched through the wafer to the nozzle chambers fabricated on the front surface of the wafer. The print head is connected to the camera circuitry by tape automated bonding.

Tables of Drop-on-Demand Ink Jets

Eleven important characteristics of the fundamental operation of individual ink jet nozzles have been identified. These characteristics are largely orthogonal, and so can be elucidated as an eleven dimensional matrix. Most of the eleven axes of this matrix include entries developed by the present assignee.

The following tables form the axes of an eleven dimensional table of ink jet types.
    Actuator mechanism (18 types)
    Basic operation mode (7 types)
    Auxiliary mechanism (8 types)
    Actuator amplification or modification method (17 types)
    Actuator motion (19 types)
    Nozzle refill method (4 types)
    Method of restricting back-flow through inlet (10 types)
    Nozzle clearing method (9 types)
    Nozzle plate construction (9 types)
    Drop ejection direction (5 types)
    Ink type (7 types)

The complete eleven dimensional table represented by these axes contains 36.9 billion possible configurations of ink jet nozzle. While not all of the possible combinations result in a viable ink jet technology, many million configurations are viable. It is clearly impractical to elucidate all of the possible configurations. Instead, certain ink jet types have been investigated in detail. These are designated IJ01 to IJ45 above.

Other ink jet configurations can readily be derived from these 45 examples by substituting alternative configurations along one or more of the 11 axes. Most of the IJ01 to IJ45 examples can be made into ink jet print heads with characteristics superior to any currently available ink jet technology.

Where there are prior art examples known to the inventor, one or more of these examples are listed in the examples column of the tables below. The IJ01 to IJ45 series are also listed in the examples column. In some cases, a printer may be listed more than once in a table, where it shares characteristics with more than one entry.

Suitable applications for the ink jet technologies include: Home printers, Office network printers, Short run digital printers, Commercial print systems, Fabric printers, Pocket printers, Internet WWW printers, Video printers, Medical imaging, Wide format printers, Notebook PC printers, Fax machines, Industrial printing systems, Photocopiers, Photographic minilabs etc.

The information associated with the aforementioned 11 dimensional matrix are set out in the following tables.

| | ACTUATOR MECHANISM (APPLIED ONLY TO SELECTED INK DROPS) | | | |
|---|---|---|---|---|
| | Description | Advantages | Disadvantages | Examples |
| Thermal bubble | An electrothermal heater heats the ink to above boiling point, transferring significant heat to the aqueous ink. A bubble nucleates and quickly forms, expelling the ink. The efficiency of the process is low, with typically less than 0.05% of the electrical energy being transformed into kinetic energy of the drop. | Large force generated Simple construction No moving parts Fast operation Small chip area required for actuator | High power Ink carrier limited to water Low efficiency High temperatures required High mechanical stress Unusual materials required Large drive transistors Cavitation causes actuator failure Kogation reduces bubble formation Large print heads are difficult to fabricate | Canon Bubblejet 1979 Endo et al GB patent 2,007,162 Xerox heater-in-pit 1990 Hawkins et al U.S. Pat. No. 4,899,181 Hewlett-Packard TIJ 1982 Vaught et al U.S. Pat. No. 4,490,728 |
| Piezoelectric | A piezoelectric crystal such as lead lanthanum zirconate (PZT) is electrically activated, and either expands, shears, or bends to apply pressure to the ink, ejecting drops. | Low power consumption Many ink types can be used Fast operation High efficiency | Very large area required for actuator Difficult to integrate with electronics High voltage drive transistors required Full pagewidth print heads impractical due to actuator size Requires electrical poling in high field strengths during manufacture | Kyser et al U.S. Pat. No. 3,946,398 Zoltan U.S. Pat. No. 3,683,212 1973 Stemme U.S. Pat. No. 3,747,120 Epson Stylus Tektronix IJ04 |
| Electro-strictive | An electric field is used to activate electrostriction in relaxor materials such as lead lanthanum zirconate titanate (PLZT) or lead magnesium niobate (PMN). | Low power consumption Many ink types can be used Low thermal expansion Electric field strength required (approx. 3.5 V/μm) can be generated without difficulty Does not require electrical poling | Low maximum strain (approx. 0.01%) Large area required for actuator due to low strain Response speed is marginal (~10 μs) High voltage drive transistors required Full pagewidth print heads impractical due to actuator size | Seiko Epson, Usui et all JP 253401/96 IJ04 |
| Ferroelectric | An electric field is used to induce a phase transition between the antiferroelectric (AFE) and ferroelectric (FE) phase. Perovskite materials such as tin modified lead lanthanum zirconate titanate | Low power consumption Many ink types can be used Fast operation (<1 μs) Relatively high longitudinal strain High efficiency | Difficult to integrate with electronics Unusual materials such as PLZSnT are required Actuators require a large area | IJ04 |

-continued

| | ACTUATOR MECHANISM (APPLIED ONLY TO SELECTED INK DROPS) | | | |
|---|---|---|---|---|
| | Description | Advantages | Disadvantages | Examples |
| | (PLZSnT) exhibit large strains of up to 1% associated with the AFE to FE phase transition. | Electric field strength of around 3 V/μm can be readily provided | | |
| Electrostatic plates | Conductive plates are separated by a compressible or fluid dielectric (usually air). Upon application of a voltage, the plates attract each other and displace ink, causing drop ejection. The conductive plates may be in a comb or honeycomb structure, or stacked to increase the surface area and therefore the force. | Low power consumption Many ink types can be used Fast operation | Difficult to operate electrostatic devices in an aqueous environment The electrostatic actuator will normally need to be separated from the ink Very large area required to achieve high forces High voltage drive transistors may be required Full pagewidth print heads are not competitive due to actuator size | IJ02, IJ04 |
| Electrostatic pull on ink | A strong electric field is applied to the ink, whereupon electrostatic attraction accelerates the ink towards the print medium. | Low current consumption Low temperature | High voltage required May be damaged by sparks due to air breakdown Required field strength increases as the drop size decreases High voltage drive transistors required Electrostatic field attracts dust | 1989 Saito et al, U.S. Pat. No. 4,799,068 1989 Miura et al, U.S. Pat. No. 4,810,954 Tone-jet |
| Permanent magnet electro- magnetic | An electromagnet directly attracts a permanent magnet, displacing ink and causing drop ejection. Rare earth magnets with a field strength around 1 Tesla can be used. Examples are: Samarium Cobalt (SaCo) and magnetic materials in the neodymium iron boron family (NdFeB, NdDyFeBNb, NdDyFeB, etc) | Low power consumption Many ink types can be used Fast operation High efficiency Easy extension from single nozzles to pagewidth print heads | Complex fabrication Permanent magnetic material such as Neodymium Iron Boron (NdFeB) required. High local currents required Copper metalization should be used for long electromigration lifetime and low resistivity Pigmented inks are usually infeasible Operating temperature limited to the Curie temperature (around 540 K) | IJ07, IJ10 |

-continued

| | ACTUATOR MECHANISM (APPLIED ONLY TO SELECTED INK DROPS) | | | |
|---|---|---|---|---|
| | Description | Advantages | Disadvantages | Examples |
| Soft magnetic core electro-magnetic | A solenoid induced a magnetic field in a soft magnetic core or yoke fabricated from a ferrous material such as electroplated iron alloys such as CoNiFe [1], CoFe, or NiFe alloys. Typically, the soft magnetic material is in two parts, which are normally held apart by a spring. When the solenoid is actuated, the two parts attract, displacing the ink. | Low power consumption Many ink types can be used Fast operation High efficiency Easy extension from single nozzles to pagewidth print heads | Complex fabrication Materials not usually present in a CMOS fab such as NiFe, CoNiFe, or CoFe are required High local currents required Copper metalization should be used for long electromigration lifetime and low resistivity Electroplating is required High saturation flux density is required (2.0-2.1 T is achievable with CoNiFe [1]) | IJ01, IJ05, IJ08, IJ10, IJ12, IJ14, IJ15, IJ17 |
| Lorenz force | The Lorenz force acting on a current carrying wire in a magnetic field is utilized. This allows the magnetic field to be supplied externally to the print head, for example with rare earth permanent magnets. Only the current carrying wire need be fabricated on the print-head, simplifying materials requirements. | Low power consumption Many ink types can be used Fast operation High efficiency Easy extension from single nozzles to pagewidth print heads | Force acts as a twisting motion Typically, only a quarter of the solenoid length provides force in a useful direction High local currents required Copper metalization should be used for long electromigration lifetime and low resistivity Pigmented inks are usually infeasible | IJ06, IJ11, IJ13, IJ16 |
| Magneto-striction | The actuator uses the giant magnetostrictive effect of materials such as Terfenol-D (an alloy of terbium, dysprosium and iron developed at the Naval Ordnance Laboratory, hence Ter-Fe-NOL). For best efficiency, the actuator should be pre-stressed to approx. 8 MPa. | Many ink types can be used Fast operation Easy extension from single nozzles to pagewidth print heads High force is available | Force acts as a twisting motion Unusual materials such as Terfenol-D are required High local currents required Copper metalization should be used for long electromigration lifetime and low resistivity Pre-stressing may be required | Fischenbeck, U.S. Pat. No. 4,032,929 IJ25 |
| Surface tension reduction | Ink under positive pressure is held in a nozzle by surface tension. The surface tension of the ink is reduced below the bubble threshold, causing | Low power consumption Simple construction No unusual materials required in fabrication | Requires supplementary force to effect drop separation Requires special ink surfactants Speed may | Silverbrook, EP 0771 658 A2 and related patent applications |

ACTUATOR MECHANISM (APPLIED ONLY TO SELECTED INK DROPS)

| | Description | Advantages | Disadvantages | Examples |
|---|---|---|---|---|
| | the ink to egress from the nozzle. | High efficiency Easy extension from single nozzles to pagewidth print heads | be limited by surfactant properties | |
| Viscosity reduction | The ink viscosity is locally reduced to select which drops are to be ejected. A viscosity reduction can be achieved electrothermally with most inks, but special inks can be engineered for a 100:1 viscosity reduction. | Simple construction No unusual materials required in fabrication Easy extension from single nozzles to pagewidth print heads | Requires supplementary force to effect drop separation Requires special ink viscosity properties High speed is difficult to achieve Requires oscillating ink pressure A high temperature difference (typically 80 degrees) is required | Silverbrook, EP 0771 658 A2 and related patent applications |
| Acoustic | An acoustic wave is generated and focussed upon the drop ejection region. | Can operate without a nozzle plate | Complex drive circuitry Complex fabrication Low efficiency Poor control of drop position Poor control of drop volume | 1993 Hadimioglu et al, EUP 550,192 1993 Elrod et al, EUP 572,220 |
| Thermo-elastic bend actuator | An actuator which relies upon differential thermal expansion upon Joule heating is used. | Low power consumption Many ink types can be used Simple planar fabrication Small chip area required for each actuator Fast operation High efficiency CMOS compatible voltages and currents Standard MEMS processes can be used Easy extension from single nozzles to pagewidth print heads | Efficient aqueous operation requires a thermal insulator on the hot side Corrosion prevention can be difficult Pigmented inks may be infeasible, as pigment particles may jam the bend actuator | IJ03, IJ09, IJ17, IJ18, IJ19, IJ20, IJ21, IJ22, IJ23, IJ24, IJ27, IJ28, IJ29, IJ30, IJ31, IJ32, IJ33, IJ34, IJ35, IJ36, IJ37, IJ38, IJ39, IJ40, IJ41 |
| High CTE thermo-elastic actuator | A material with a very high coefficient of thermal expansion (CTE) such as polytetrafluoroethylene (PTFE) is used. As high CTE materials are usually non- | High force can be generated Three methods of PTFE deposition are under development: chemical vapor deposition (CVD), spin | Requires special material (e.g. PTFE) Requires a PTFE deposition process, which is not yet standard in ULSI fabs PTFE deposition | IJ09, IJ17, IJ18, IJ20, IJ21, IJ22, IJ23, IJ24, IJ27, IJ28, IJ29, IJ30, IJ31, IJ42, IJ43, IJ44 |

-continued

| | Description | Advantages | Disadvantages | Examples |
|---|---|---|---|---|
| | ACTUATOR MECHANISM (APPLIED ONLY TO SELECTED INK DROPS) | | | |
| | conductive, a heater fabricated from a conductive material is incorporated. A 50 μm long PTFE bend actuator with polysilicon heater and 15 mW power input can provide 180 μN force and 10 μm deflection. Actuator motions include: Bend Push Buckle Rotate | coating, and evaporation PTFE is a candidate for low dielectric constant insulation in ULSI Very low power consumption Many ink types can be used Simple planar fabrication Small chip area required for each actuator Fast operation High efficiency CMOS compatible voltages and currents Easy extension from single nozzles to pagewidth print heads | cannot be followed with high temperature (above 350° C.) processing Pigmented inks may be infeasible, as pigment particles may jam the bend actuator | |
| Conductive polymer thermoelastic actuator | A polymer with a high coefficient of thermal expansion (such as PTFE) is doped with conducting substances to increase its conductivity to about 3 orders of magnitude below that of copper. The conducting polymer expands when resistively heated. Examples of conducting dopants include: Carbon nanotubes Metal fibers Conductive polymers such as doped polythiophene Carbon granules | High force can be generated Very low power consumption Many ink types can be used Simple planar fabrication Small chip area required for each actuator Fast operation High efficiency CMOS compatible voltages and currents Easy extension from single nozzles to pagewidth print heads | Requires special materials development (High CTE conductive polymer) Requires a PTFE deposition process, which is not yet standard in ULSI fabs PTFE deposition cannot be followed with high temperature (above 350° C.) processing Evaporation and CVD deposition techniques cannot be used Pigmented inks may be infeasible, as pigment particles may jam the bend actuator | IJ24 |
| Shape memory alloy | A shape memory alloy such as TiNi (also known as Nitinol—Nickel Titanium alloy developed at the Naval Ordnance Laboratory) is thermally switched between its weak martensitic state and its high stiffness austenic | High force is available (stresses of hundreds of MPa) Large strain is available (more than 3%) High corrosion resistance Simple construction | Fatigue limits maximum number of cycles Low strain (1%) is required to extend fatigue resistance Cycle rate limited by heat removal Requires unusual materials (TiNi) | IJ26 |

ACTUATOR MECHANISM (APPLIED ONLY TO SELECTED INK DROPS)

|  | Description | Advantages | Disadvantages | Examples |
|---|---|---|---|---|
|  | state. The shape of the actuator in its martensitic state is deformed relative to the austenic shape. The shape change causes ejection of a drop. | Easy extension from single nozzles to pagewidth print heads Low voltage operation | The latent heat of transformation must be provided High current operation Requires pre-stressing to distort the martensitic state |  |
| Linear Magnetic Actuator | Linear magnetic actuators include the Linear Induction Actuator (LIA), Linear Permanent Magnet Synchronous Actuator (LPMSA), Linear Reluctance Synchronous Actuator (LRSA), Linear Switched Reluctance Actuator (LSRA), and the Linear Stepper Actuator (LSA). | Linear Magnetic actuators can be constructed with high thrust, long travel, and high efficiency using planar semiconductor fabrication techniques Long actuator travel is available Medium force is available Low voltage operation | Requires unusual semiconductor materials such as soft magnetic alloys (e.g. CoNiFe) Some varieties also require permanent magnetic materials such as Neodymium iron boron (NdFeB) Requires complex multi-phase drive circuitry High current operation | IJ12 |

BASIC OPERATION MODE

|  | Description | Advantages | Disadvantages | Examples |
|---|---|---|---|---|
| Actuator directly pushes ink | This is the simplest mode of operation: the actuator directly supplies sufficient kinetic energy to expel the drop. The drop must have a sufficient velocity to overcome the surface tension. | Simple operation No external fields required Satellite drops can be avoided if drop velocity is less than 4 m/s Can be efficient, depending upon the actuator used | Drop repetition rate is usually limited to around 10 kHz. However, this is not fundamental to the method, but is related to the refill method normally used All of the drop kinetic energy must be provided by the actuator Satellite drops usually form if drop velocity is greater than 4.5 m/s | Thermal ink jet Piezoelectric ink jet IJ01, IJ02, IJ03, IJ04, IJ05, IJ06, IJ07, IJ09, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Proximity | The drops to be printed are selected by some manner (e.g. thermally induced surface tension reduction of pressurized ink). Selected drops are separated from the ink in the nozzle by contact with the print medium or a transfer roller. | Very simple print head fabrication can be used The drop selection means does not need to provide the energy required to separate the drop from the nozzle | Requires close proximity between the print head and the print media or transfer roller May require two print heads printing alternate rows of the image Monolithic color print heads are difficult | Silverbrook, EP 0771 658 A2 and related patent applications |

BASIC OPERATION MODE

| | Description | Advantages | Disadvantages | Examples |
|---|---|---|---|---|
| Electrostatic pull on ink | The drops to be printed are selected by some manner (e.g. thermally induced surface tension reduction of pressurized ink). Selected drops are separated from the ink in the nozzle by a strong electric field. | Very simple print head fabrication can be used The drop selection means does not need to provide the energy required to separate the drop from the nozzle | Requires very high electrostatic field Electrostatic field for small nozzle sizes is above air breakdown Electrostatic field may attract dust | Silverbrook, EP 0771 658 A2 and related patent applications Tone-Jet |
| Magnetic pull on ink | The drops to be printed are selected by some manner (e.g. thermally induced surface tension reduction of pressurized ink). Selected drops are separated from the ink in the nozzle by a strong magnetic field acting on the magnetic ink. | Very simple print head fabrication can be used The drop selection means does not need to provide the energy required to separate the drop from the nozzle | Requires magnetic ink Ink colors other than black are difficult Requires very high magnetic fields | Silverbrook, EP 0771 658 A2 and related patent applications |
| Shutter | The actuator moves a shutter to block ink flow to the nozzle. The ink pressure is pulsed at a multiple of the drop ejection frequency. | High speed (>50 kHz) operation can be achieved due to reduced refill time Drop timing can be very accurate The actuator energy can be very low | Moving parts are required Requires ink pressure modulator Friction and wear must be considered Stiction is possible | IJ13, IJ17, IJ21 |
| Shuttered grill | The actuator moves a shutter to block ink flow through a grill to the nozzle. The shutter movement need only be equal to the width of the grill holes. | Actuators with small travel can be used Actuators with small force can be used High speed (>50 kHz) operation can be achieved | Moving parts are required Requires ink pressure modulator Friction and wear must be considered Stiction is possible | IJ08, IJ15, IJ18, IJ19 |
| Pulsed magnetic pull on ink pusher | A pulsed magnetic field attracts an 'ink pusher' at the drop ejection frequency. An actuator controls a catch, which prevents the ink pusher from moving when a drop is not to be ejected. | Extremely low energy operation is possible No heat dissipation problems | Requires an external pulsed magnetic field Requires special materials for both the actuator and the ink pusher Complex construction | IJ10 |

AUXILIARY MECHANISM (APPLIED TO ALL NOZZLES)

| | Description | Advantages | Disadvantages | Examples |
|---|---|---|---|---|
| None | The actuator directly fires the ink drop, and there is no external field | Simplicity of construction Simplicity of operation | Drop ejection energy must be supplied by individual | Most ink jets, including piezoelectric and thermal bubble. |

AUXILIARY MECHANISM (APPLIED TO ALL NOZZLES)

| | Description | Advantages | Disadvantages | Examples |
|---|---|---|---|---|
| | or other mechanism required. | Small physical size | nozzle actuator | IJ01, IJ02, IJ03, IJ04, IJ05, IJ07, IJ09, IJ11, IJ12, IJ14, IJ20, IJ22, IJ23, IJ24, IJ25, IJ26, IJ27, IJ28, IJ29, IJ30, IJ31, IJ32, IJ33, IJ34, IJ35, IJ36, IJ37, IJ38, IJ39, IJ40, IJ41, IJ42, IJ43, IJ44 |
| Oscillating ink pressure (including acoustic stimulation) | The ink pressure oscillates, providing much of the drop ejection energy. The actuator selects which drops are to be fired by selectively blocking or enabling nozzles. The ink pressure oscillation may be achieved by vibrating the print head, or preferably by an actuator in the ink supply. | Oscillating ink pressure can provide a refill pulse, allowing higher operating speed The actuators may operate with much lower energy Acoustic lenses can be used to focus the sound on the nozzles | Requires external ink pressure oscillator Ink pressure phase and amplitude must be carefully controlled Acoustic reflections in the ink chamber must be designed for | Silverbrook, EP 0771 658 A2 and related patent applications IJ08, IJ13, IJ15, IJ17, IJ18, IJ19, IJ21 |
| Media proximity | The print head is placed in close proximity to the print medium. Selected drops protrude from the print head further than unselected drops, and contact the print medium. The drop soaks into the medium fast enough to cause drop separation. | Low power High accuracy Simple print head construction | Precision assembly required Paper fibers may cause problems Cannot print on rough substrates | Silverbrook, EP 0771 658 A2 and related patent applications |
| Transfer roller | Drops are printed to a transfer roller instead of straight to the print medium. A transfer roller can also be used for proximity drop separation. | High accuracy Wide range of print substrates can be used Ink can be dried on the transfer roller | Bulky Expensive Complex construction | Silverbrook, EP 0771 658 A2 and related patent applications Tektronix hot melt piezoelectric ink jet Any of the IJ series |
| Electrostatic | An electric field is used to accelerate selected drops towards the print medium. | Low power Simple print head construction | Field strength required for separation of small drops is near or above air breakdown | Silverbrook, EP 0771 658 A2 and related patent applications Tone-Jet |
| Direct magnetic field | A magnetic field is used to accelerate selected drops of magnetic ink towards the print medium. | Low power Simple print head construction | Requires magnetic ink Requires strong magnetic field | Silverbrook, EP 0771 658 A2 and related patent applications |

| AUXILIARY MECHANISM (APPLIED TO ALL NOZZLES) | | | | |
|---|---|---|---|---|
| | Description | Advantages | Disadvantages | Examples |
| Cross magnetic field | The print head is placed in a constant magnetic field. The Lorenz force in a current carrying wire is used to move the actuator. | Does not require magnetic materials to be integrated in the print head manufacturing process | Requires external magnet Current densities may be high, resulting in electromigration problems | IJ06, IJ16 |
| Pulsed magnetic field | A pulsed magnetic field is used to cyclically attract a paddle, which pushes on the ink. A small actuator moves a catch, which selectively prevents the paddle from moving. | Very low power operation is possible Small print head size | Complex print head construction Magnetic materials required in print head | IJ10 |

| ACTUATOR AMPLIFICATION OR MODIFICATION METHOD | | | | |
|---|---|---|---|---|
| | Description | Advantages | Disadvantages | Examples |
| None | No actuator mechanical amplification is used. The actuator directly drives the drop ejection process. | Operational simplicity | Many actuator mechanisms have insufficient travel, or insufficient force, to efficiently drive the drop ejection process | Thermal Bubble Ink jet IJ01, IJ02, IJ06, IJ07, IJ16, IJ25, IJ26 |
| Differential expansion bend actuator | An actuator material expands more on one side than on the other. The expansion may be thermal, piezoelectric, magnetostrictive, or other mechanism. The bend actuator converts a high force low travel actuator mechanism to high travel, lower force mechanism. | Provides greater travel in a reduced print head area | High stresses are involved Care must be taken that the materials do not delaminate Residual bend resulting from high temperature or high stress during formation | Piezoelectric IJ03, IJ09, IJ17, IJ18, IJ19, IJ20, IJ21, IJ22, IJ23, IJ24, IJ27, IJ29, IJ30, IJ31, IJ32, IJ33, IJ34, IJ35, IJ36, IJ37, IJ38, IJ39, IJ42, IJ43, IJ44 |
| Transient bend actuator | A trilayer bend actuator where the two outside layers are identical. This cancels bend due to ambient temperature and residual stress. The actuator only responds to transient heating of one side or the other. | Very good temperature stability High speed, as a new drop can be fired before heat dissipates Cancels residual stress of formation | High stresses are involved Care must be taken that the materials do not delaminate | IJ40, IJ41 |
| Reverse spring | The actuator loads a spring. When the actuator is turned off, the spring releases. This can reverse the force/distance curve of the | Better coupling to the ink | Fabrication complexity High stress in the spring | IJ05, IJ11 |

-continued

ACTUATOR AMPLIFICATION OR MODIFICATION METHOD

| | Description | Advantages | Disadvantages | Examples |
|---|---|---|---|---|
| | actuator to make it compatible with the force/time requirements of the drop ejection. | | | |
| Actuator stack | A series of thin actuators are stacked. This can be appropriate where actuators require high electric field strength, such as electrostatic and piezoelectric actuators. | Increased travel Reduced drive voltage | Increased fabrication complexity Increased possibility of short circuits due to pinholes | Some piezoelectric ink jets IJ04 |
| Multiple actuators | Multiple smaller actuators are used simultaneously to move the ink. Each actuator need provide only a portion of the force required. | Increases the force available from an actuator Multiple actuators can be positioned to control ink flow accurately | Actuator forces may not add linearly, reducing efficiency | IJ12, IJ13, IJ18, IJ20, IJ22, IJ28, IJ42, IJ43 |
| Linear Spring | A linear spring is used to transform a motion with small travel and high force into a longer travel, lower force motion. | Matches low travel actuator with higher travel requirements Non-contact method of motion transformation | Requires print head area for the spring | IJ15 |
| Coiled actuator | A bend actuator is coiled to provide greater travel in a reduced chip area. | Increases travel Reduces chip area Planar implementations are relatively easy to fabricate. | Generally restricted to planar implementations due to extreme fabrication difficulty in other orientations. | IJ17, IJ21, IJ34, IJ35 |
| Flexure bend actuator | A bend actuator has a small region near the fixture point, which flexes much more readily than the remainder of the actuator. The actuator flexing is effectively converted from an even coiling to an angular bend, resulting in greater travel of the actuator tip. | Simple means of increasing travel of a bend actuator | Care must be taken not to exceed the elastic limit in the flexure area Stress distribution is very uneven Difficult to accurately model with finite element analysis | IJ10, IJ19, IJ33 |
| Catch | The actuator controls a small catch. The catch either enables or disables movement of an ink pusher that is controlled in a bulk manner. | Very low actuator energy Very small actuator size | Complex construction Requires external force Unsuitable for pigmented inks | IJ10 |

ACTUATOR AMPLIFICATION OR MODIFICATION METHOD

|  | Description | Advantages | Disadvantages | Examples |
| --- | --- | --- | --- | --- |
| Gears | Gears can be used to increase travel at the expense of duration. Circular gears, rack and pinion, ratchets, and other gearing methods can be used. | Low force, low travel actuators can be used Can be fabricated using standard surface MEMS processes | Moving parts are required Several actuator cycles are required More complex drive electronics Complex construction Friction, friction, and wear are possible | IJ13 |
| Buckle plate | A buckle plate can be used to change a slow actuator into a fast motion. It can also convert a high force, low travel actuator into a high travel, medium force motion. | Very fast movement achievable | Must stay within elastic limits of the materials for long device life High stresses involved Generally high power requirement | S. Hirata et al, "An Ink-jet Head Using Diaphragm Microactuator", Proc. IEEE MEMS, February 1996, pp 418-423. IJ18, IJ27 |
| Tapered magnetic pole | A tapered magnetic pole can increase travel at the expense of force. | Linearizes the magnetic force/distance curve | Complex construction | IJ14 |
| Lever | A lever and fulcrum is used to transform a motion with small travel and high force into a motion with longer travel and lower force. The lever can also reverse the direction of travel. | Matches low travel actuator with higher travel requirements Fulcrum area has no linear movement, and can be used for a fluid seal | High stress around the fulcrum | IJ32, IJ36, IJ37 |
| Rotary impeller | The actuator is connected to a rotary impeller. A small angular deflection of the actuator results in a rotation of the impeller vanes, which push the ink against stationary vanes and out of the nozzle. | High mechanical advantage The ratio of force to travel of the actuator can be matched to the nozzle requirements by varying the number of impeller vanes | Complex construction Unsuitable for pigmented inks | IJ28 |
| Acoustic lens | A refractive or diffractive (e.g. zone plate) acoustic lens is used to concentrate sound waves. | No moving parts | Large area required Only relevant for acoustic ink jets | 1993 Hadimioglu et al, EUP 550,192 1993 Elrod et al, EUP 572,220 |
| Sharp conductive point | A sharp point is used to concentrate an electrostatic field. | Simple construction | Difficult to fabricate using standard VLSI processes for a surface ejecting ink-jet Only relevant for electrostatic ink jets | Tone-jet |

| ACTUATOR MOTION | | | | |
|---|---|---|---|---|
| | Description | Advantages | Disadvantages | Examples |
| Volume expansion | The volume of the actuator changes, pushing the ink in all directions. | Simple construction in the case of thermal ink jet | High energy is typically required to achieve volume expansion. This leads to thermal stress, cavitation, and kogation in thermal ink jet implementations | Hewlett-Packard Thermal Ink jet Canon Bubblejet |
| Linear, normal to chip surface | The actuator moves in a direction normal to the print head surface. The nozzle is typically in the line of movement. | Efficient coupling to ink drops ejected normal to the surface | High fabrication complexity may be required to achieve perpendicular motion | IJ01, IJ02, IJ04, IJ07, IJ11, IJ14 |
| Parallel to chip surface | The actuator moves parallel to the print head surface. Drop ejection may still be normal to the surface. | Suitable for planar fabrication | Fabrication complexity Friction Stiction | IJ12, IJ13, IJ15, IJ33,, IJ34, IJ35, IJ36 |
| Membrane push | An actuator with a high force but small area is used to push a stiff membrane that is in contact with the ink. | The effective area of the actuator becomes the membrane area | Fabrication complexity Actuator size Difficulty of integration in a VLSI process | 1982 Howkins U.S. Pat. No. 4,459,601 |
| Rotary | The actuator causes the rotation of some element, such a grill or impeller | Rotary levers may be used to increase travel Small chip area requirements | Device complexity May have friction at a pivot point | IJ05, IJ08, IJ13, IJ28 |
| Bend | The actuator bends when energized. This may be due to differential thermal expansion, piezoelectric expansion, magnetostriction, or other form of relative dimensional change. | A very small change in dimensions can be converted to a large motion. | Requires the actuator to be made from at least two distinct layers, or to have a thermal difference across the actuator | 1970 Kyser et al U.S. Pat. No. 3,946,398 1973 Stemme U.S. Pat. No. 3,747,120 IJ03, IJ09, IJ10, IJ19, IJ23, IJ24, IJ25, IJ29, IJ30, IJ31, IJ33, IJ34, IJ35 |
| Swivel | The actuator swivels around a central pivot. This motion is suitable where there are opposite forces applied to opposite sides of the paddle, e.g. Lorenz force. | Allows operation where the net linear force on the paddle is zero Small chip area requirements | Inefficient coupling to the ink motion | IJ06 |
| Straighten | The actuator is normally bent, and straightens when energized. | Can be used with shape memory alloys where the austenic phase is planar | Requires careful balance of stresses to ensure that the quiescent bend is accurate | IJ26, IJ32 |
| Double bend | The actuator bends in one direction when one element is energized, and bends the other way when another element is energized. | One actuator can be used to power two nozzles. Reduced chip size. Not sensitive to ambient temperature | Difficult to make the drops ejected by both bend directions identical. A small efficiency loss compared to equivalent single bend actuators. | IJ36, IJ37, IJ38 |

-continued

| | Description | Advantages | Disadvantages | Examples |
|---|---|---|---|---|
| | | ACTUATOR MOTION | | |
| Shear | Energizing the actuator causes a shear motion in the actuator material. | Can increase the effective travel of piezoelectric actuators | Not readily applicable to other actuator mechanisms | 1985 Fishbeck U.S. Pat. No. 4,584,590 |
| Radial constriction | The actuator squeezes an ink reservoir, forcing ink from a constricted nozzle. | Relatively easy to fabricate single nozzles from glass tubing as macroscopic structures | High force required Inefficient Difficult to integrate with VLSI processes | 1970 Zoltan U.S. Pat. No. 3,683,212 |
| Coil/ uncoil | A coiled actuator uncoils or coils more tightly. The motion of the free end of the actuator ejects the ink. | Easy to fabricate as a planar VLSI process Small area required, therefore low cost | Difficult to fabricate for non-planar devices Poor out-of-plane stiffness | IJ17, IJ21, IJ34, IJ35 |
| Bow | The actuator bows (or buckles) in the middle when energized. | Can increase the speed of travel Mechanically rigid | Maximum travel is constrained High force required | IJ16, IJ18, IJ27 |
| Push-Pull | Two actuators control a shutter. One actuator pulls the shutter, and the other pushes it. | The structure is pinned at both ends, so has a high out-of-plane rigidity | Not readily suitable for ink jets which directly push the ink | IJ18 |
| Curl inwards | A set of actuators curl inwards to reduce the volume of ink that they enclose. | Good fluid flow to the region behind the actuator increases efficiency | Design complexity | IJ20, IJ42 |
| Curl outwards | A set of actuators curl outwards, pressurizing ink in a chamber surrounding the actuators, and expelling ink from a nozzle in the chamber. | Relatively simple construction | Relatively large chip area | IJ43 |
| Iris | Multiple vanes enclose a volume of ink. These simultaneously rotate, reducing the volume between the vanes. | High efficiency Small chip area | High fabrication complexity Not suitable for pigmented inks | IJ22 |
| Acoustic vibration | The actuator vibrates at a high frequency. | The actuator can be physically distant from the ink | Large area required for efficient operation at useful frequencies Acoustic coupling and crosstalk Complex drive circuitry Poor control of drop volume and position | 1993 Hadimioglu et al, EUP 550,192 1993 Elrod et al, EUP 572,220 |
| None | In various ink jet designs the actuator does not move. | No moving parts | Various other tradeoffs are required to eliminate moving parts | Silverbrook, EP 0771 658 A2 and related patent applications Tone-jet |

| NOZZLE REFILL METHOD | | | | |
| --- | --- | --- | --- | --- |
| | Description | Advantages | Disadvantages | Examples |
| Surface tension | This is the normal way that ink jets are refilled. After the actuator is energized, it typically returns rapidly to its normal position. This rapid return sucks in air through the nozzle opening. The ink surface tension at the nozzle then exerts a small force restoring the meniscus to a minimum area. This force refills the nozzle. | Fabrication simplicity Operational simplicity | Low speed Surface tension force relatively small compared to actuator force Long refill time usually dominates the total repetition rate | Thermal ink jet Piezoelectric ink jet IJ01-IJ07, IJ10-IJ14, IJ16, IJ20, IJ22-IJ45 |
| Shuttered oscillating ink pressure | Ink to the nozzle chamber is provided at a pressure that oscillates at twice the drop ejection frequency. When a drop is to be ejected, the shutter is opened for 3 half cycles: drop ejection, actuator return, and refill. The shutter is then closed to prevent the nozzle chamber emptying during the next negative pressure cycle. | High speed Low actuator energy, as the actuator need only open or close the shutter, instead of ejecting the ink drop | Requires common ink pressure oscillator May not be suitable for pigmented inks | IJ08, IJ13, IJ15, IJ17, IJ18, IJ19, IJ21 |
| Refill actuator | After the main actuator has ejected a drop a second (refill) actuator is energized. The refill actuator pushes ink into the nozzle chamber. The refill actuator returns slowly, to prevent its return from emptying the chamber again. | High speed, as the nozzle is actively refilled | Requires two independent actuators per nozzle | IJ09 |
| Positive ink pressure | The ink is held a slight positive pressure. After the ink drop is ejected, the nozzle chamber fills quickly as surface tension and ink pressure both operate to refill the nozzle. | High refill rate, therefore a high drop repetition rate is possible | Surface spill must be prevented Highly hydrophobic print head surfaces are required | Silverbrook, EP 0771 658 A2 and related patent applications Alternative for:, IJ01-IJ07, IJ10-IJ14, IJ16, IJ20, IJ22-IJ45 |

| METHOD OF RESTRICTING BACK-FLOW THROUGH INLET | | | | |
|---|---|---|---|---|
| | Description | Advantages | Disadvantages | Examples |
| Long inlet channel | The ink inlet channel to the nozzle chamber is made long and relatively narrow, relying on viscous drag to reduce inlet back-flow. | Design simplicity Operational simplicity Reduces crosstalk | Restricts refill rate May result in a relatively large chip area Only partially effective | Thermal ink jet Piezoelectric ink jet IJ42, IJ43 |
| Positive ink pressure | The ink is under a positive pressure, so that in the quiescent state some of the ink drop already protrudes from the nozzle. This reduces the pressure in the nozzle chamber which is required to eject a certain volume of ink. The reduction in chamber pressure results in a reduction in ink pushed out through the inlet. | Drop selection and separation forces can be reduced Fast refill time | Requires a method (such as a nozzle rim or effective hydrophobizing, or both) to prevent flooding of the ejection surface of the print head. | Silverbrook, EP 0771 658 A2 and related patent applications Possible operation of the following: IJ01-IJ07, IJ09-IJ12, IJ14, IJ16, IJ20, IJ22,, IJ23-IJ34, IJ36-IJ41, IJ44 |
| Baffle | One or more baffles are placed in the inlet ink flow. When the actuator is energized, the rapid ink movement creates eddies which restrict the flow through the inlet. The slower refill process is unrestricted, and does not result in eddies. | The refill rate is not as restricted as the long inlet method. Reduces crosstalk | Design complexity May increase fabrication complexity (e.g. Tektronix hot melt Piezoelectric print heads). | HP Thermal Ink Jet Tektronix piezoelectric ink jet |
| Flexible flap restricts inlet | In this method recently disclosed by Canon, the expanding actuator (bubble) pushes on a flexible flap that restricts the inlet. | Significantly reduces back-flow for edge-shooter thermal ink jet devices | Not applicable to most ink jet configurations Increased fabrication complexity Inelastic deformation of polymer flap results in creep over extended use | Canon |
| Inlet filter | A filter is located between the ink inlet and the nozzle chamber. The filter has a multitude of small holes or slots, restricting ink flow. The filter also removes particles which may block the nozzle. | Additional advantage of ink filtration Ink filter may be fabricated with no additional process steps | Restricts refill rate May result in complex construction | IJ04, IJ12, IJ24, IJ27, IJ29, IJ30 |
| Small inlet compared to nozzle | The ink inlet channel to the nozzle chamber has a substantially smaller cross section than that of the nozzle, | Design simplicity | Restricts refill rate May result in a relatively large chip area Only partially | IJ02, IJ37, IJ44 |

-continued

METHOD OF RESTRICTING BACK-FLOW THROUGH INLET

| | Description | Advantages | Disadvantages | Examples |
|---|---|---|---|---|
| | resulting in easier ink egress out of the nozzle than out of the inlet. | | effective | |
| Inlet shutter | A secondary actuator controls the position of a shutter, closing off the ink inlet when the main actuator is energized. | Increases speed of the ink-jet print head operation | Requires separate refill actuator and drive circuit | IJ09 |
| The inlet is located behind the ink-pushing surface | The method avoids the problem of inlet back-flow by arranging the ink-pushing surface of the actuator between the inlet and the nozzle. | Back-flow problem is eliminated | Requires careful design to minimize the negative pressure behind the paddle | IJ01, IJ03, IJ05, IJ06, IJ07, IJ10, IJ11, IJ14, IJ16, IJ22, IJ23, IJ25, IJ28, IJ31, IJ32, IJ33, IJ34, IJ35, IJ36, IJ39, IJ40, IJ41 |
| Part of the actuator moves to shut off the inlet | The actuator and a wall of the ink chamber are arranged so that the motion of the actuator closes off the inlet. | Significant reductions in back-flow can be achieved Compact designs possible | Small increase in fabrication complexity | IJ07, IJ20, IJ26, IJ38 |
| Nozzle actuator does not result in ink back-flow | In some configurations of ink jet, there is no expansion or movement of an actuator which may cause ink back-flow through the inlet. | Ink back-flow problem is eliminated | None related to ink back-flow on actuation | Silverbrook, EP 0771 658 A2 and related patent applications Valve-jet Tone-jet |

NOZZLE CLEARING METHOD

| | Description | Advantages | Disadvantages | Examples |
|---|---|---|---|---|
| Normal nozzle firing | All of the nozzles are fired periodically, before the ink has a chance to dry. When not in use the nozzles are sealed (capped) against air. The nozzle firing is usually performed during a special clearing cycle, after first moving the print head to a cleaning station. | No added complexity on the print head | May not be sufficient to displace dried ink | Most ink jet systems IJ01, IJ02, IJ03, IJ04, IJ05, IJ06, IJ07, IJ09, IJ10, IJ11, IJ12, IJ14, IJ16, IJ20, IJ22, IJ23, IJ24, IJ25, IJ26, IJ27, IJ28, IJ29, IJ30, IJ31, IJ32, IJ33, IJ34, IJ36, IJ37, IJ38, IJ39, IJ40,, IJ41, IJ42, IJ43, IJ44,, IJ45 |
| Extra power to ink heater | In systems which heat the ink, but do not boil it under normal situations, nozzle clearing can be achieved by over-powering the heater and boiling ink at the nozzle. | Can be highly effective if the heater is adjacent to the nozzle | Requires higher drive voltage for clearing May require larger drive transistors | Silverbrook, EP 0771 658 A2 and related patent applications |
| Rapid succession of actuator pulses | The actuator is fired in rapid succession. In some configurations, this may cause heat | Does not require extra drive circuits on the print head Can be readily | Effectiveness depends substantially upon the configuration of the ink jet nozzle | May be used with: IJ01, IJ02, IJ03, IJ04, IJ05, IJ06, IJ07, IJ09, IJ10, IJ11, IJ14, IJ16, IJ20, |

NOZZLE CLEARING METHOD

|  | Description | Advantages | Disadvantages | Examples |
|---|---|---|---|---|
|  | build-up at the nozzle which boils the ink, clearing the nozzle. In other situations, it may cause sufficient vibrations to dislodge clogged nozzles. | controlled and initiated by digital logic |  | IJ22, IJ23, IJ24, IJ25, IJ27, IJ28, IJ29, IJ30, IJ31, IJ32, IJ33, IJ34, IJ36, IJ37, IJ38, IJ39, IJ40, IJ41, IJ42, IJ43, IJ44, IJ45 |
| Extra power to ink pushing actuator | Where an actuator is not normally driven to the limit of its motion, nozzle clearing may be assisted by providing an enhanced drive signal to the actuator. | A simple solution where applicable | Not suitable where there is a hard limit to actuator movement | May be used with: IJ03, IJ09, IJ16, IJ20, IJ23, IJ24, IJ25, IJ27, IJ29, IJ30, IJ31, IJ32, IJ39, IJ40, IJ41, IJ42, IJ43, IJ44, IJ45 |
| Acoustic resonance | An ultrasonic wave is applied to the ink chamber. This wave is of an appropriate amplitude and frequency to cause sufficient force at the nozzle to clear blockages. This is easiest to achieve if the ultrasonic wave is at a resonant frequency of the ink cavity. | A high nozzle clearing capability can be achieved May be implemented at very low cost in systems which already include acoustic actuators | High implementation cost if system does not already include an acoustic actuator | IJ08, IJ13, IJ15, IJ17, IJ18, IJ19, IJ21 |
| Nozzle clearing plate | A microfabricated plate is pushed against the nozzles. The plate has a post for every nozzle. A post moves through each nozzle, displacing dried ink. | Can clear severely clogged nozzles | Accurate mechanical alignment is required Moving parts are required There is risk of damage to the nozzles Accurate fabrication is required | Silverbrook, EP 0771 658 A2 and related patent applications |
| Ink pressure pulse | The pressure of the ink is temporarily increased so that ink streams from all of the nozzles. This may be used in conjunction with actuator energizing. | May be effective where other methods cannot be used | Requires pressure pump or other pressure actuator Expensive Wasteful of ink | May be used with all IJ series ink jets |
| Print head wiper | A flexible 'blade' is wiped across the print head surface. The blade is usually fabricated from a flexible polymer, e.g. rubber or synthetic elastomer. | Effective for planar print head surfaces Low cost | Difficult to use if print head surface is non-planar or very fragile Requires mechanical parts Blade can wear out in high volume print systems | Many ink jet systems |
| Separate ink boiling heater | A separate heater is provided at the nozzle although the normal drop e-ection mechanism does not require it. The heaters do not require individual | Can be effective where other nozzle clearing methods cannot be used Can be implemented at no additional | Fabrication complexity | Can be used with many IJ series ink jets |

NOZZLE CLEARING METHOD

| Description | Advantages | Disadvantages | Examples |
|---|---|---|---|
| drive circuits, as many nozzles can be cleared simultaneously, and no imaging is required. | cost in some ink jet configurations | | |

NOZZLE PLATE CONSTRUCTION

| | Description | Advantages | Disadvantages | Examples |
|---|---|---|---|---|
| Electroformed nickel | A nozzle plate is separately fabricated from electroformed nickel, and bonded to the print head chip. | Fabrication simplicity | High temperatures and pressures are required to bond nozzle plate Minimum thickness constraints Differential thermal expansion | Hewlett Packard Thermal Ink jet |
| Laser ablated or drilled polymer | Individual nozzle holes are ablated by an intense UV laser in a nozzle plate, which is typically a polymer such as polyimide or polysulphone | No masks required Can be quite fast Some control over nozzle profile is possible Equipment required is relatively low cost | Each hole must be individually formed Special equipment required Slow where there are many thousands of nozzles per print head May produce thin burrs at exit holes | Canon Bubblejet 1988 Sercel et al., SPIE, Vol. 998 Excimer Beam Applications, pp. 76-83 1993 Watanabe et al., U.S. Pat. No. 5,208,604 |
| Silicon micromachined | A separate nozzle plate is micromachined from single crystal silicon, and bonded to the print head wafer. | High accuracy is attainable | Two part construction High cost Requires precision alignment Nozzles may be clogged by adhesive | K. Bean, IEEE Transactions on Electron Devices, Vol. ED-25, No. 10, 1978, pp 1185-1195 Xerox 1990 Hawkins et al., U.S. Pat. No. 4,899,181 |
| Glass capillaries | Fine glass capillaries are drawn from glass tubing. This method has been used for making individual nozzles, but is difficult to use for bulk manufacturing of print heads with thousands of nozzles. | No expensive equipment required Simple to make single nozzles | Very small nozzle sizes are difficult to form Not suited for mass production | 1970 Zoltan U.S. Pat. No. 3,683,212 |
| Monolithic, surface micromachined using VLSI lithographic processes | The nozzle plate is deposited as a layer using standard VLSI deposition techniques. Nozzles are etched in the | High accuracy (<1 μm) Monolithic Low cost Existing processes can be used | Requires sacrificial layer under the nozzle plate to form the nozzle chamber Surface may be fragile to the touch | Silverbrook, EP 0771 658 A2 and related patent applications IJ01, IJ02, IJ04, IJ11, IJ12, IJ17, IJ18, IJ20, IJ22, IJ24, IJ27, |

-continued

NOZZLE PLATE CONSTRUCTION

| | Description | Advantages | Disadvantages | Examples |
|---|---|---|---|---|
| | nozzle plate using VLSI lithography and etching. | | | IJ28, IJ29, IJ30, IJ31, IJ32, IJ33, IJ34, IJ36, IJ37, IJ38, IJ39, IJ40, IJ41, IJ42, IJ43, IJ44 |
| Monolithic, etched through substrate | The nozzle plate is a buried etch stop in the wafer. Nozzle chambers are etched in the front of the wafer, and the wafer is thinned from the back side. Nozzles are then etched in the etch stop layer. | High accuracy (<1 μm) Monolithic Low cost No differential expansion | Requires long etch times Requires a support wafer | IJ03, IJ05, IJ06, IJ07, IJ08, IJ09, IJ10, IJ13, IJ14, IJ15, IJ16, IJ19, IJ21, IJ23, IJ25, IJ26 |
| No nozzle plate | Various methods have been tried to eliminate the nozzles entirely, to prevent nozzle clogging. These include thermal bubble mechanisms and acoustic lens mechanisms | No nozzles to become clogged | Difficult to control drop position accurately Crosstalk problems | Ricoh 1995 Sekiya et al U.S. Pat. No. 5,412,413 1993 Hadimioglu et al EUP 550,192 1993 Elrod et al EUP 572,220 |
| Trough | Each drop ejector has a trough through which a paddle moves. There is no nozzle plate. | Reduced manufacturing complexity Monolithic | Drop firing direction is sensitive to wicking. | IJ35 |
| Nozzle slit instead of individual nozzles | The elimination of nozzle holes and replacement by a slit encompassing many actuator positions reduces nozzle clogging, but increases crosstalk due to ink surface waves | No nozzles to become clogged | Difficult to control drop position accurately Crosstalk problems | 1989 Saito et al U.S. Pat. No. 4,799,068 |

DROP EJECTION DIRECTION

| | Description | Advantages | Disadvantages | Examples |
|---|---|---|---|---|
| Edge ('edge shooter') | Ink flow is along the surface of the chip, and ink drops are ejected from the chip edge. | Simple construction No silicon etching required Good heat sinking via substrate Mechanically strong Ease of chip handing | Nozzles limited to edge High resolution is difficult Fast color printing requires one print head per color | Canon Bubblejet 1979 Endo et al GB patent 2,007,162 Xerox heater-in-pit 1990 Hawkins et al U.S. Pat. No. 4,899,181 Tone-jet |
| Surface ('roof shooter') | Ink flow is along the surface of the | No bulk silicon etching required | Maximum ink flow is severely | Hewlett-Packard TIJ 1982 Vaught et |

| DROP EJECTION DIRECTION | | | | |
|---|---|---|---|---|
| | Description | Advantages | Disadvantages | Examples |
| | chip, and ink drops are ejected from the chip surface, normal to the plane of the chip. | Silicon can make an effective heat sink Mechanical strength | restricted | al U.S. Pat. No. 4,490,728 IJ02, IJ11, IJ12, IJ20, IJ22 |
| Through chip, forward ('up shooter') | Ink flow is through the chip, and ink drops are ejected from the front surface of the chip. | High ink flow Suitable for pagewidth print heads High nozzle packing density therefore low manufacturing cost | Requires bulk silicon etching | Silverbrook, EP 0771 658 A2 and related patent applications IJ04, IJ17, IJ18, IJ24, IJ27-IJ45 |
| Through chip, reverse ('down shooter') | Ink flow is through the chip, and ink drops are ejected from the rear surface of the chip. | High ink flow Suitable for pagewidth print heads High nozzle packing density therefore low manufacturing cost | Requires wafer thinning Requires special handling during manufacture | IJ01, IJ03, IJ05, IJ06, IJ07, IJ08, IJ09, IJ10, IJ13, IJ14, IJ15, IJ16, IJ19, IJ21, IJ23, IJ25, IJ26 |
| Through actuator | Ink flow is through the actuator, which is not fabricated as part of the same substrate as the drive transistors. | Suitable for piezoelectric print heads | Pagewidth print heads require several thousand connections to drive circuits Cannot be manufactured in standard CMOS fabs Complex assembly required | Epson Stylus Tektronix hot melt piezoelectric ink jets |

| INK TYPE | | | | |
|---|---|---|---|---|
| | Description | Advantages | Disadvantages | Examples |
| Aqueous, dye | Water based ink which typically contains: water, dye, surfactant, humectant, and biocide. Modern ink dyes have high water-fastness, light fastness | Environmentally friendly No odor | Slow drying Corrosive Bleeds on paper May strikethrough Cockles paper | Most existing ink jets All IJ series ink jets Silverbrook, EP 0771 658 A2 and related patent applications |
| Aqueous, pigment | Water based ink which typically contains: water, pigment, surfactant, humectant, and biocide. Pigments have an advantage in reduced bleed, wicking and strikethrough. | Environmentally friendly No odor Reduced bleed Reduced wicking Reduced strikethrough | Slow drying Corrosive Pigment may clog nozzles Pigment may clog actuator mechanisms Cockles paper | IJ02, IJ04, IJ21, IJ26, IJ27, IJ30 Silverbrook, EP 0771 658 A2 and related patent applications Piezoelectric ink-jets Thermal ink jets (with significant restrictions) |
| Methyl Ethyl Ketone | MEK is a highly volatile solvent used for industrial | Very fast drying Prints on | Odorous Flammable | All IJ series ink jets |

-continued

INK TYPE

| | Description | Advantages | Disadvantages | Examples |
|---|---|---|---|---|
| (MEK) | printing on difficult surfaces such as aluminum cans. | various substrates such as metals and plastics | | |
| Alcohol (ethanol, 2-butanol, and others) | Alcohol based inks can be used where the printer must operate at temperatures below the freezing point of water. An example of this is in-camera consumer photographic printing. | Fast drying Operates at sub-freezing temperatures Reduced paper cockle Low cost | Slight odor Flammable | All IJ series ink jets |
| Phase change (hot melt) | The ink is solid at room temperature, and is melted in the print head before jetting. Hot melt inks are usually wax based, with a melting point around 80° C. After jetting the ink freezes almost instantly upon contacting the print medium or a transfer roller. | No drying time-ink instantly freezes on the print medium Almost any print medium can be used No paper cockle occurs No wicking occurs No bleed occurs No strikethrough occurs | High viscosity Printed ink typically has a 'waxy' feel Printed pages may 'block' Ink temperature may be above the curie point of permanent magnets Ink heaters consume power Long warm-up time | Tektronix hot melt piezoelectric ink jets 1989 Nowak U.S. Pat. No. 4,820,346 All IJ series ink jets |
| Oil | Oil based inks are extensively used in offset printing. They have advantages in improved characteristics on paper (especially no wicking or cockle). Oil soluble dies and pigments are required. | High solubility medium for some dyes Does not cockle paper Does not wick through paper | High viscosity: this is a significant limitation for use in ink jets, which usually require a low viscosity. Some short chain and multi-branched oils have a sufficiently low viscosity. Slow drying | All IJ series ink jets |
| Microemulsion | A microemulsion is a stable, self forming emulsion of oil, water, and surfactant. The characteristic drop size is less than 100 nm, and is determined by the preferred curvature of the surfactant. | Stops ink bleed High dye solubility Water, oil, and amphiphilic soluble dies can be used Can stabilize pigment suspensions | Viscosity higher than water Cost is slightly higher than water based ink High surfactant concentration required (around 5%) | All IJ series ink jets |

We claim:

1. A system, comprising:

an image input configured to receive image data;

a plurality of processors operatively coupled to each other, wherein at least one of the processors is operatively coupled to the image input, wherein each processor is operatively coupled to its own memory, wherein each processor executes respective processor instructions that perform respective image manipulation on the image data; and an image output configured to transmit manipulated image data from the plurality of processors for display;

wherein the plurality of processors includes a first processor and a second processor, wherein the first processor directs first manipulated image data to a first path and directs the first manipulated image data to a second path, wherein the first path and the second path are parallel to one another, and wherein the second processor receives manipulated image data from the first path and manipulated image data from the second path and combines at least a portion of the manipulated image data received from the first path with at least a portion of the manipulated image data received from the second path to form additional manipulated image data.

2. The system according to claim 1, wherein the plurality of processors further includes a third processor, and a fourth processor, wherein the first processor receives the image data from the image input and applies a first image manipulation program on the received image to produce the first manipulated image data, wherein the first processor sends the first manipulated image data to the first path that includes the third processor and to the second path that includes the fourth processor, and wherein the first path produces second manipulated image data and the second path produces third manipulated image data.

3. The system according to claim 2, wherein the first image manipulation program is stored on the respective memory of the first processor.

4. The system according to claim 1, wherein two of the processors are operatively coupled to each other in series.

5. The system according to claim 2, wherein the third processor receives the first manipulated image data and applies a second image manipulation program on the first manipulated image data, and wherein the fourth processor also receives the first manipulated image data and applies a third image manipulation program on the first manipulated image data.

6. The system according to claim 2, wherein the respective processor instructions are stored on respective memories of the corresponding processors.

7. The system according to claim 1, wherein the received image data is processed iteratively by one or more of the processors.

8. The system according to claim 1, wherein the received image is processed in a loop through the plurality of processors.

9. The system according to claim 1, wherein the plurality of processors includes a first processor and a second processor, wherein the first processor receives the image data from the image input and applies a first image manipulation program on the received image, wherein the first processor sends the manipulated image data to a first path that includes a second processor and a second path that includes the image output for display.

10. The system according to claim 9, wherein the first path and the second path are two different downstream paths.

11. The system according to claim 1, wherein the plurality of processors includes a first processor and a second processor, wherein the first processor receives the image data from the image input and applies a first image manipulation program on the received image, wherein the first processor sends the first manipulated image data to a first path that includes a second processor and also sends the first manipulated image data down a second path for display.

12. The system according to claim 1, wherein one or more processors of the plurality of processors can be configured to operate in a network environment.

13. The system according to claim 1, wherein the plurality of processors communicate with a network.

14. The system according to claim 1, wherein at least two of the processors are configured to work in parallel.

\* \* \* \* \*